(12) United States Patent
Zhu

(10) Patent No.: US 9,234,368 B2
(45) Date of Patent: Jan. 12, 2016

(54) ELASTIC NON-METAL CLIP AND ASSEMBLED FENCE INCLUDING THE SAME

(71) Applicant: Alan Qing-Lin Zhu, Ontario (CA)

(72) Inventor: Alan Qing-Lin Zhu, Ontario (CA)

( * ) Notice: Subject to any disclaimer, the term of this patent is extended or adjusted under 35 U.S.C. 154(b) by 0 days.

(21) Appl. No.: 14/578,103

(22) Filed: Dec. 19, 2014

(65) Prior Publication Data
US 2015/0184419 A1 Jul. 2, 2015

Related U.S. Application Data

(63) Continuation-in-part of application No. 29/494,470, filed on Jun. 20, 2014, and a continuation-in-part of application No. PCT/CN2014/001026, filed on Nov. 18, 2014.

(30) Foreign Application Priority Data

Dec. 30, 2013 (CN) .......................... 2013 1 0740404
Dec. 30, 2013 (CN) .......................... 2013 1 0745418

(51) Int. Cl.
*E04H 17/16* (2006.01)
*E04H 17/14* (2006.01)
*F16B 2/22* (2006.01)

(52) U.S. Cl.
CPC ............ *E04H 17/14* (2013.01); *E04H 17/1413* (2013.01); *F16B 2/22* (2013.01); *E04H 2017/1447* (2013.01)

(58) Field of Classification Search
CPC .................. Y10T 403/4648; Y10T 403/4651; Y10T 403/4654; Y10T 403/4637; E04H 17/1413; E04H 17/1421; E04H 17/1426; E04H 17/1439; E04H 17/1443; E04H 2017/1447; E04H 2017/1473; E04H 2017/1478; A44B 17/00; F16B 21/00; F16B 21/08; F16B 21/082; F16B 21/07; F16B 21/075; F16B 19/00

See application file for complete search history.

(56) References Cited

U.S. PATENT DOCUMENTS

| 4,600,179 | A | * | 7/1986 | Willetts | .................. | E04H 17/18 256/22 |
| 4,927,306 | A | * | 5/1990 | Sato | ...................... | F16B 33/004 411/182 |
| 5,533,237 | A | * | 7/1996 | Higgins | .................. | F16B 5/065 24/289 |
| 5,718,549 | A | * | 2/1998 | Noda | ..................... | F16B 5/0635 411/349 |
| 5,882,001 | A | * | 3/1999 | Reinbold | ............ | E04H 17/1443 256/22 |
| 6,341,764 | B1 | * | 1/2002 | Conner | ............... | E04H 17/1439 256/19 |
| 7,300,089 | B2 | * | 11/2007 | Kuroda | ............... | B60R 13/0206 24/297 |
| 2003/0200634 | A1 | * | 10/2003 | Hansen | .................. | F16B 5/065 24/297 |
| 2004/0208728 | A1 | * | 10/2004 | Fattori | .................. | F16B 21/082 411/508 |
| 2005/0211969 | A1 | * | 9/2005 | Graber | ................ | E04H 17/1443 256/65.08 |
| 2005/0285091 | A1 | * | 12/2005 | Ko | ....................... | E04H 17/1443 256/24 |
| 2007/0170410 | A1 | * | 7/2007 | Devine | ................ | E04H 17/1443 256/22 |
| 2007/0189875 | A1 | * | 8/2007 | Ooyama | ................ | F16B 5/065 411/45 |

* cited by examiner

*Primary Examiner* — Daniel Wiley
(74) *Attorney, Agent, or Firm* — Christie, Parker & Hale, LLP

(57) ABSTRACT

An assembled fence includes a transverse bar, a vertical bar and a clip, wherein the clip is an elastic non-metal clip. Due to the installation of the elastic non-metal clip, all fence parts, including the clip, can be assembled in the assembly site; the clip which does not need to be assembled in the vertical bar in advance will not be damaged and is free from a problem of scratching other parts such as the vertical bar in a transportation process; and the non-metal clip is low in cost.

15 Claims, 72 Drawing Sheets

ELASTIC NON-METAL CLIP AND ASSEMBLED FENCE INCLUDING THE SAME

CROSS-REFERENCE TO RELATED APPLICATIONS

This application claims priority to and the benefit of Chinese Patent Application No. 201310745418.0, filed on Dec. 30, 2013, in the State Intellectual Property Office of the People's Republic of China and Chinese Patent Application No. 201310740404.X, filed on Dec. 30, 2013, in the State Intellectual Property Office of the People's Republic of China. This application is a continuation-in-part of U.S. Design patent application Ser. No. 29/494,470, filed on Jun. 20, 2014, in the United States Patent and Trademark Office; and is a continuation-in-part of International Application No. PCT/CN2014/001026, filed on Nov. 18, 2014, in the State Intellectual Property Office of the People's Republic of China. The entire contents of all of these are incorporated herein by reference.

BACKGROUND

1. Field

The following description relates to an elastic non-metal clip and an assembled fence including the same.

2. Description of the Related Art

In the current technology of the assembled fence, the transverse bars and vertical bars are fixed and connected through elastic metal clips. According to a Chinese patent publication No. CN2613556Y, published on Apr. 28, 2004, by the inventor of the present application and titled Steel Bar Fence with Spring-type Clips, a steel bar fence with spring-type clips is disclosed, where a metal clip is first installed inside a vertical bar with the convex parts on two sides of the clip extending through holes on two sides of the vertical bar. The vertical bar and the transverse bar are then assembled at the installation site. After arriving at the installation site, the vertical bar installed with the spring-type clip is inserted into a mating hole on the transverse bar; the convex parts on two sides of the spring-type clip automatically pop up inside the mating hole of the transverse bar, and are locked by propped against the inner upper surface and the inner lower surface of the transverse steel bar.

According to the above described assembled fence, the metal clip shall be installed inside the vertical bar in advance, and the vertical bar and the transverse bar shall be assembled at the installation site. However, the spring-type clip mounted inside the vertical bar and the vertical bar with the spring-type clip mounted inside may be easily damaged, and may scratch other parts such as the vertical bar easily in the transportation process; in addition, a rubber ring shall be arranged around the mating hole of the transverse bar for the vertical bar for waterproof sealing and for protecting the surface coating from being damaged due to collision between the transverse bars and the vertical bars; moreover, the metal clip itself is high in cost.

SUMMARY

It is an object of the present invention to solve the above technical problems by providing an elastic non-metal clip for assembling fences, which is convenient to install and utilize, all parts for assembling the fence may be assembled at the installation site, low in cost and the surfaces of the transverse bar and the vertical bar are not easily scratched.

It is also an object of the present invention to solve the above technical problems by providing an assembled fence, which is convenient to install and utilize, all parts for assembling the fence may be assembled at the installation site, low in cost and the surfaces of the transverse bar and the vertical bar are not easily scratched.

According to an embodiment of the present invention, an elastic non-metal clip for assembling a fence includes a main body having an outer wall and an inner wall, wherein a vertical bar inserting hole is formed in the middle of the main body surrounded by the inner wall; an outward extending flange is formed at an upper end of the outer wall; a section which has an inwardly inclined face that is inclined towards the inner wall from an upper edge to a lower edge is arranged below the flange on the outer wall; a section with a straight wall is below the section with the inwardly inclined face, and an outer diameter of the section with the straight wall is less than an outer diameter of the outward extending flange at the upper end; a clamping groove is formed between an upper end face of the section with the inwardly inclined face and a lower end face of the outward extending flange; an inwardly protruding bump is formed on the inner wall corresponding to the inwardly inclined face on the outer wall, the bump extending from top to bottom in the form of a convex arc.

A groove is formed in the middle of the bump on the inner wall of the main body.

The main body may be made from plastic or rubber.

The clip may include at least one inwardly protruding bump on the inner wall and at least one inwardly inclined face below the flange.

According to another embodiment of the present invention, an assembled fence includes a transverse bar, a vertical bar and a clip, wherein the clip is an elastic non-metal piece including a main body having an outer wall and an inner wall; a vertical bar inserting hole is formed in the middle of the main body and is configured to be locked with the vertical bar; the outer wall of the clip is configured to be inserted into a mating hole of the transverse bar.

In one embodiment, an outward extending flange is formed at an upper end of the outer wall of the main body; a section which has an inwardly inclined face that is inclined towards the inner wall of the main body from an upper edge to a lower edge is arranged on the outer wall below the flange; a section with a straight wall is below the section with the inwardly inclined face, and an outer diameter of the section with the straight wall is less than an outer diameter of the outward extending flange at the upper end; and a clamping groove is formed between an upper end face of the section with the inwardly inclined face and a lower end face of the outward extending flange, the clamping groove matches a thickness of a material that forms a single wall of the transverse bar.

In one embodiment, an inwardly protruding bump is formed on the inner wall corresponding to the inwardly inclined face on the outer wall, the bump extending from top to bottom in the form of a convex arc. The bump is configured to be inserted into a clamping hole on the vertical bar; a lower end face of the bump is configured to be propped against an orifice of the clamping hole on the vertical bar.

In one embodiment, a groove is formed in the middle of the bump on the inner wall of the main body; and a tab matching with the groove in the middle of the bump is formed on at least one clamping hole of the vertical bar.

The clip may be made from plastic or rubber.

The clip may include at least one inwardly protruding bump on the inner wall and at least one inwardly inclined face below the flange of the clip.

The cross section of the transverse bar may be in an inverted U-shape.

The cross section of the transverse bar may be in a rectangle shape.

In one embodiment, when the cross section of the transverse bar is in a rectangle shape, an inserting hole diameter on a first end face of the inserting hole of the transverse bar may be smaller than an inserting hole diameter on a second end face facing the first end face.

In one embodiment, the clip may have an M-shaped vertical bar inserting hole. The vertical bar may have an M-shaped cross section. The transverse bar may have a trapezoid shaped inserting hole. The vertical bar may be a hollow bar or a solid bar.

Beneficial effects: the utility of an embodiment of the present invention is utilized for assembling vertical bar and transverse bar of the assembled fence; all fence parts, including the clips, can be assembled in the field; the clips will not be damaged or causing problems such as scratching other parts such as the other vertical bars because the clips are not mounted in the vertical bar in a transportation process; it is unnecessary to place the rubber ring around the mating hole of the transverse bar for the vertical bar for waterproof sealing and for protecting the surface coating from being damaged due to collision between the transverse bar and the vertical bar; and moreover, the non-metal clip itself is low in cost.

BRIEF DESCRIPTION OF THE DRAWINGS

These and/or other aspects will become apparent and more readily appreciated from the following description of the embodiments, taken in conjunction with the accompanying drawings in which:

FIG. 14 is a top plan view of the rectangular clip;

FIG. 15 is a front side view thereof;

FIG. 16 is a left side view thereof;

FIG. 17 is a right side view thereof;

FIG. 18 is a bottom plan view thereof;

FIG. 19 is a rear side view thereof;

FIG. 20 is a cross-sectional view along the line A-A' of FIG. 14;

FIG. 21 is a top plan view of the triangular clip;

FIG. 22 is a front side view thereof;

FIG. 23 is a left side view thereof;

FIG. 24 is a right side view thereof;

FIG. 25 is a bottom plan view thereof;

FIG. 26 is a rear side view thereof;

FIG. 27 is a sectional view along the line B-B' of FIG. 21;

FIG. 28 is a top plan view of the oval clip;

FIG. 29 is a front side view thereof;

FIG. 30 is a left side view thereof;

FIG. 31 is a right side view thereof;

FIG. 32 is a bottom plan view thereof;

FIG. 33 is a rear side view thereof;

FIG. 34 is a cross-sectional view along the line C-C' of FIG. 28;

FIG. 35 is a top plan view of the hexagonal clip;

FIG. 36 is a front side view thereof;

FIG. 37 is a left side view thereof;

FIG. 38 is a right side view thereof;

FIG. 39 is a bottom plan view thereof;

FIG. 40 is a rear side view thereof;

FIG. 41 is a cross-sectional view along the line D-D' of FIG. 35;

FIG. 50 is a top plan view of the M-shaped clip;

FIG. 51 is a front side view thereof;

FIG. 52 is a left side view thereof;

FIG. 53 is a right side view thereof;

FIG. 54 is a cross-sectional view along the line F-F' of FIG. 50;

FIG. 55 is a rear side view thereof; and

FIG. 56 is a bottom plan view thereof;

FIG. 60 is a top plan view of the M-shaped clip;

FIG. 61 is a front side view thereof;

FIG. 62 is a left side view thereof;

FIG. 63 is a right side view thereof;

FIG. 64 is a cross-sectional view along the line G-G' of FIG. 50;

FIG. 65 is a rear side view thereof; and

FIG. 66 is a bottom plan view thereof;

FIG. 67 is a top plan view of the triangular-shaped clip;

FIG. 68 is a front side view thereof;

FIG. 69 is a left side view thereof;

FIG. 70 is a right side view thereof;

FIG. 71 is a cross-sectional view along the line H-H' of FIG. 50;

FIG. 72 is a rear side view thereof; and

FIG. 73 is a bottom plan view thereof.

Figure 1:
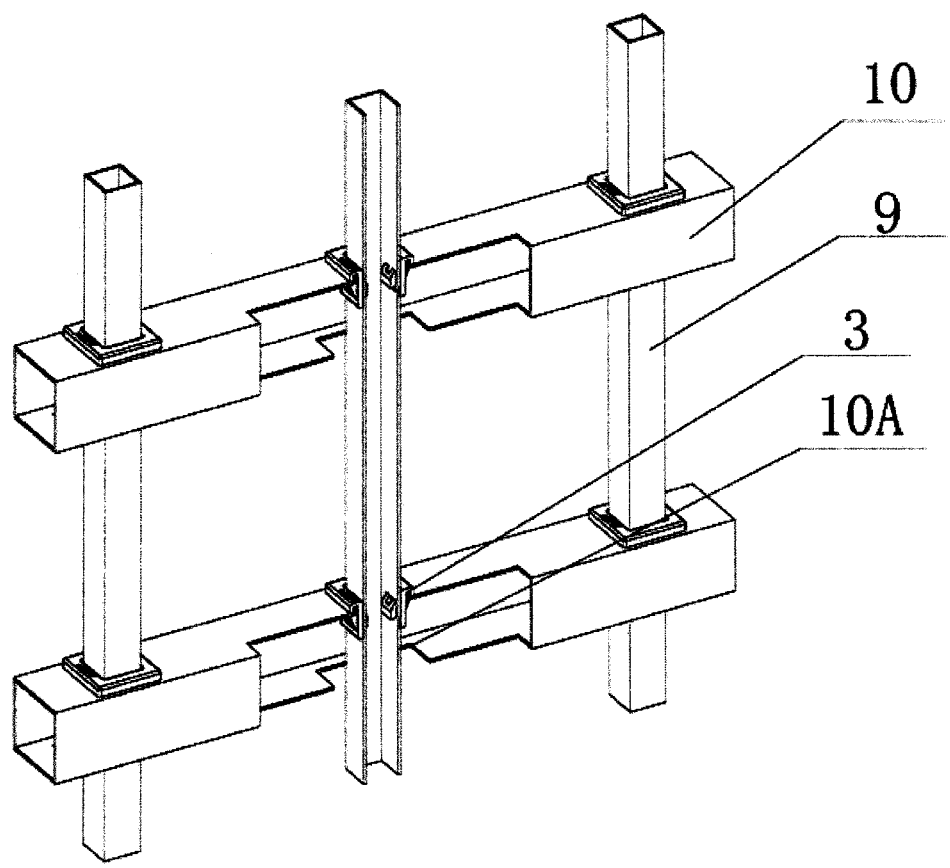
FIG. 1 is a schematic diagram showing the connection of the vertical bar, the transverse bar and the clip in an assembly according to an embodiment of the present invention.

In the drawings, 3—clip, 3'—main body, 3-1—flange, 3-2—vertical bar inserting hole, 3-4—section with a straight wall, 3-5—section with an inwardly inclined face, 3-6—clamping groove, 3-7—bump, 3-8—lower end face, 3-9—groove, 3-10—side wall, 3-11—inner wall, 3-12—outer wall, 9—vertical bar, 9-1—vertical bar clamping hole, 9-2—tab, 9-3—orifice, 10—transverse bar, 10A—inserting hole of the transverse bar, 10-1—a single wall of the bar, 10A-1—inserting hole diameter on a first end face of the transverse bar, 10A-2—inserting hole diameter on a second end face of the transverse bar facing the first end face, 42-1—first inserting hole, and 42-2—second inserting hole.

DETAILED DESCRIPTION

Reference will now be made in more detail to embodiments, examples of which are illustrated in the accompanying drawings, wherein like reference numerals refer to like elements throughout. In this regard, the present embodiments may have different forms and should not be construed as being limited to the descriptions set forth herein. Accordingly, the embodiments are merely described below, by referring to the figures, to explain aspects of the present description. As used herein, the term "and/or" includes any and all combinations of one or more of the associated listed items. Expressions such as "at least one of," when preceding a list of elements, modify the entire list of elements and do not modify the individual elements of the list. Further, the use of "may" when describing embodiments of the present invention refers to "one or more embodiments of the present invention."

Aspects of the present invention will be described in more detail in conjunction with the attached drawings.

Figure 2:
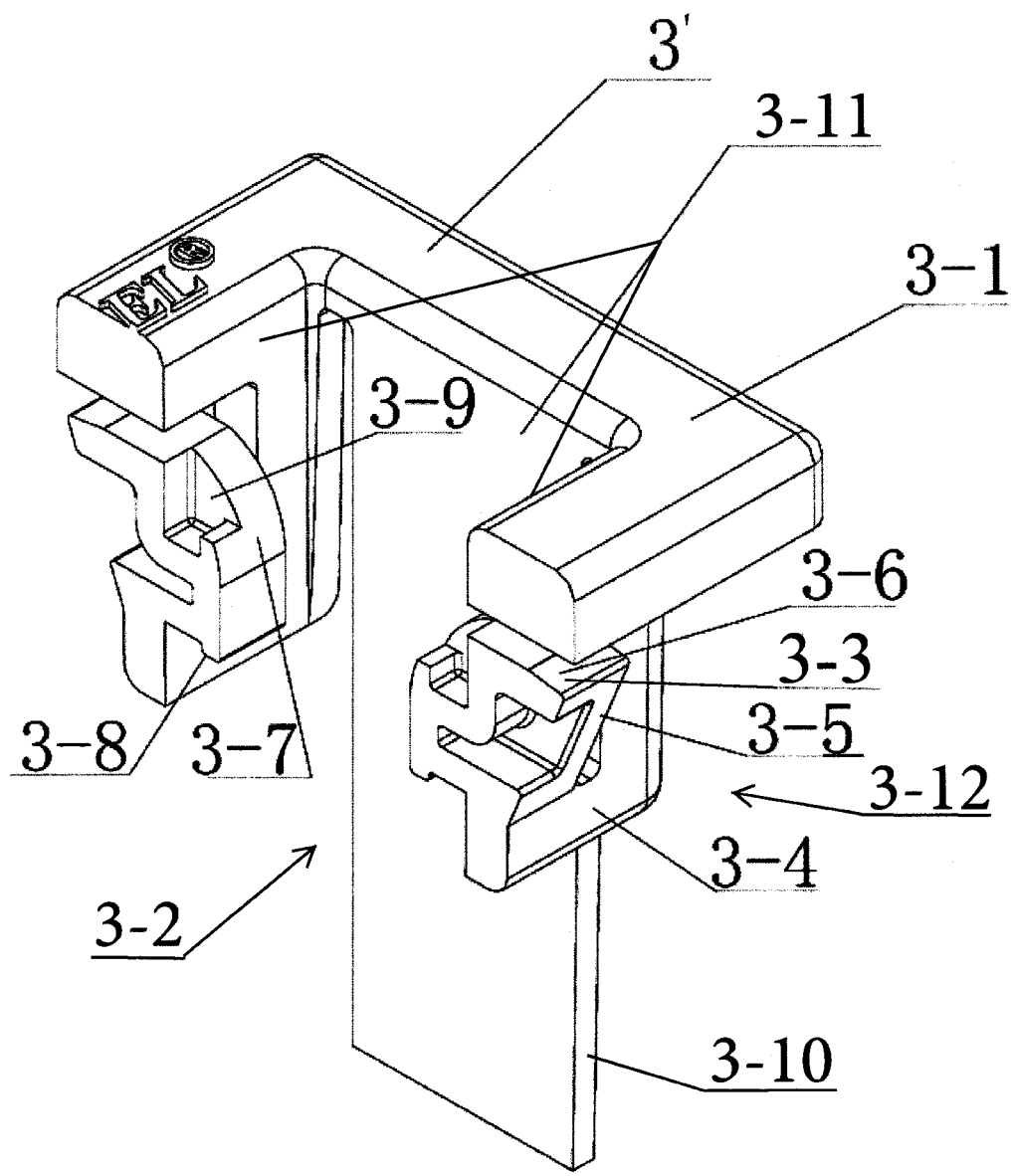
FIG. 2 is a schematic cross-sectional view of the clip according to an embodiment of the present invention.

According to an embodiment of the present invention, an elastic non-metal clip (see FIG. 2) for assembling the fence includes a main body 3' having an inner wall 3-11 and an outer wall 3-12, wherein a vertical bar inserting hole 3-2 is formed in the middle of the main body 3' surrounded by the inner wall and extends through the main body 3' from the upper end to the lower end; an outward extending flange 3-1 is formed at the upper end of the outer wall of the clip; a section which has an upper end face 3-3 and an inwardly inclined side face 3-5 that is inclined towards the inner wall of the clip from the upper edge (intersecting with the upper end face 3-3) to the lower edge is arranged on the outer wall below the flange; a section with a straight wall (e.g., a wall extending perpendicular to the upper end face of the clip) 3-4 is below the section with the inwardly inclined face 3-5, and an outer diameter of the section with the straight wall 3-4 is less than an outer diameter of the outward extending flange 3-1 at the upper end; a clamping groove 3-6 is formed between the upper end face 3-3 of the section with the inwardly inclined face 3-5 and the lower end face of the outward extending flange 3-1, and is matched with the thickness of a single wall 10-A of the transverse bar 10 (so that a single wall of the transverse bar can be inserted into and locked with the clamping groove); an inwardly protruding bump 3-7 is formed on the inner wall corresponding to the inwardly inclined face 3-5 on the outer wall; and the bump 3-7 extends from top to bottom in the form of an convex arc. The bump 3-7 is configured to be inserted into a clamping hole 9-1 on the vertical bar 9 (see FIG. 4); and the lower end face 3-8 of the bump 3-7 is configured to be propped against an orifice 9-3 of the clamping hole 9-1 on the vertical bar 9. The clip may further include one or more flat side walls 3-10 (without any bumps or inclined side faces) extending vertically from the lower end face of the outward extending flange 3-1. The one or more flat side walls 3-10 may protect the vertical bars from being scratched by the transverse bars during the assembly of the fence and may be the same length as, longer, or shorter than the length of the other sections of the clip.

The main body 3' may be made from plastic or rubber.

The clip may include at least one inwardly inclined face 3-5 on the outer wall below the flange 3-1 of the clip and at least one inwardly protruding bump 3-7 on the inner wall. An inwardly inclined face 3-5 on the outer wall below the flange 3-1 of the clip may be located at a location on the side wall of the clip corresponding to the location of an inwardly protruding bump 3-7 on the inner wall (see FIG. 2), or may be located at different locations on the side wall. In one embodiment, the clip includes two sections on two oppositely facing locations, each with an inwardly inclined face 3-5 on the outer wall below the flange 3-1 of the clip, and an inwardly protruding bump 3-7 on the inner wall at the location corresponding to the respective inwardly inclined face 3-5 on the outer wall. In another embodiment, the clip may include three or more sections with inwardly inclined face 3-5 on the outer wall below the flange 3-1 of the clip and three or more inwardly protruding bumps 3-7 on the inner wall.

The vertical bar inserting hole 3-2 in the middle of the main body 3' is to be engaged and locked with the vertical bar 9; the outer wall of the main body 3' is to be inserted into the inserting hole (also referred to as the mating hole) 10A of the transverse bar (see FIG. 1).

Figure 4:
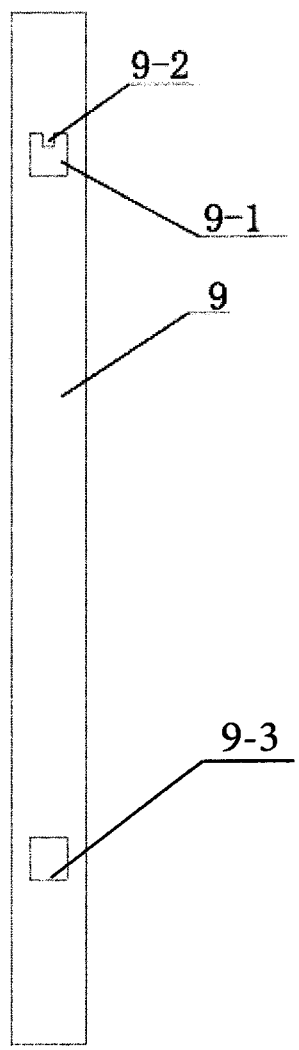
FIG. 4 is a schematic diagram of the hole-bearing side of a vertical bar according to an embodiment of the present invention.

A groove 3-9 is formed in the middle of the bump 3-7 on the inner wall of the main body 3' (see FIG. 2); and a tab 9-2 matched with the groove 3-9 in the middle of the bump 3-7 is formed on at least one clamping hole 9-1 of the vertical bar 9 (see FIG. 4).

According to another embodiment of the present invention, an assembled fence includes a transverse bar 10, a vertical bar 9, and a clip 3 according to the previously described embodiments (see FIG. 1).

The transverse bar 10 may have a plurality of inserting holes 10-A spaced apart along the longitudinal direction corresponding to the number of vertical bars to be connected with. In one embodiment, the transverse bar 10 may be a hollow bar having a wall formed of a suitable material. Here, the hollow transverse bar 10 may have a first inserting hole and a second inserting hole facing the first inserting hole in a vertical direction (i.e., aligned vertically with the first inserting hole) to allow a vertical bar to pass through both during the assembly (see FIG. 1). The thickness of the transverse bar wall matches that of the clamping groove 3-6 of the clip. In another embodiment, the transverse bar may have only the first inserting hole without the second inserting hole aligned vertically with the first inserting hole. Such transverse bars are suitable for places where the vertical bars are not intended to pass through the transverse bar, such as the top most or the lowest transverse bar in a fence.

Figure 5:
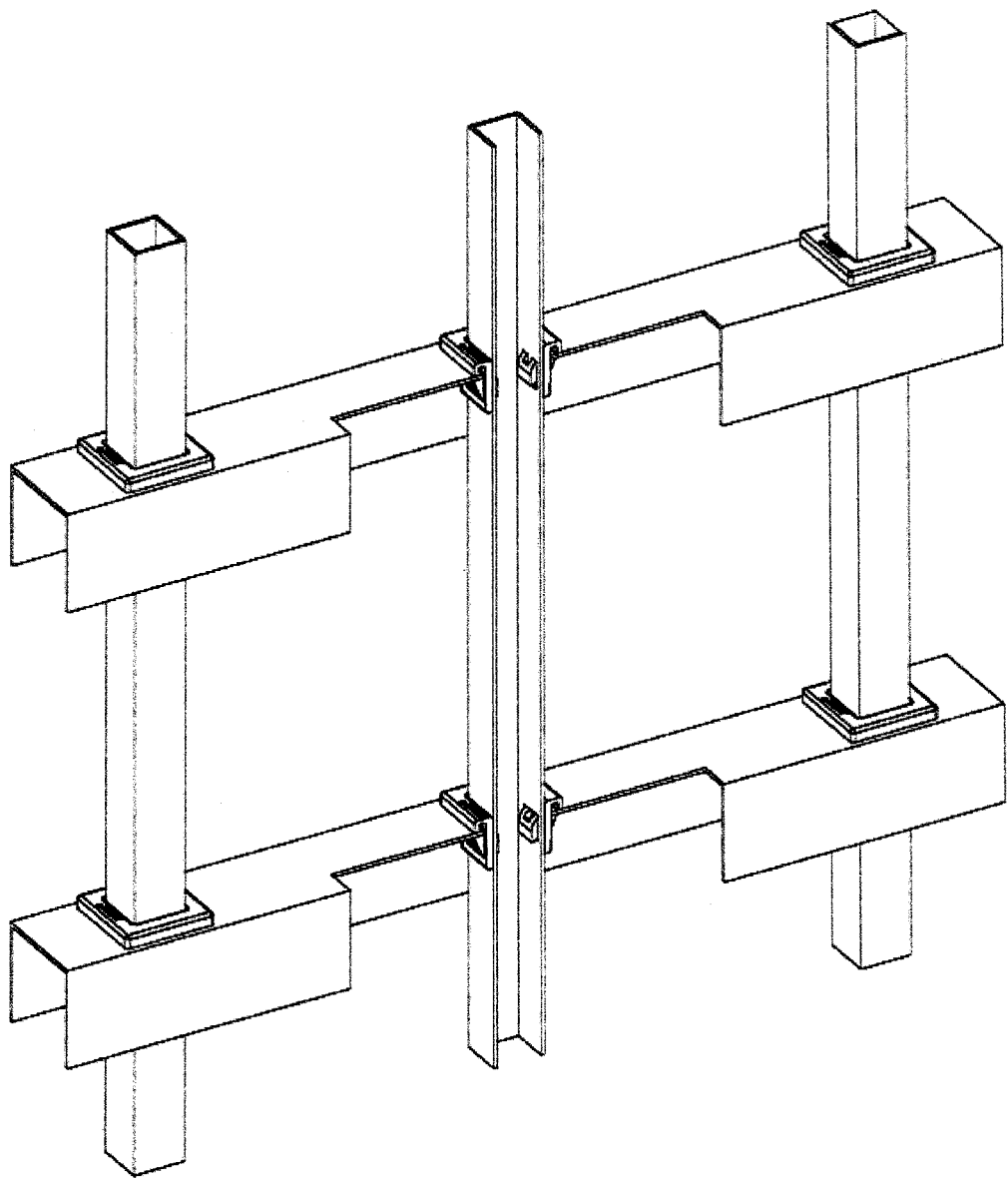
FIG. 5 is a schematic diagram showing the connection of the vertical bar, the transverse bar and the clip when the cross section of the transverse bar is in an inverted U-shape in an assembly according to an embodiment of the present invention.

The cross section of the transverse bar 10 may be in an inverted U-shape (see FIG. 5). Here, the inserting hole on the side (e.g., the upper side) corresponding to the bottom of the U-shape is matched with the size of the clip, and the opening on the side (e.g., the lower side) facing the bottom of the U-shape allows adjustment to the angle between the transverse bar and the vertical bar to deviate from 90 degree when needed. Such a configuration allows for the assembled fence to adapt to any uneven surface that it is installed upon.

Figure 3:
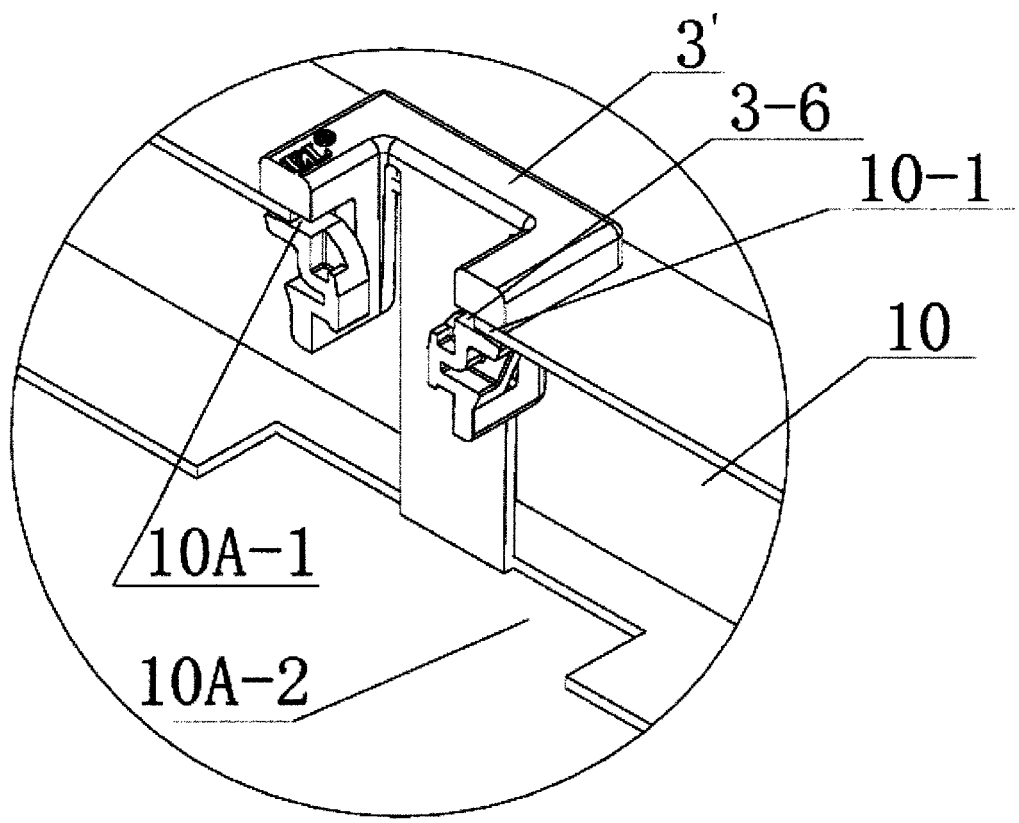
FIG. 3 is a schematic diagram showing the assembly of the clip and the transverse bar according to an embodiment of the present invention.

The cross section of the transverse bar 10 may be in a rectangle shape, where the inserting hole diameter 10A-1 on a first end face of the inserting hole 10A of the transverse bar 10 may be smaller than the inserting hole diameter 10A-2 on a second end face facing the first end face (see FIG. 3). Such a configuration allows for the assembled fence to adapt to any uneven surface that it is installed upon, as the size of the inserting hole 10A-1 is matched with the size of the clip, the bigger inserting hole 10A-2 facing the first inserting hole 10A-1 allows adjustment to the angle between the transverse bar and the vertical bar to deviate from 90 degree when needed. When the transverse bar is the upper most or lowest transverse bar, only one of the inserting hole 10A-1 or 10A-2 may be needed, and the other end face (opposite to the end face with the inserting hole) may not have a hole.

The vertical bar may have a hole bearing side including a plurality of clamping holes 9-1 aligned vertically and spaced apart. For example, the vertical bar may have a number of (e.g., two) clamping holes 9-1 on one hole bearing surface corresponding to the number of (e.g., two) transverse bars to be connected with the vertical bar. In one embodiment, the vertical bar is a hollow bar and has a first hole bearing side and a second hole bearing side facing the first hole bearing side. The plurality of clamping holes 9-1 may have the same configuration, or different. For example, the top most clamping hole 9-1 may have a tab 9-2 extending downward from its upper edge, while other clamping holes 9-1 do not have such a tab (see FIG. 4).

Herein after, a method of assembling a fence according an embodiment of the present invention is described in more detail.

During assembly, the outer wall of the main body 3' (e.g., the section with the straight wall) is aligned with the inserting hole 10A of the transverse bar and is inserted downwards. The hole wall of the inserting hole 10A of the transverse bar then comes in contact with the inwardly inclined face 3-5 on the outer wall of the main body 3'; and the inwardly inclined face 3-5 is squeezed inwards by the hole wall of the inserting hole 10A of the transverse bar to satisfy the downward movement of the main body 3'. When the main body 3' is moved downwards to the clamping groove 3-6 (i.e., the clamping groove 3-6 comes in contact with the hole wall of the inserting hole 10A), the squeezed inclined face 3-5 is released by the hole wall of the inserting hole 10A of the transverse bar, so that the inclined face 3-5 pops out (of the squeezed state) and enters into a hollow cavity in the middle of the transverse bar; a side wall (e.g., a single side wall) 10-1 of the transverse bar 10 and the clamping groove 3-6 are then engaged and locked (i.e., the side wall 10-1 is inserted into the clamping groove 3-6), at which time, the side wall 10-1 of the transverse bar 10 keeps an upward and downward locked relationship with the main body 3' due to the function of the clamping groove 3-6, so that the main body 3' cannot move upward or downward, to keep the non-metal (e.g., rubber) clip and transverse bar fixed to each other. Here, the thickness of the hole wall of the inserting hole matches the gap of the clamping groove; the shape of the inserting hole matches that of the clip; and the outer diameter of the inserting hole is slightly bigger than that of the section with the straight wall, but smaller than that of the outward extending flange or that of the upper end face 3-3 of the section with the inwardly inclined face. Therefore, once the side wall of the transverse bar is engaged in the clamping groove and being sandwiched between the upper end face 3-3 of the section with the inwardly inclined face 3-5 and the lower end face of the outward extending flange 3-1, the transverse bar and the clip are locked to each other.

The vertical bar 9 (e.g., a vertical bar 9 having an upper clamping hole 9-1 and a corresponding lower clamping hole 9-1) is inserted in the vertical bar inserting hole 3-2 of the main body 3'; the hole bearing side of the vertical bar contacts with an inner surface of the main body 3' with the inwardly protruded bump 3-7, and the hole bearing side contacts with the cambered surface of the bump 3-7 on the inner wall of the main body 3'; and the bump 3-7 of the main body 3' is squeezed (or pushed) towards the two sides (outwardly), so that the vertical bar 9 moves downwards smoothly.

When the vertical bar 9 is inserted downwards to a position so that the clamping hole 9-1 (e.g., the lower clamping hole 9-1) of the vertical bar is just matched with the position of the bump 3-7 of the main body 3', the bump 3-7 of the main body 3' is released by the hole bearing side of the vertical bar (i.e., the bump 3-7 is released from the squeezed state as its position matches that of the clamping hole 9-1), so that the bump 3-7 pops out (or pops inwardly) and enters into the clamping hole 9-1 (e.g., the lower clamping hole 9-1) of the vertical bar 9.

When the vertical bar 9 is further inserted downwards, the hole bearing side of the vertical bar (e.g., the upper edge of the lower clamping hole 9-1) comes into contact with the cambered surface of the bump 3-7 on the inner wall of the main body 3' and the bump 3-7 is squeezed once again (e.g., by the upper edge of the lower clamping hole 9-1) to move out of the clamping hole 9-1 of the vertical bar 9. When the second vertical bar clamping hole 9-1 (e.g., the upper clamping hole 9-1) is just matched with (reaches the position of) the bump 3-7 on the inner wall of the main body 3', the hole bearing side of the vertical bar is released from the squeezed state, so that the bump 3-7 on the inner wall of the main body 3' pops up and enters into the second vertical bar clamping hole 9-1, at which time, the tab 9-2 on the second vertical bar clamping hole 9-1 keeps a downward locking relation with the groove 3-9 in the middle of the bump 3-7 on the inner wall of the main body 3', so that the vertical bar cannot be continuously inserted downwards; and an orifice 9-3 (e.g., a lower edge) of the second vertical bar clamping hole 9-1 keeps an upward locking relation with the lower end face 3-8 of the bump 3-7 on the inner wall of the main body 3', so that the vertical bar cannot be pulled upwards, thus keeping a locked relation between the main body 3' and the vertical bar 9. Here, the vertical bar may have a number of inserting holes corresponding to the number of transverse bars to be connected with. Only one of the inserting holes needs to have the tab, such as the upper most inserting hole. However, the arrangement of the inserting holes and the tabs are not limited thereto. For example, the lowest inserting hole may have the tab.

The assembled fence may have various combination of number of transverse bars and vertical bars. For example, the assembled fence may have one transverse bar on the top end of the fence and one transverse bar on the bottom end of the fence; two transverse bars on the top end of the fence and one transverse bar on the bottom end of the fence; one transverse bar on the top end of the fence and two transverse bars on the bottom end of the fence; or two transverse bars on the top end of the fence and two transverse bars on the bottom end of the fence. The top most and/or the bottom transverse bar may have two inserting hole bearing sides facing each other with inserting holes vertically aligned to allow the vertical bars to pass through and extend beyond the top most and/or the bottom transverse bar; or the top most and/or the bottom transverse bar may have only one inserting hole bearing side and does not allow the vertical bars to pass through and extend beyond the top most and/or the bottom transverse bar.

According to embodiments of the present invention, in addition to connecting a transverse bar with a vertical bar, the elastic non-metal clip is also suitable for connecting the transverse bar and the vertical bar in the fence door to the door frame, as well as for connecting the fence to the post, as shown in FIGS. 6-13 respectively.

Figure 6:
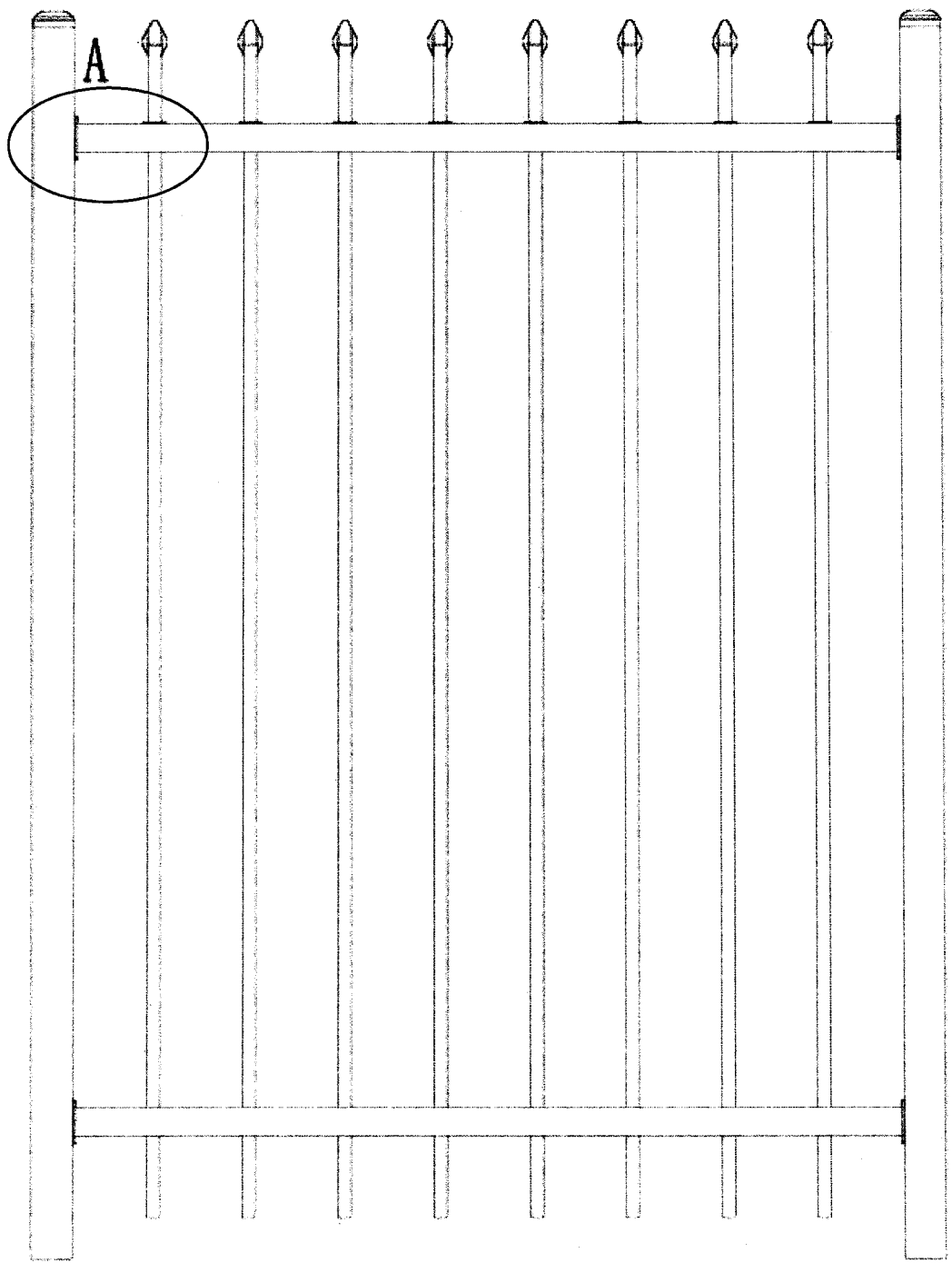
FIG. 6 is a schematic diagram of the structure of a fence door.
Figure 7:
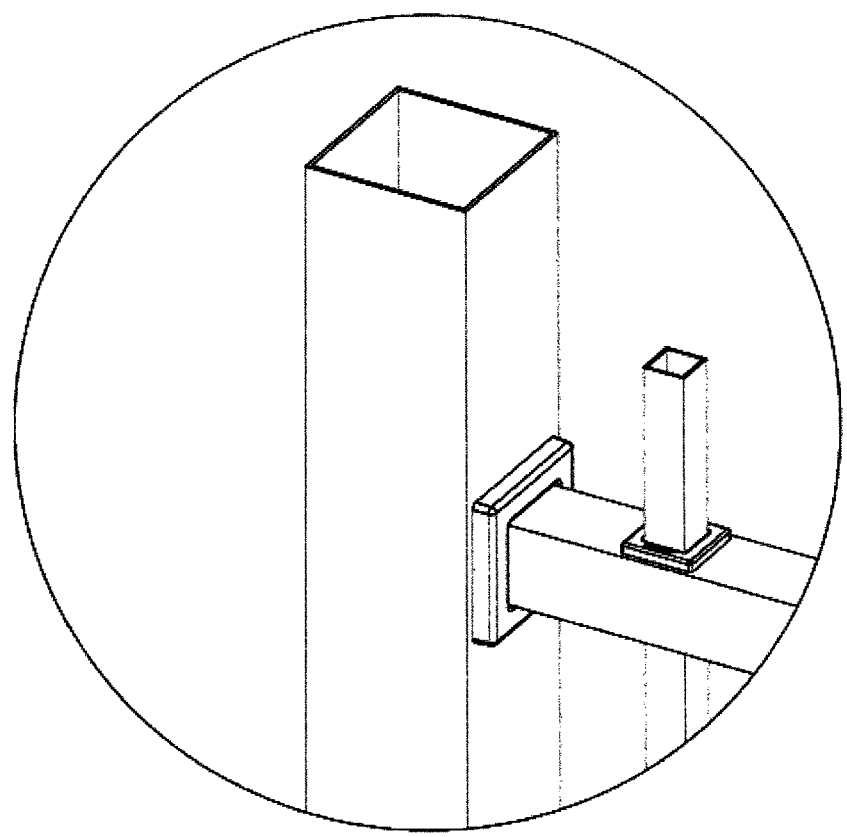
FIG. 7 is a partial enlarged view of part A of FIG. 6.
Figure 8:
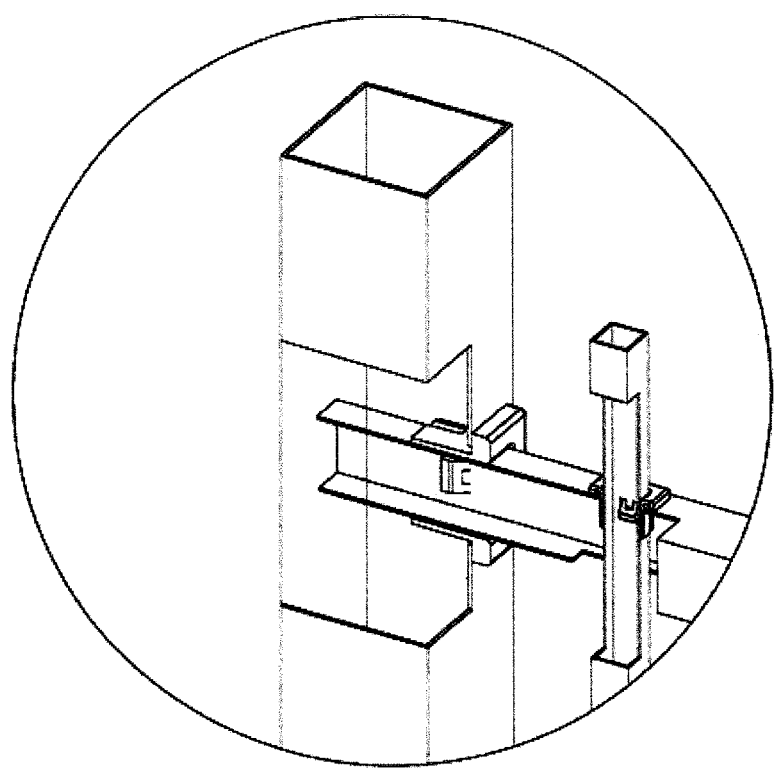
FIG. 8 is a partial cross-section view of part A of FIG. 7.
Figure 9:
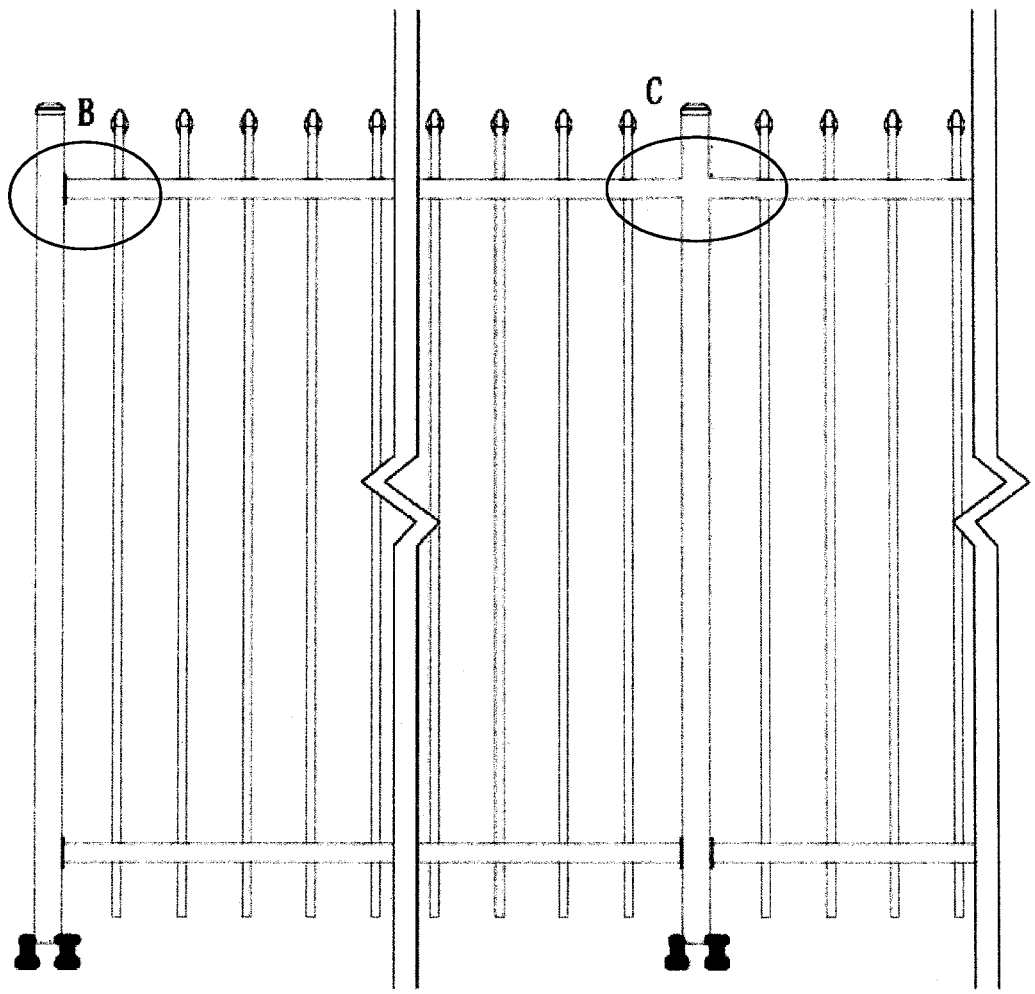
FIG. 9 is a schematic diagram of a fence structure including posts.
Figure 10:
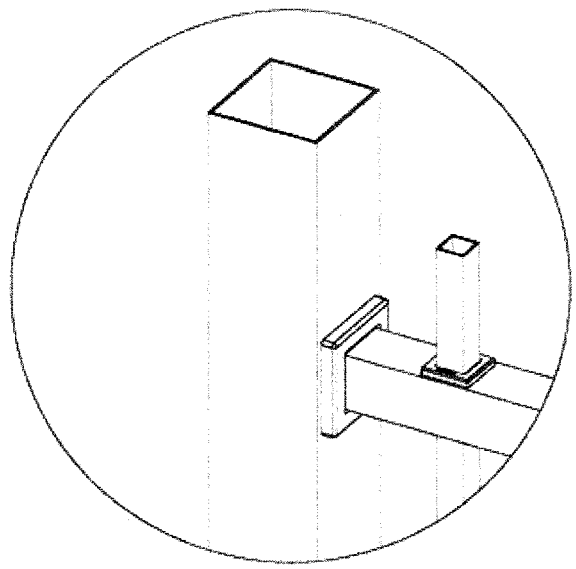
FIG. 10 is a partial enlarged view of part B of FIG. 9.
Figure 11:
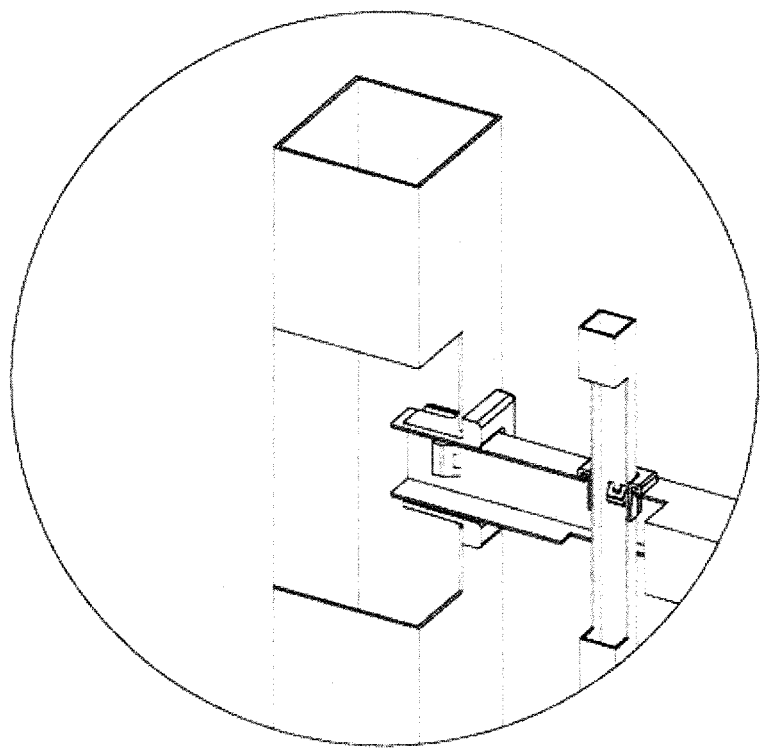
FIG. 11 is a partial cross-section view of part B of FIG. 10.
Figure 12:
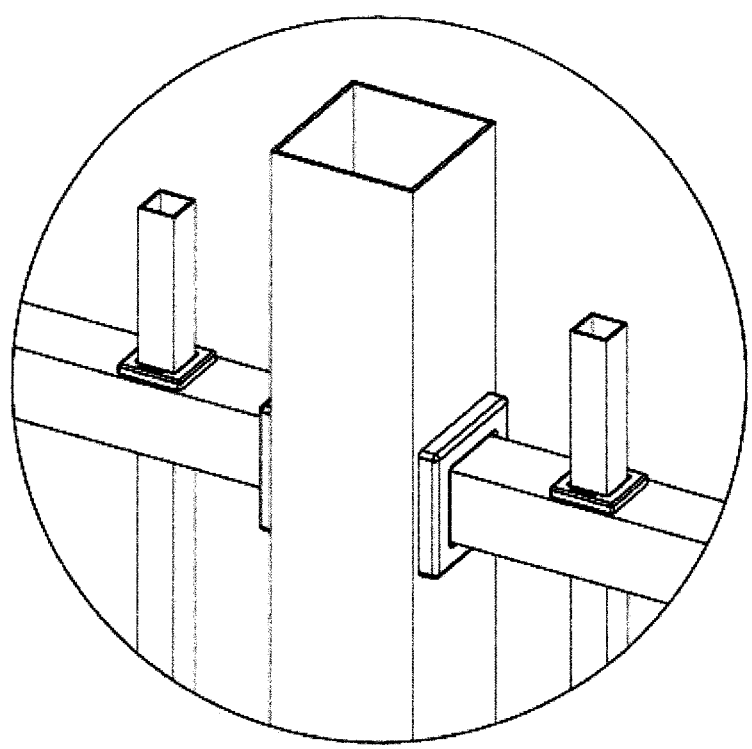
FIG. 12 is a partial enlarged view of part C of FIG. 9.
Figure 13:
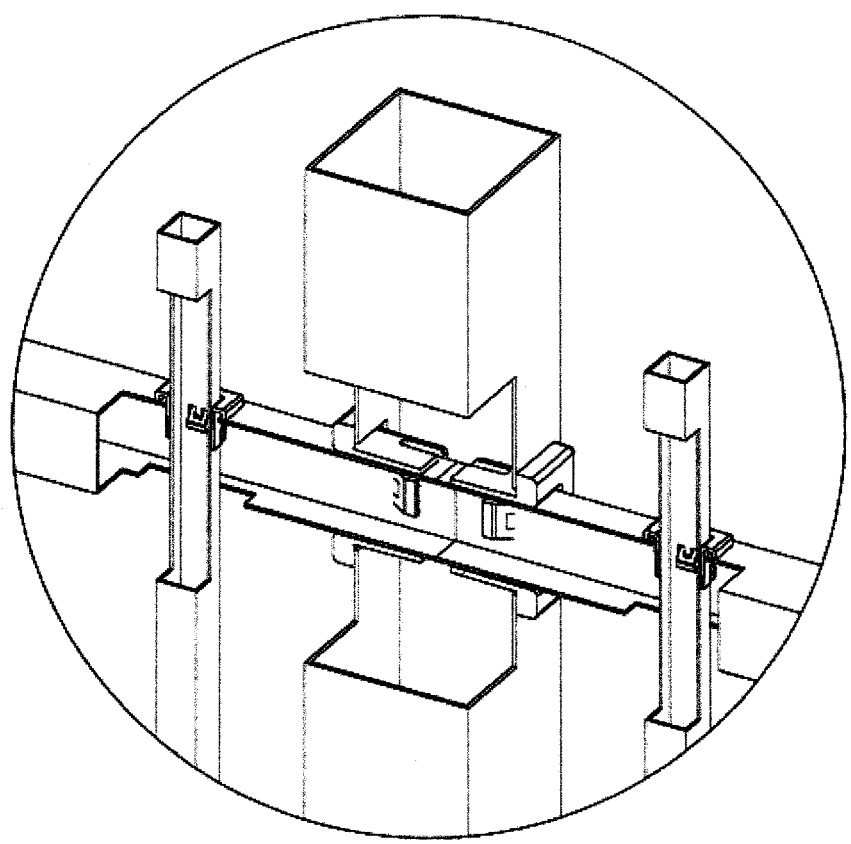
FIG. 13 is a partial cross-section view of part C of FIG. 12.
Figure 14:
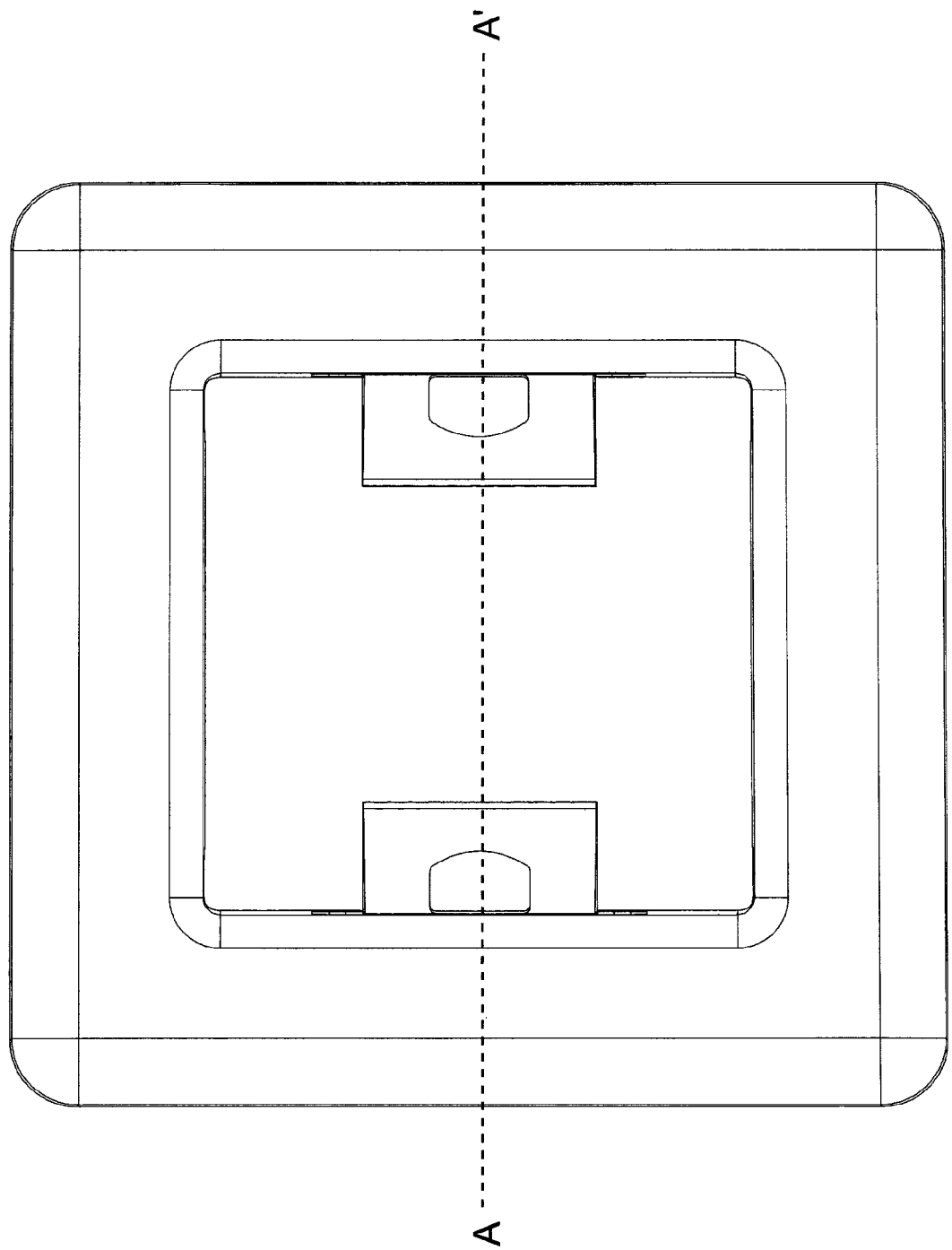
FIGS. 14-20 show various views of a rectangular clip according to one embodiment of the present invention, where
Figure 15:
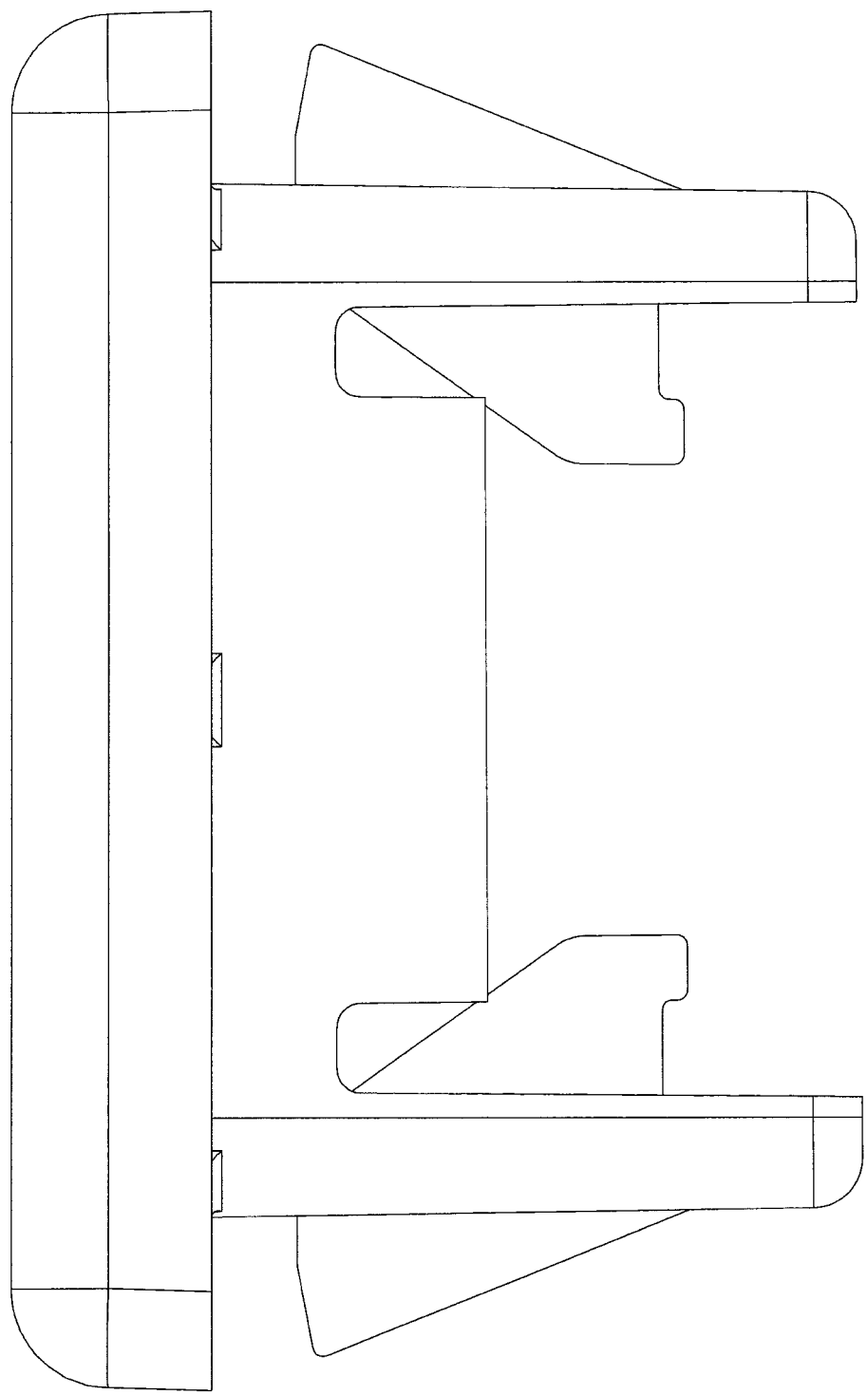
Figure 16:
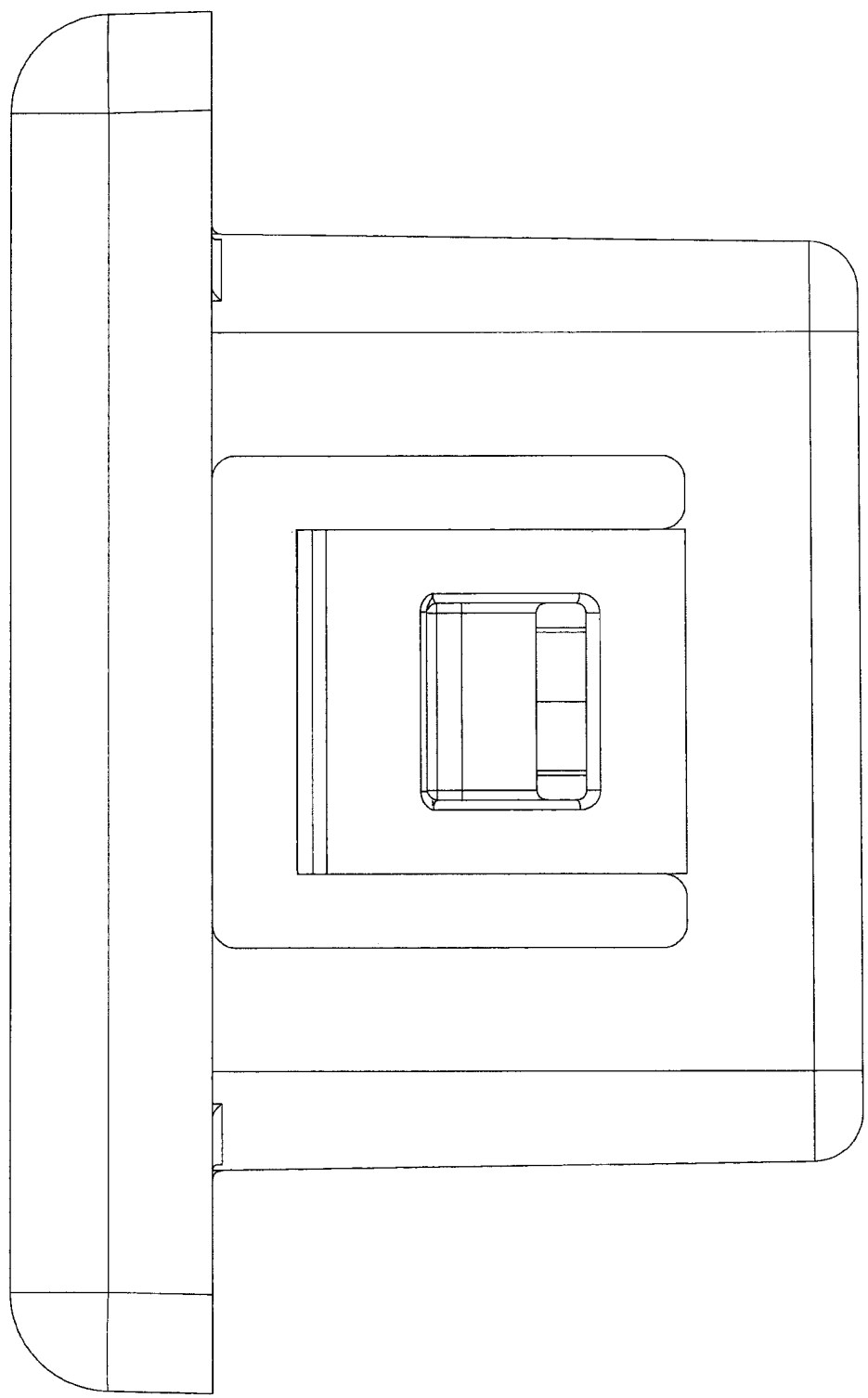
Figure 17:
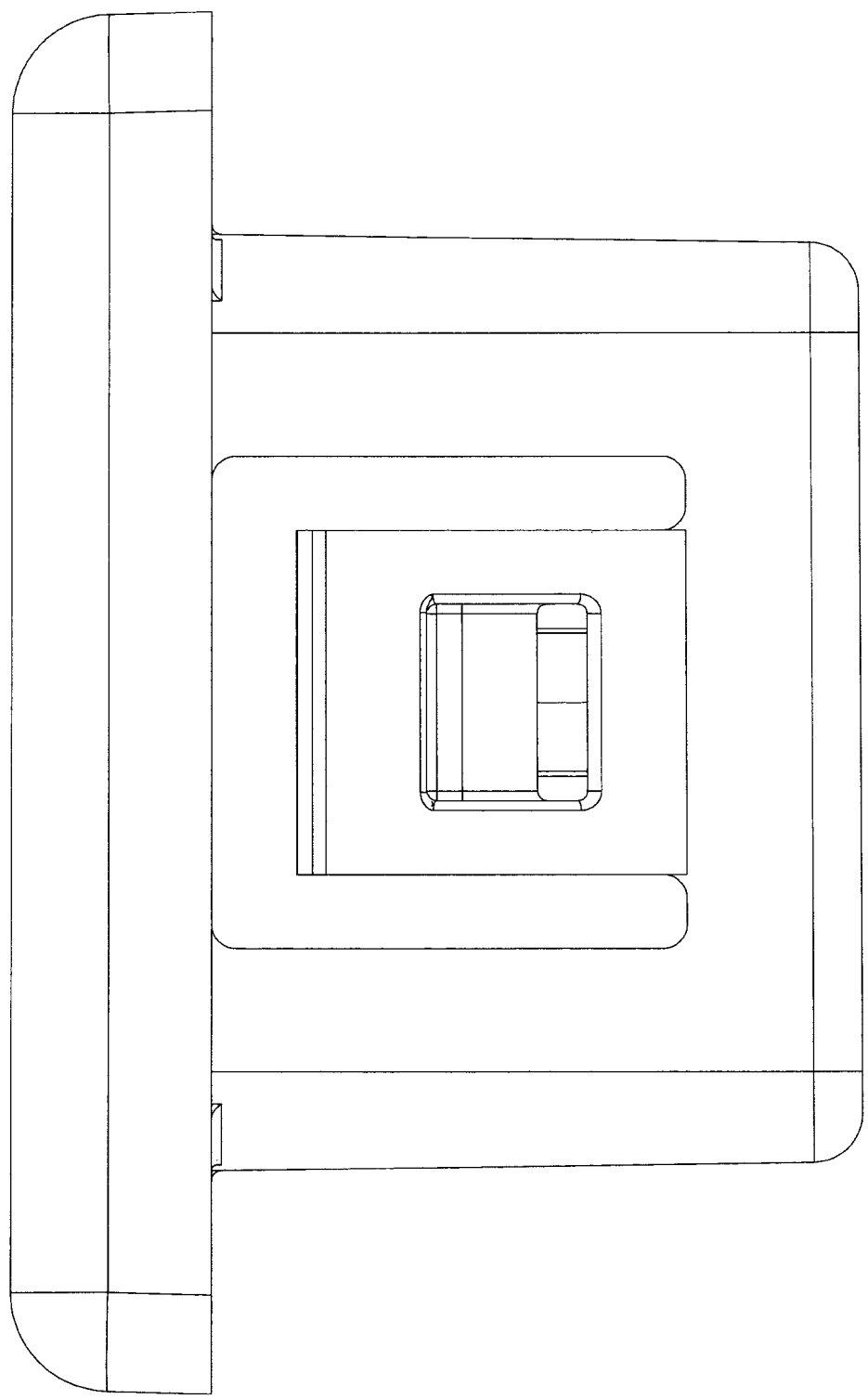
Figure 18:
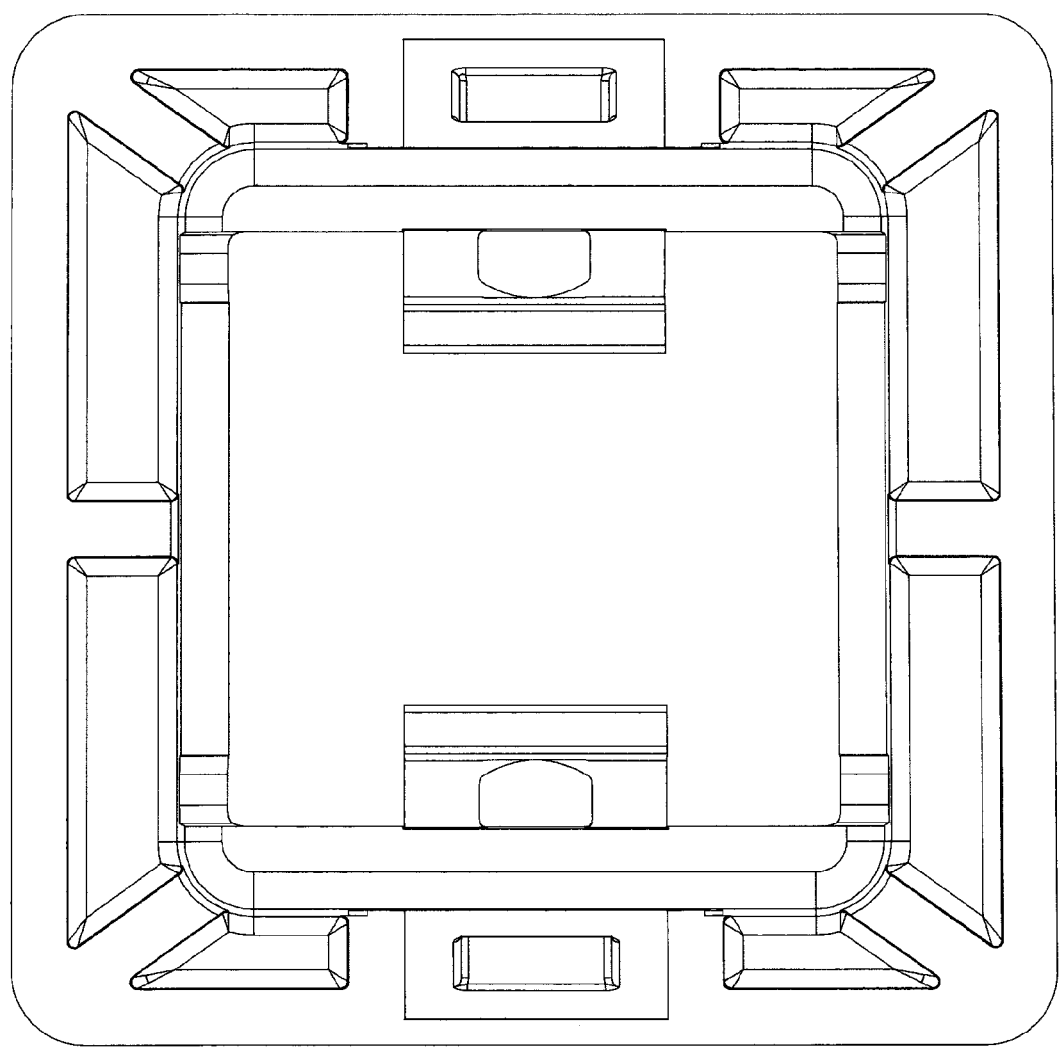
Figure 19:
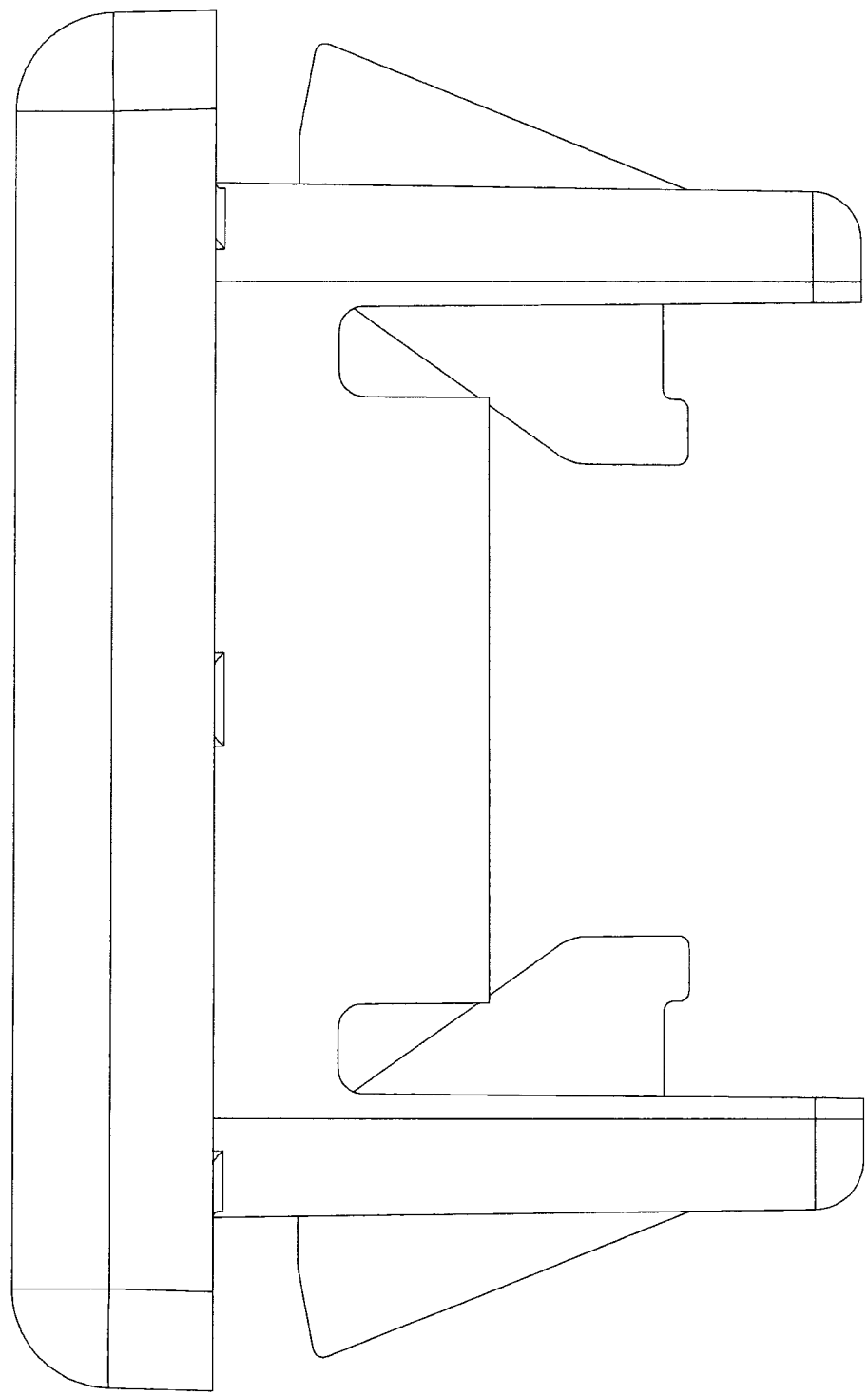
Figure 20:
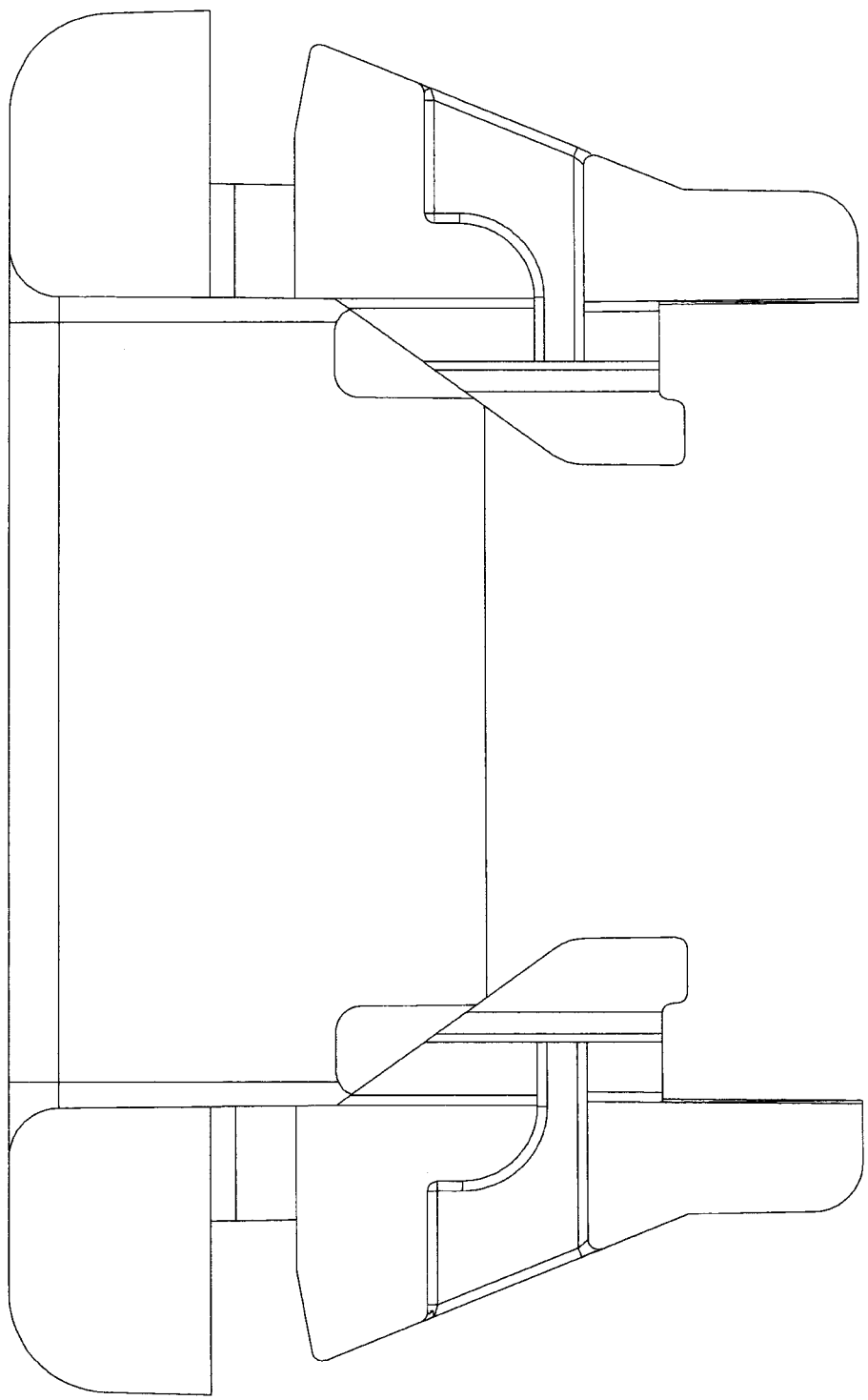
Figure 21:
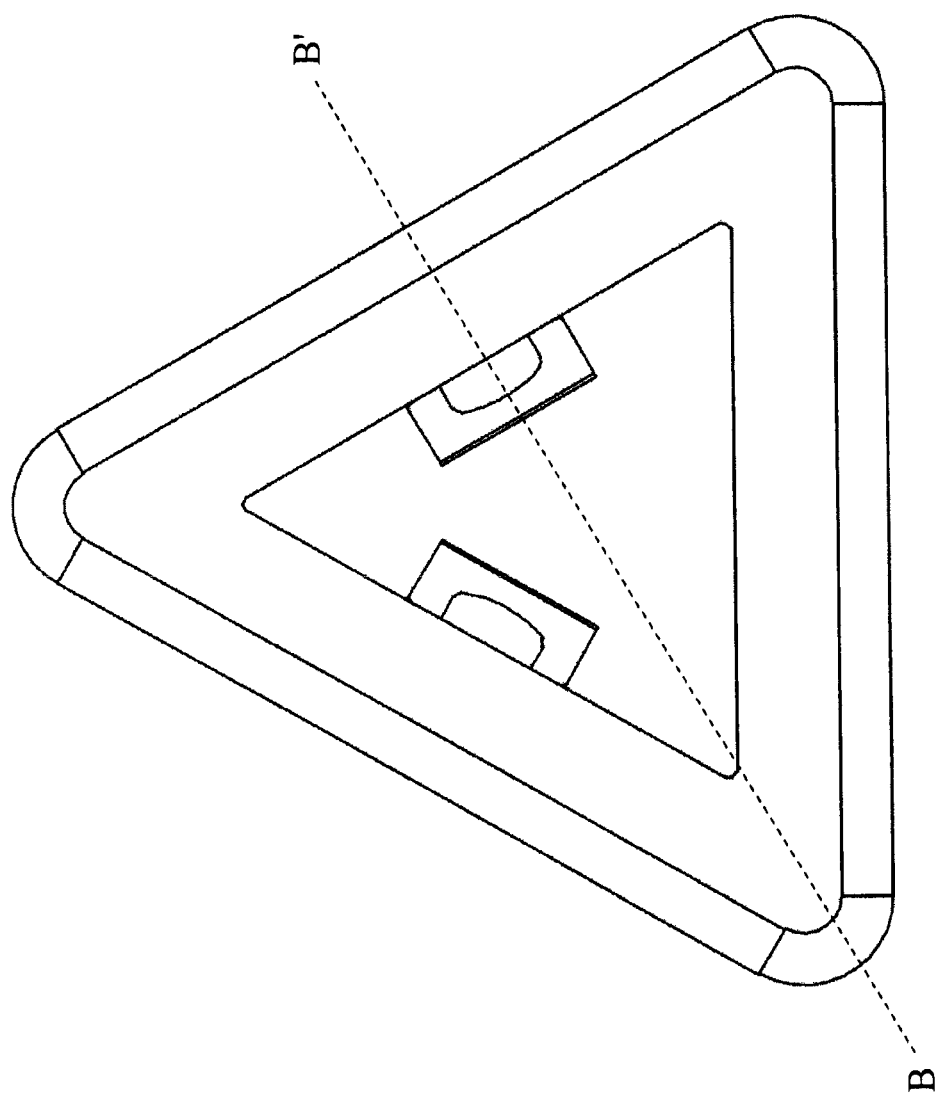
FIGS. 21-27 show various views of a triangular clip according to one embodiment of the present invention, where
Figure 22:
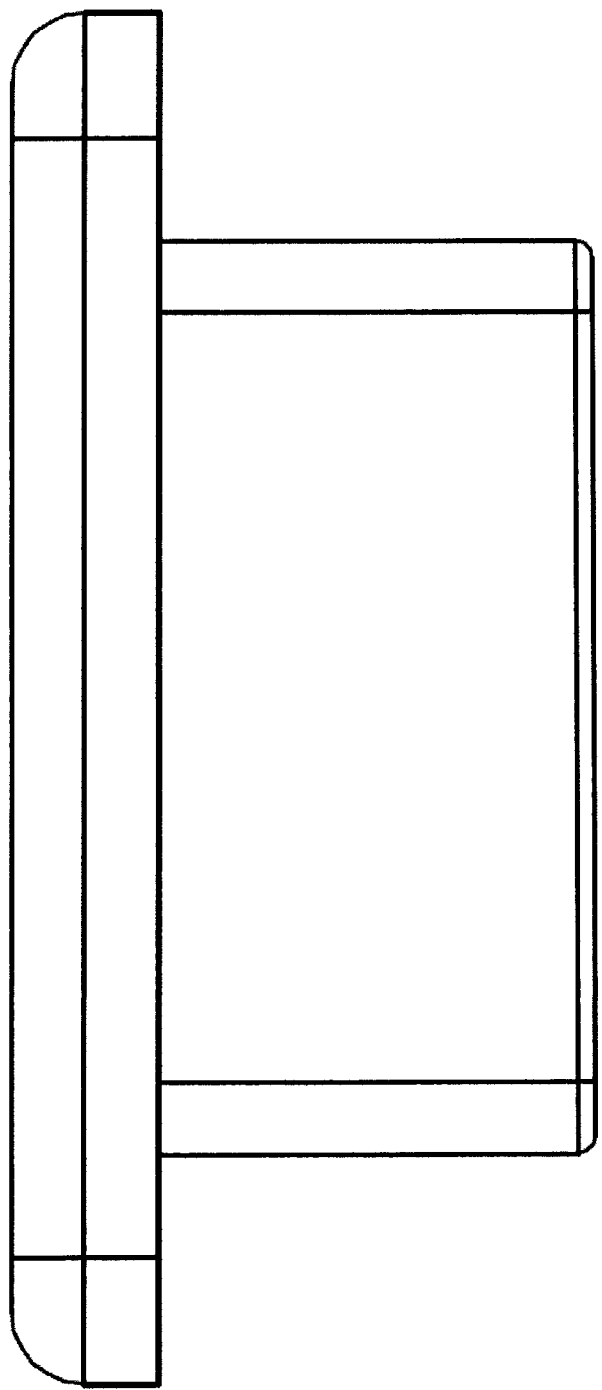
Figure 23:
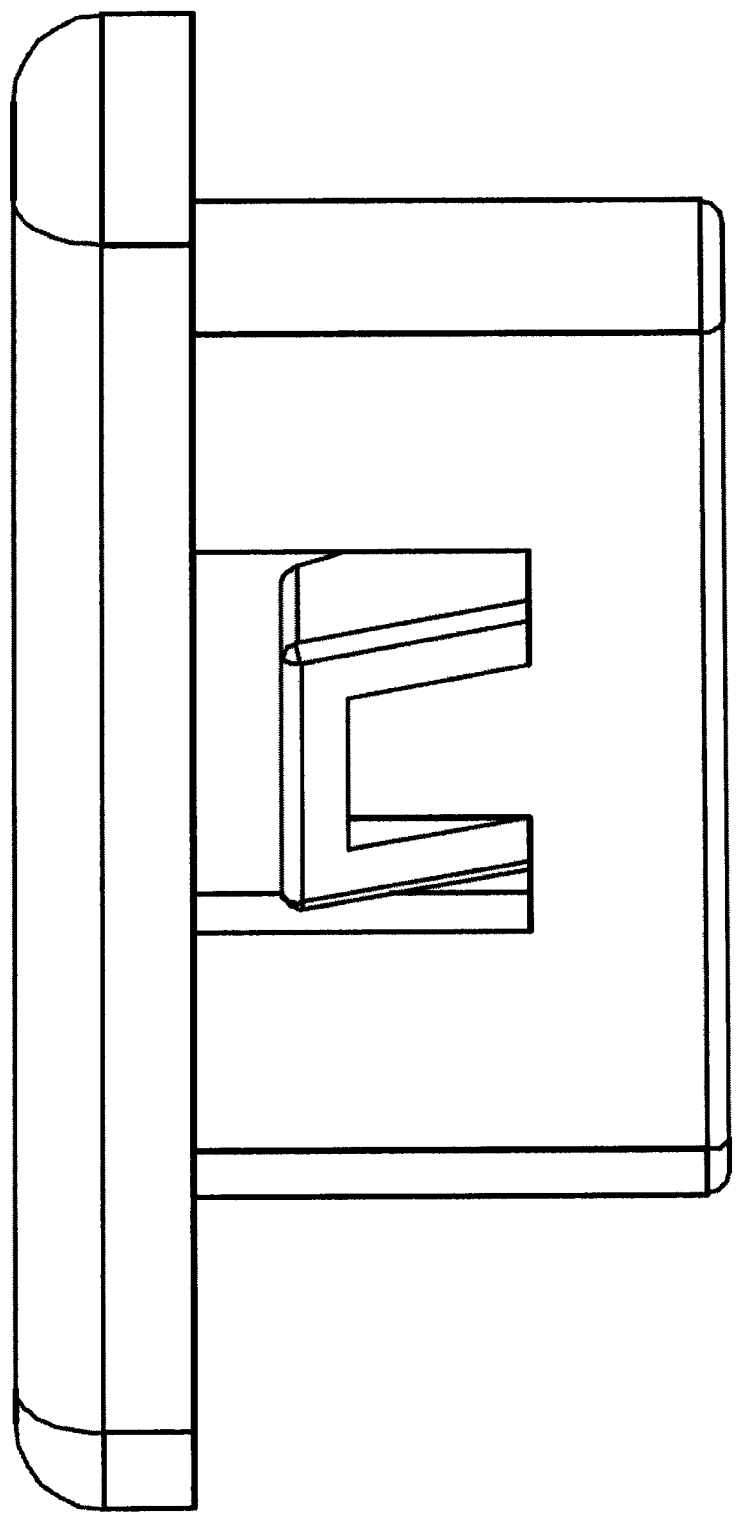
Figure 24:
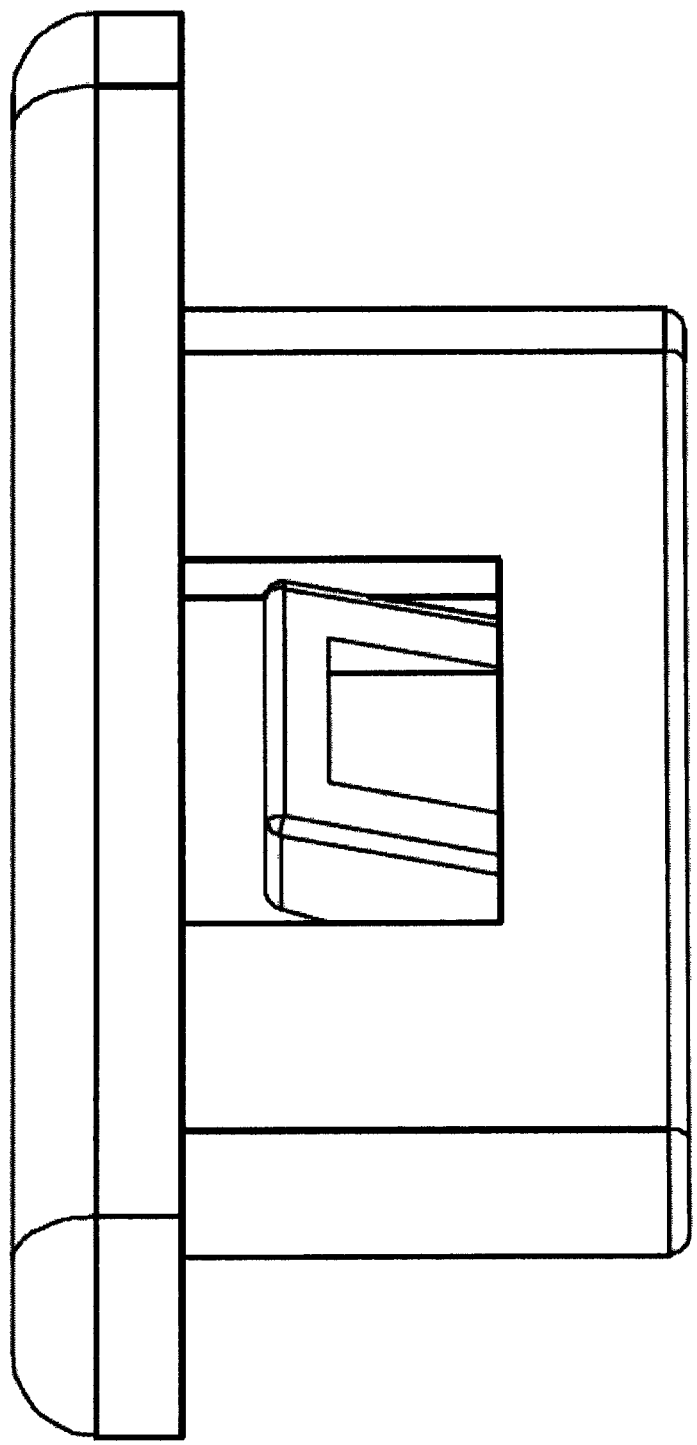
Figure 25:
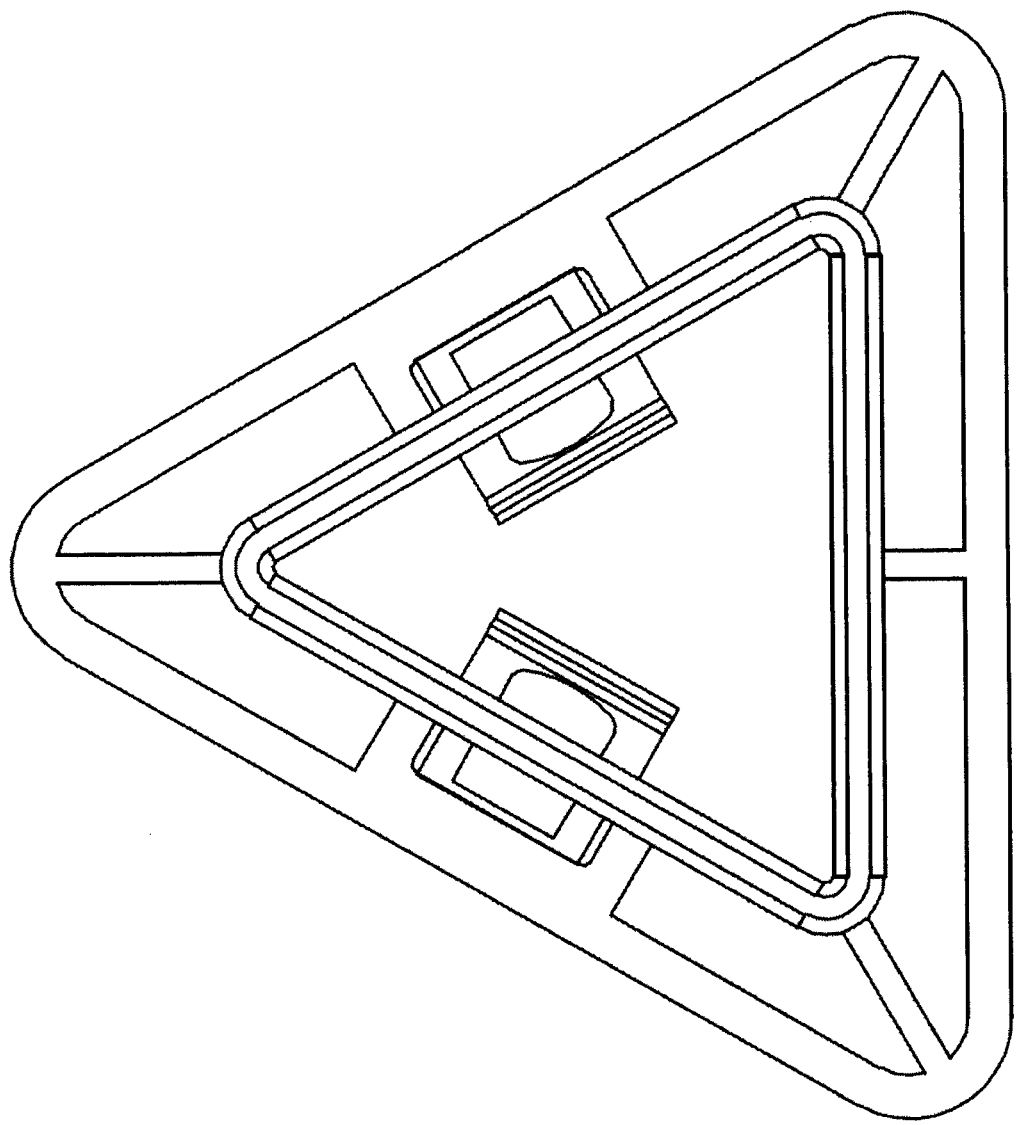
Figure 26:
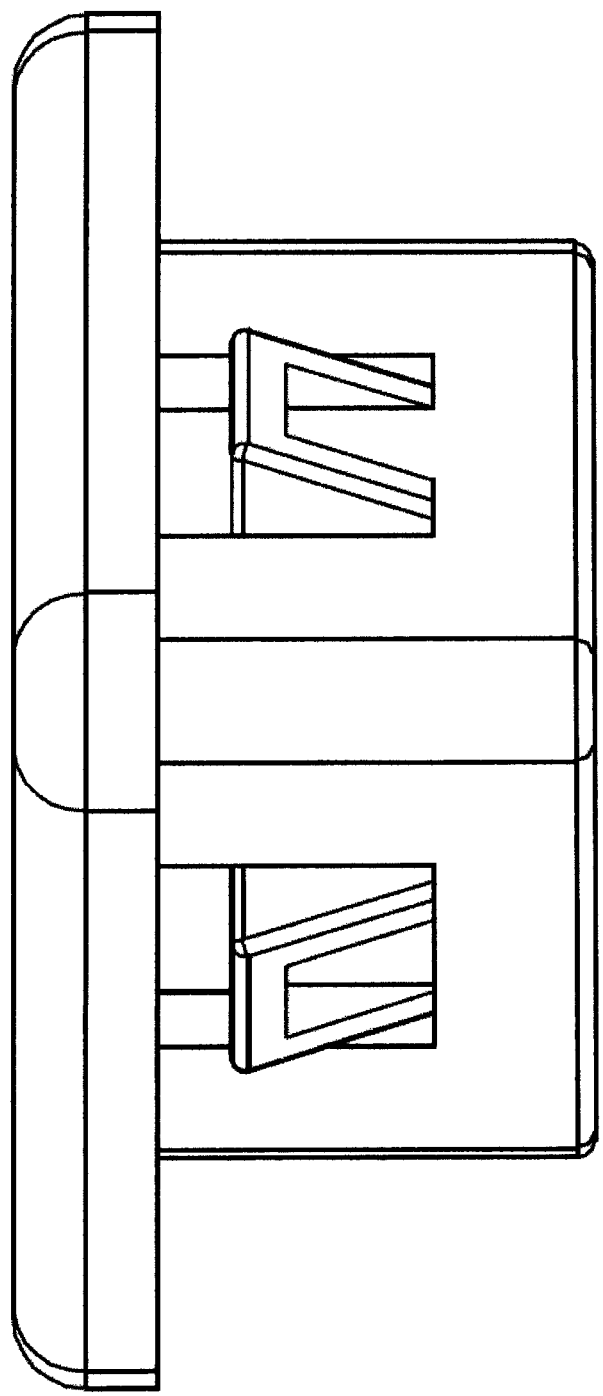
Figure 27:
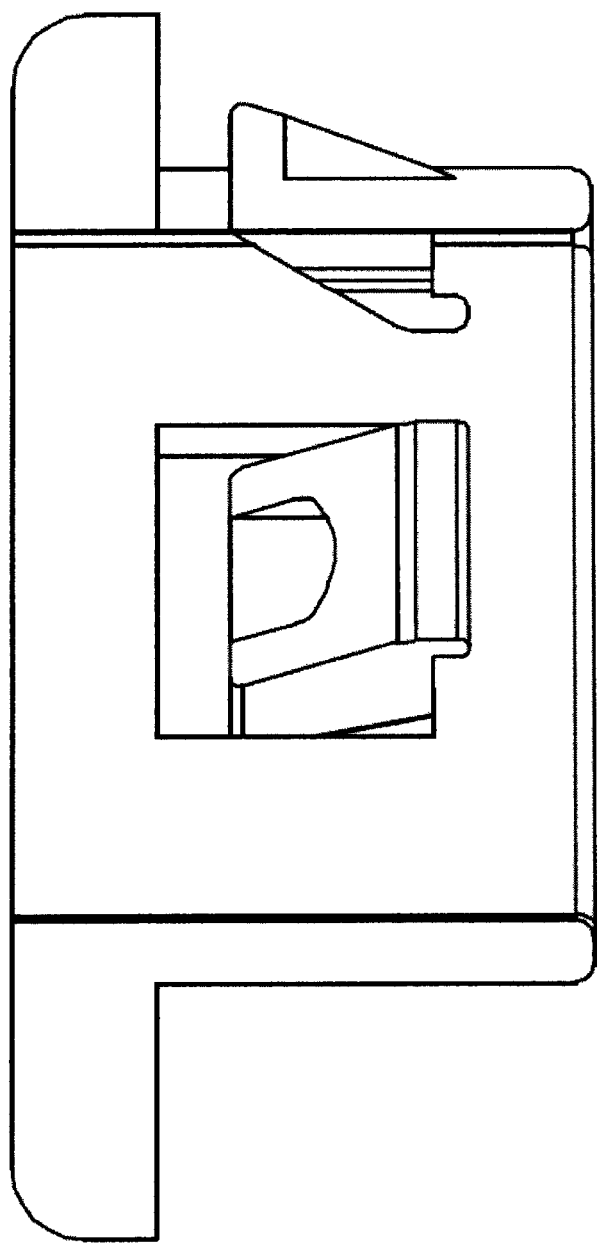
Figure 28:
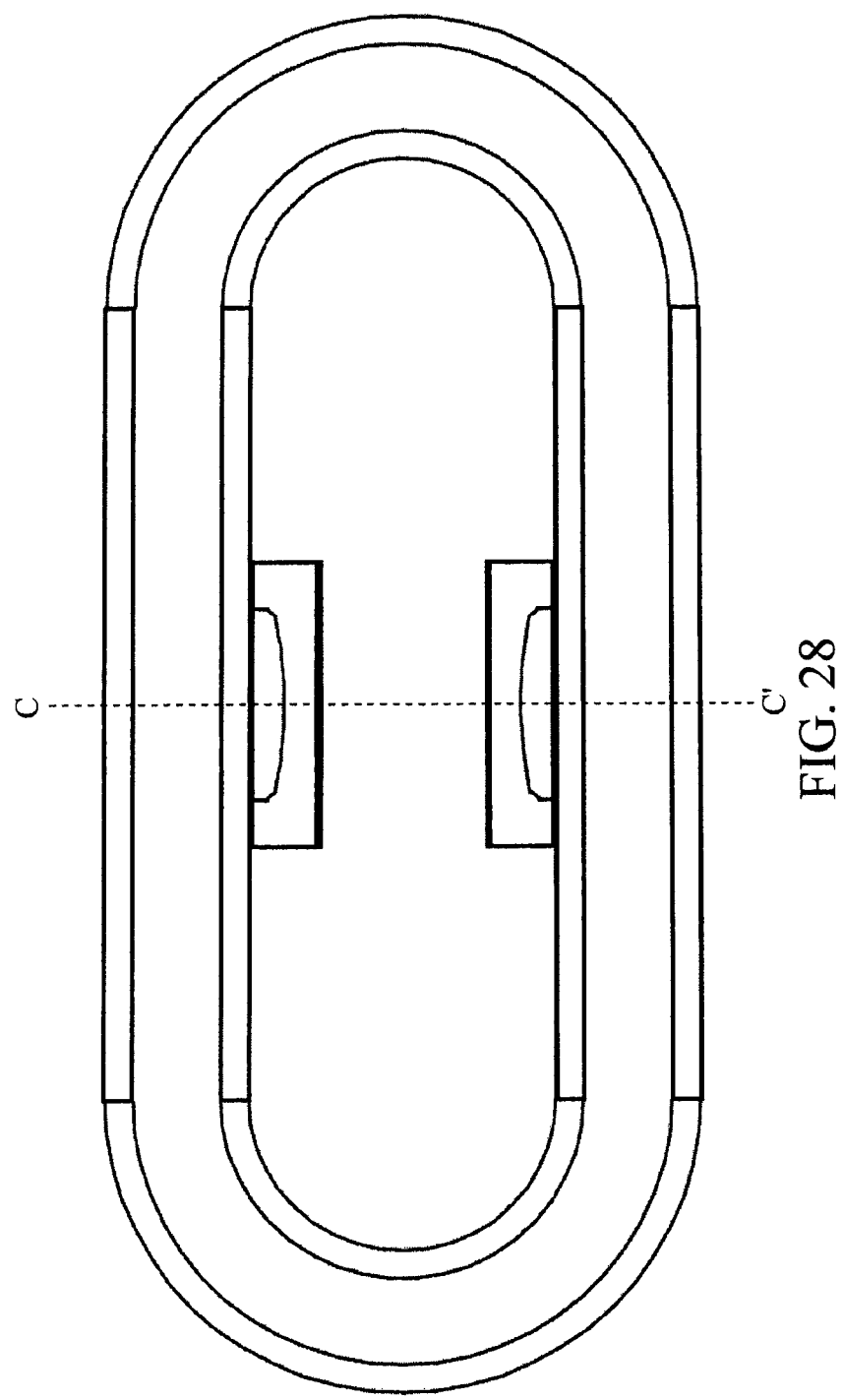
FIGS. 28-34 show various views of an oval clip according to one embodiment of the present invention, where
Figure 29:
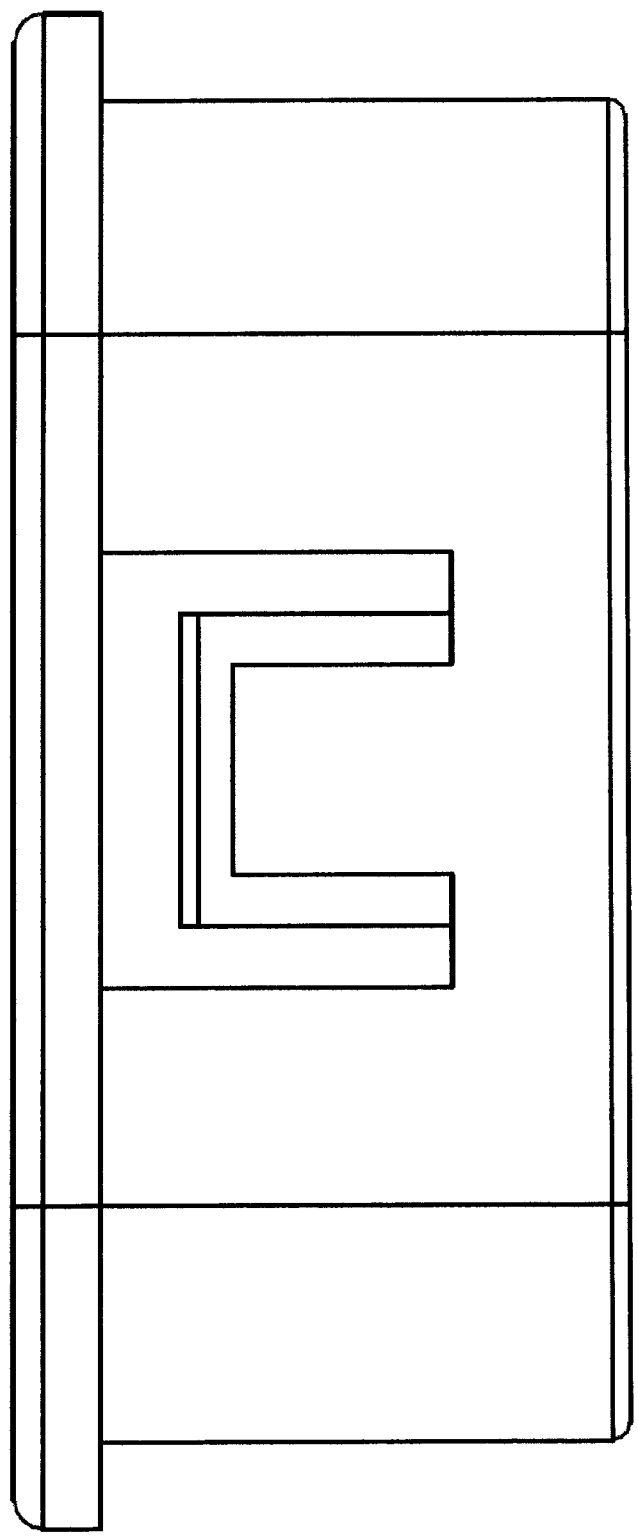
Figure 30:
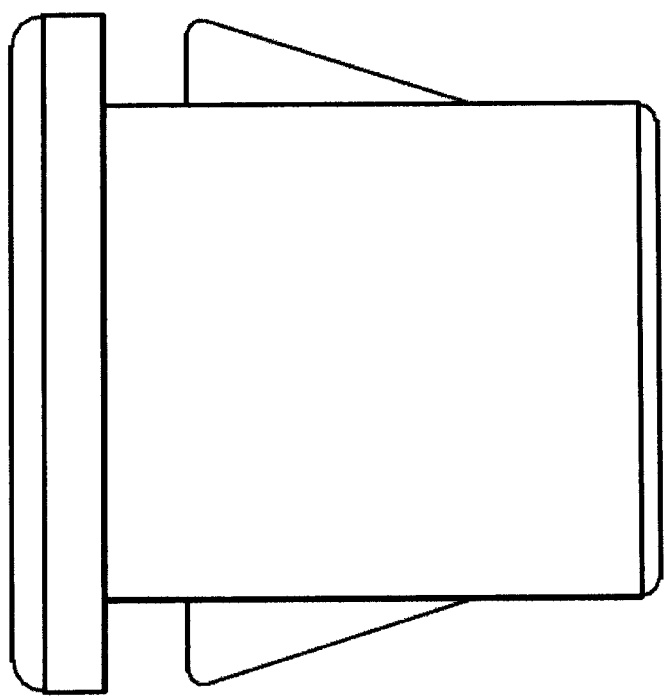
Figure 31:
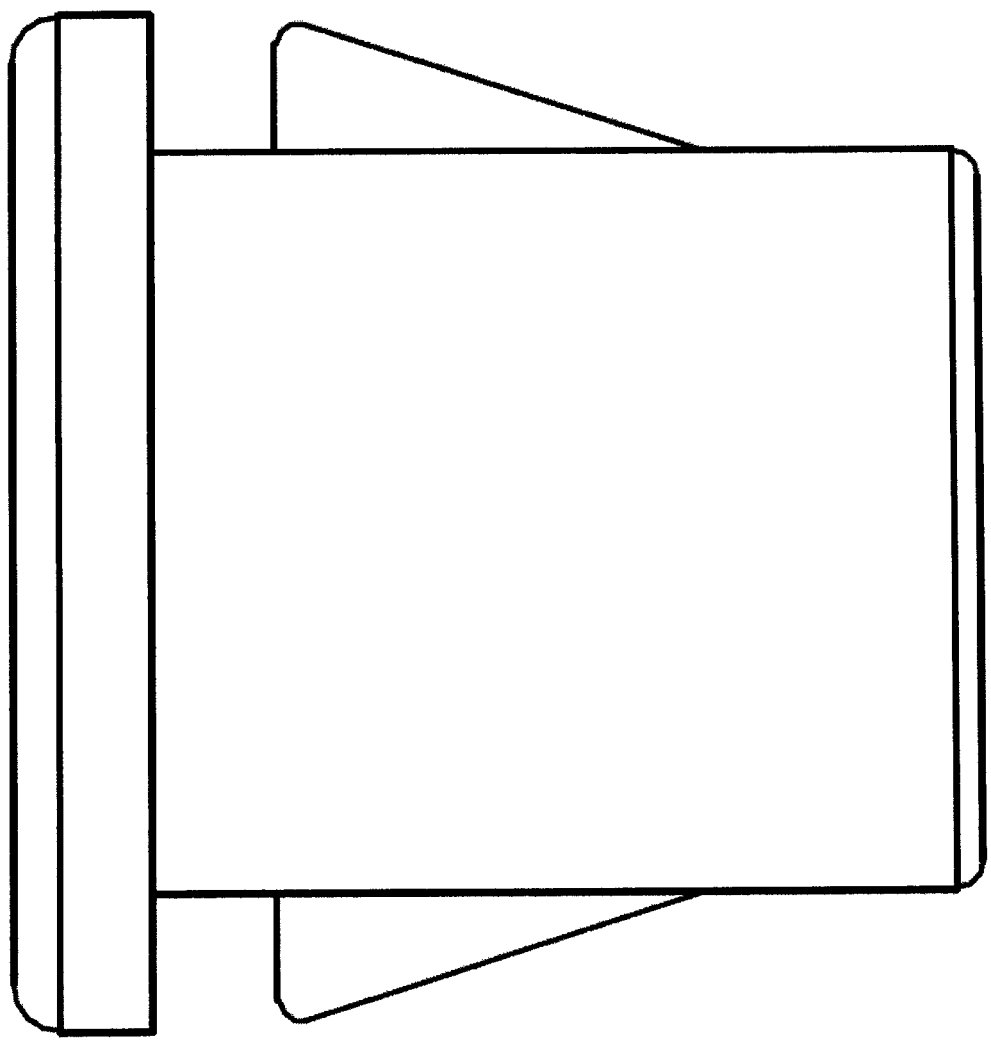
Figure 32:
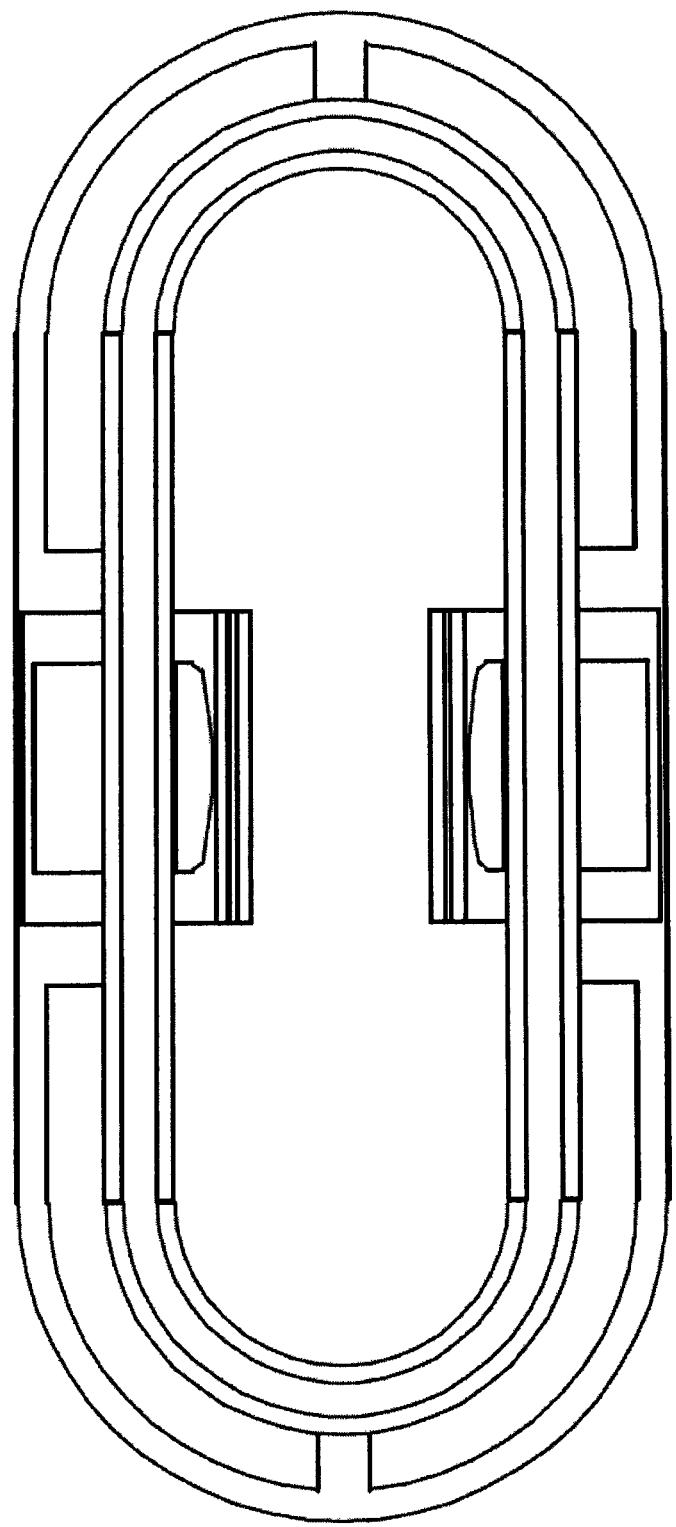
Figure 33:
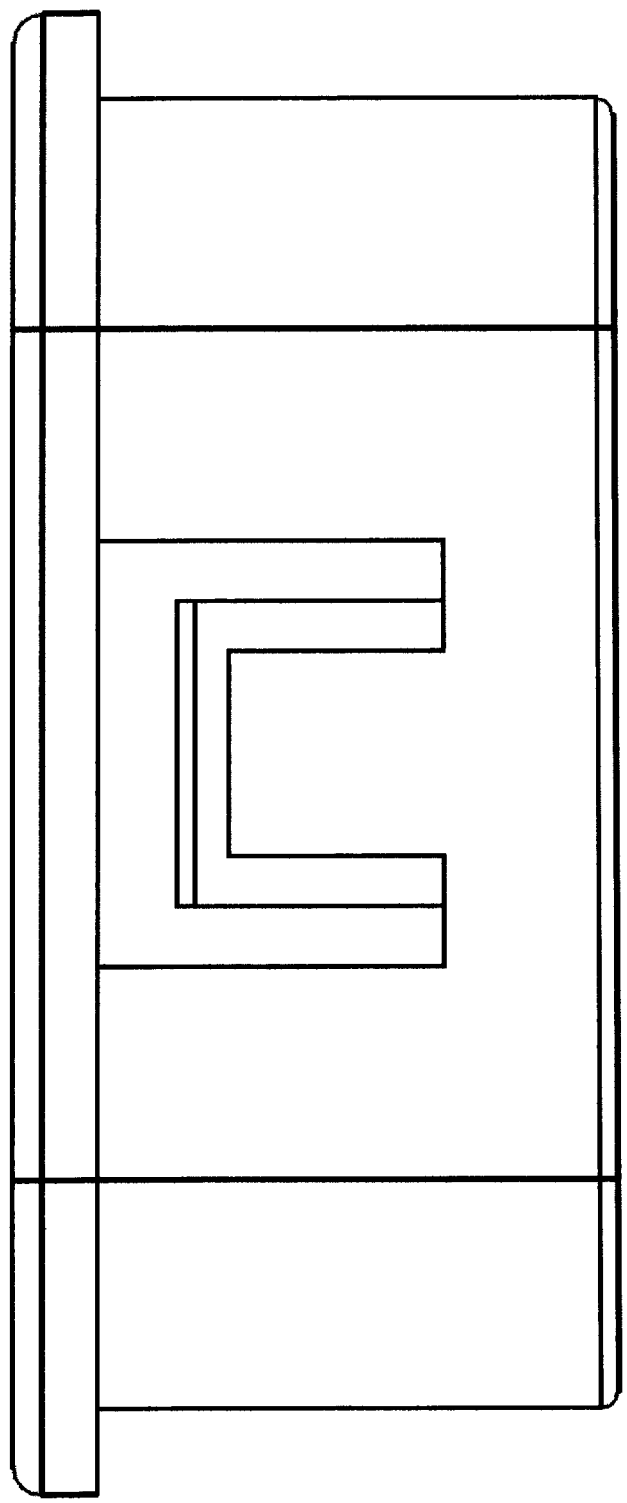
Figure 34:
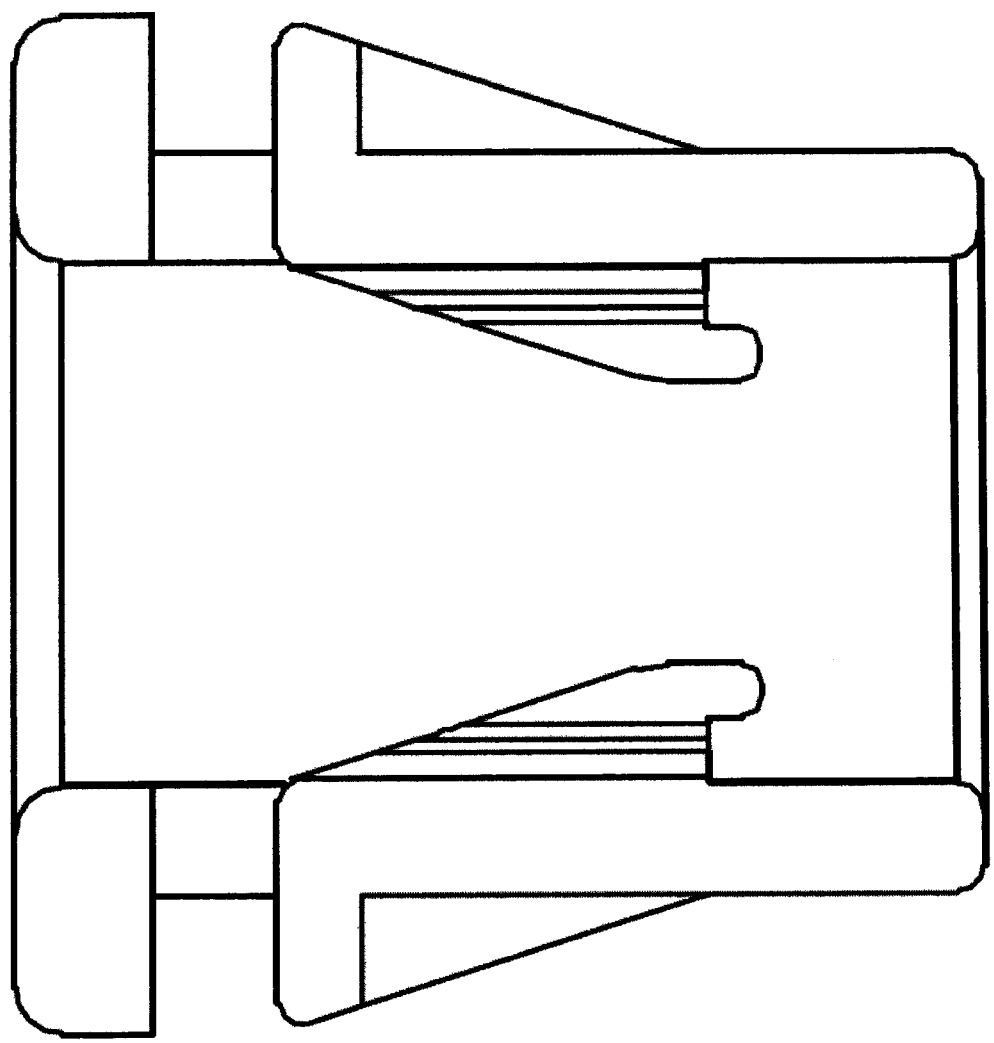
Figure 35:
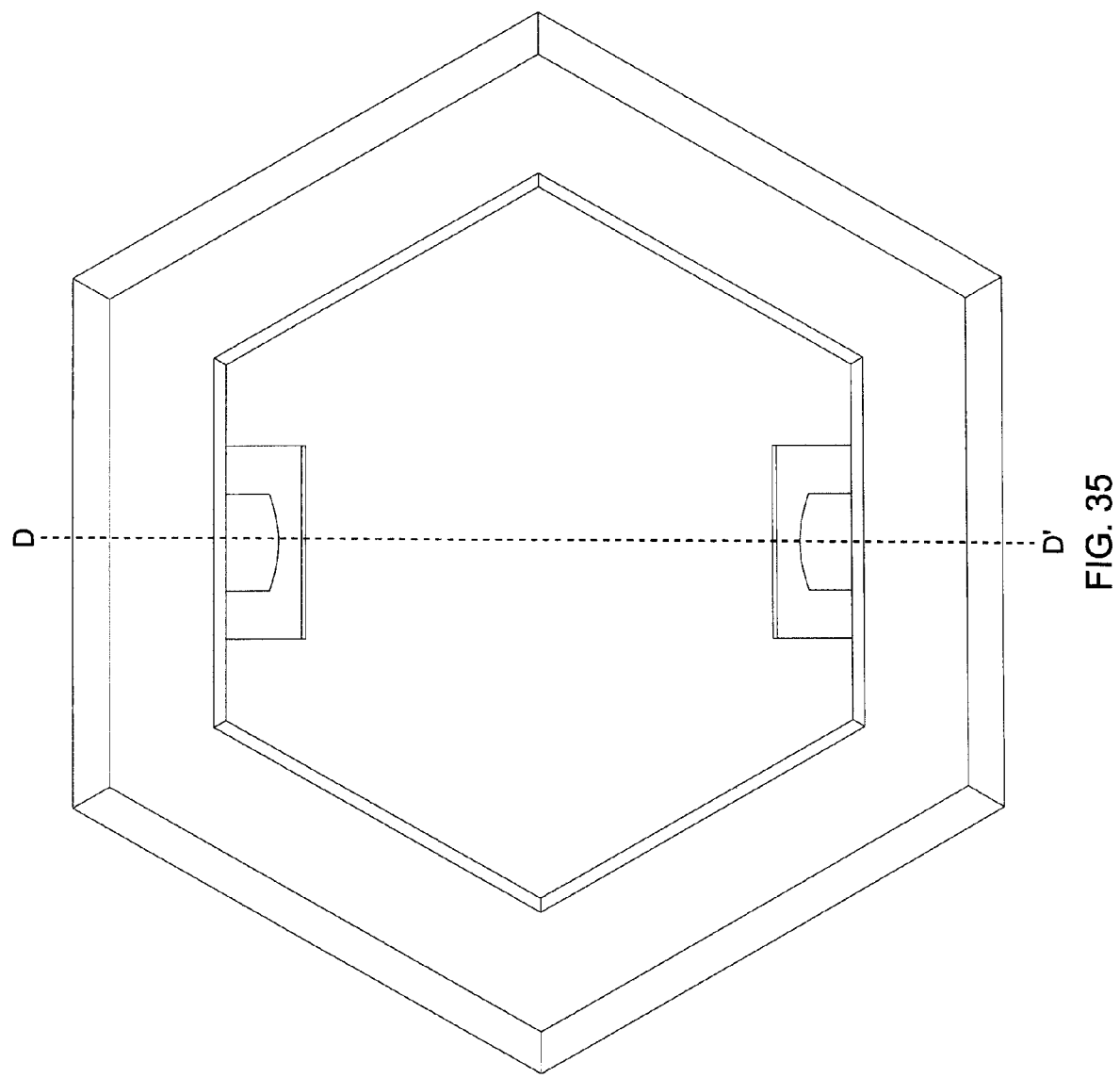
FIGS. 35-41 show various views of a hexagonal clip according to one embodiment of the present invention, where
Figure 36:
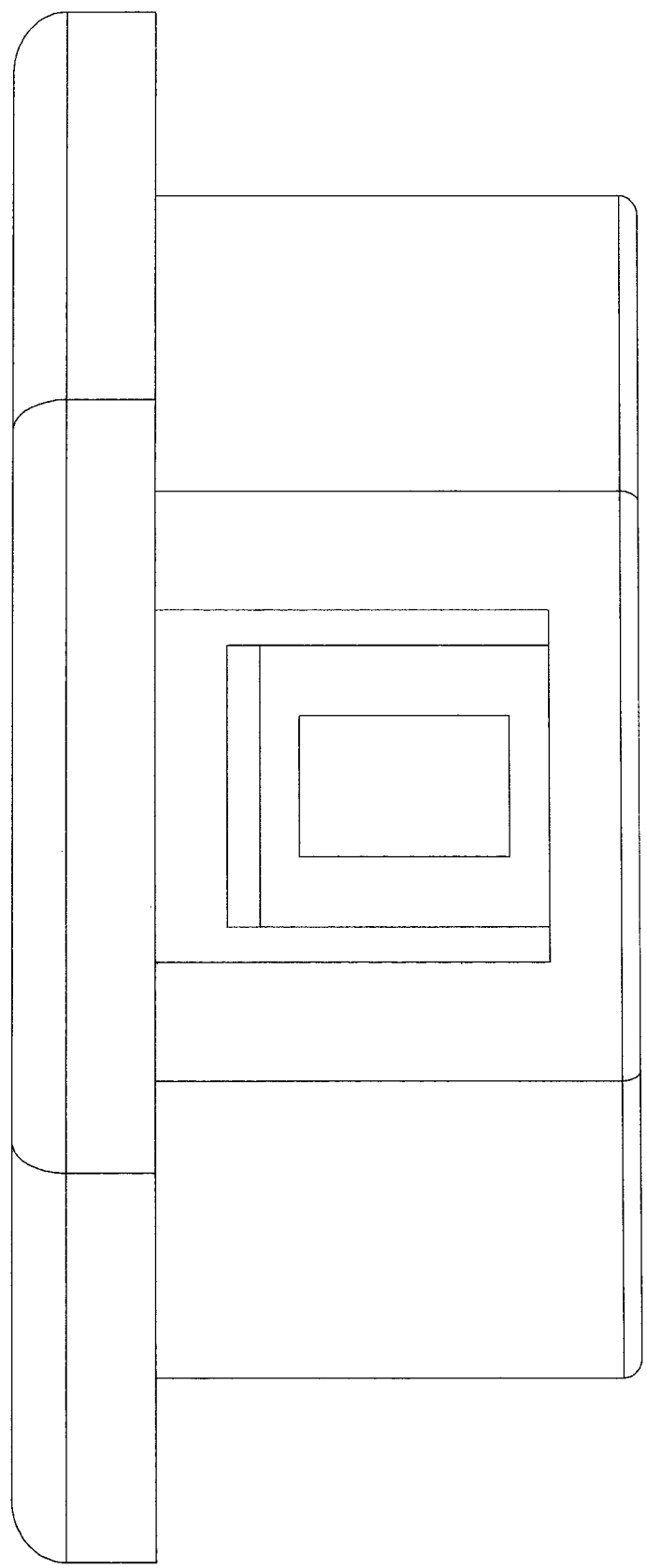
Figure 37:
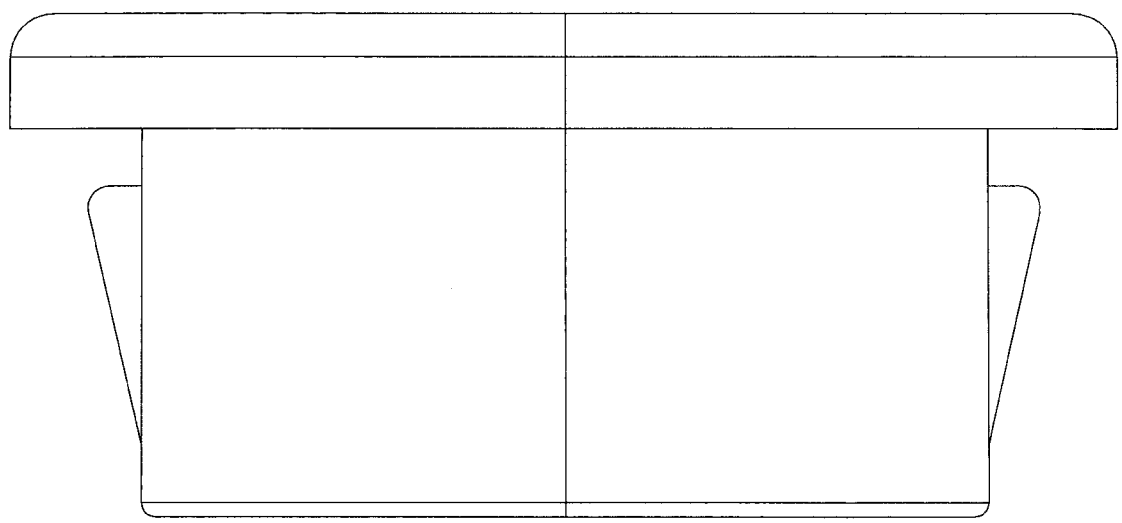
Figure 38:
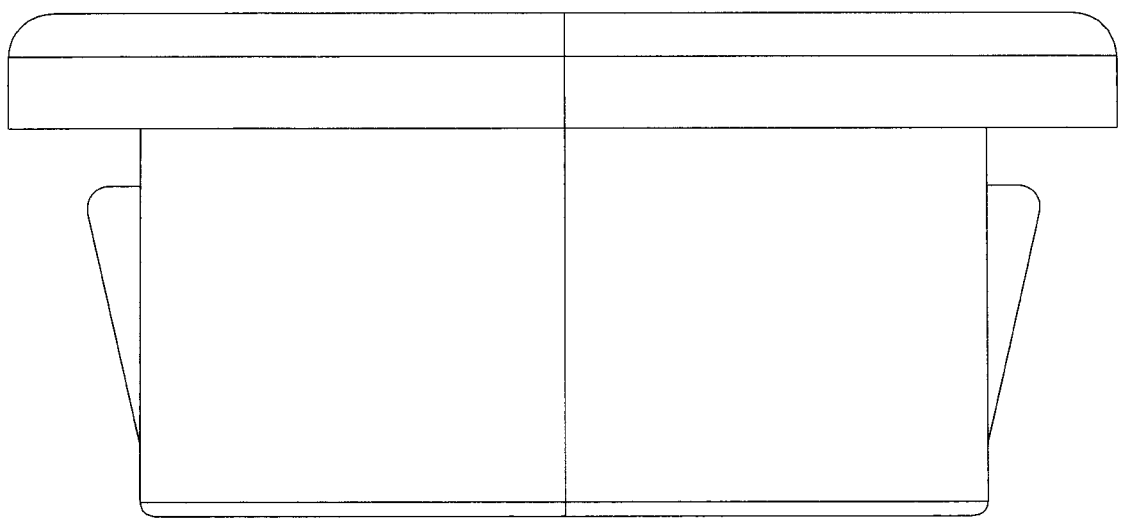
Figure 39:
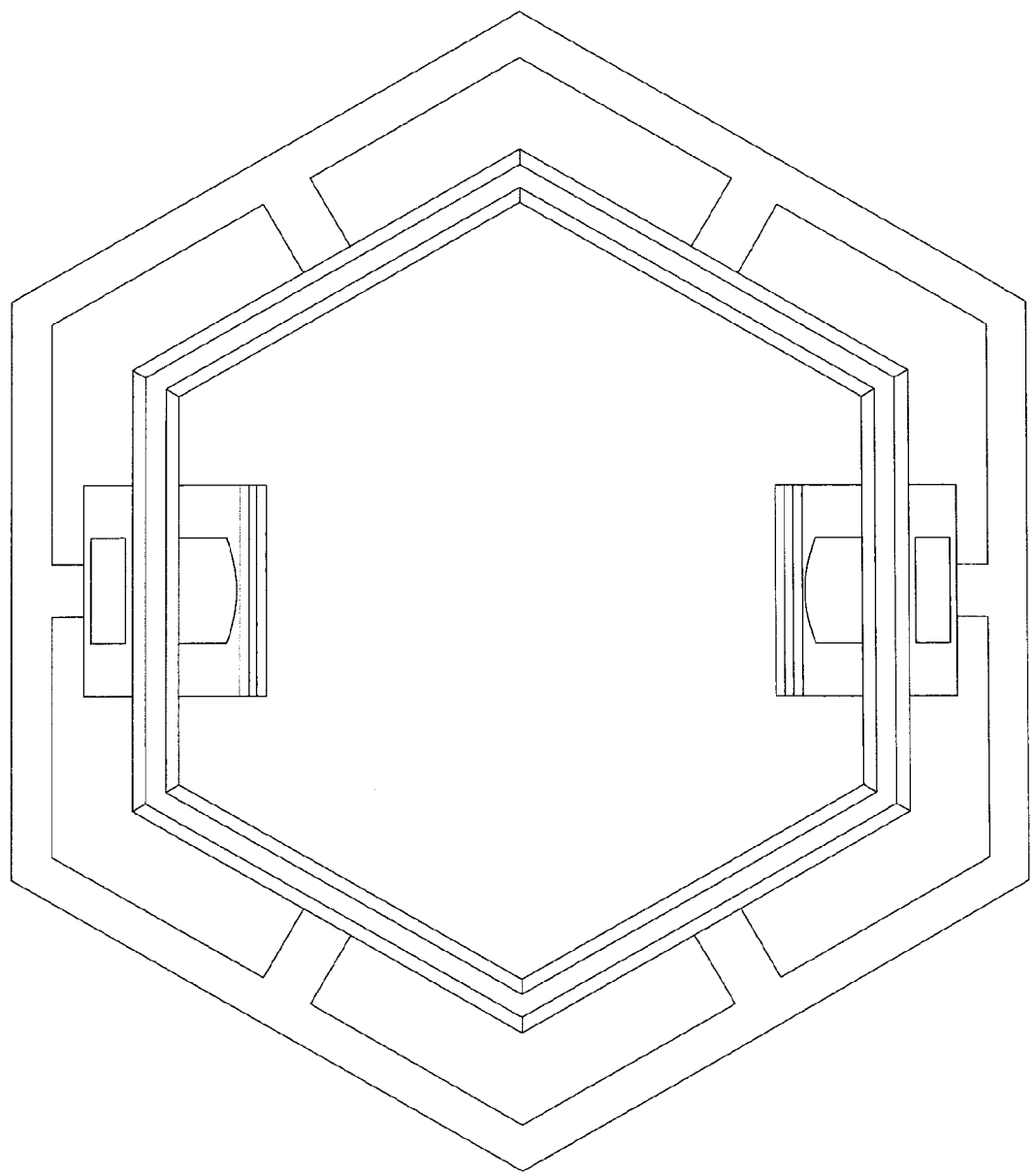
Figure 40:
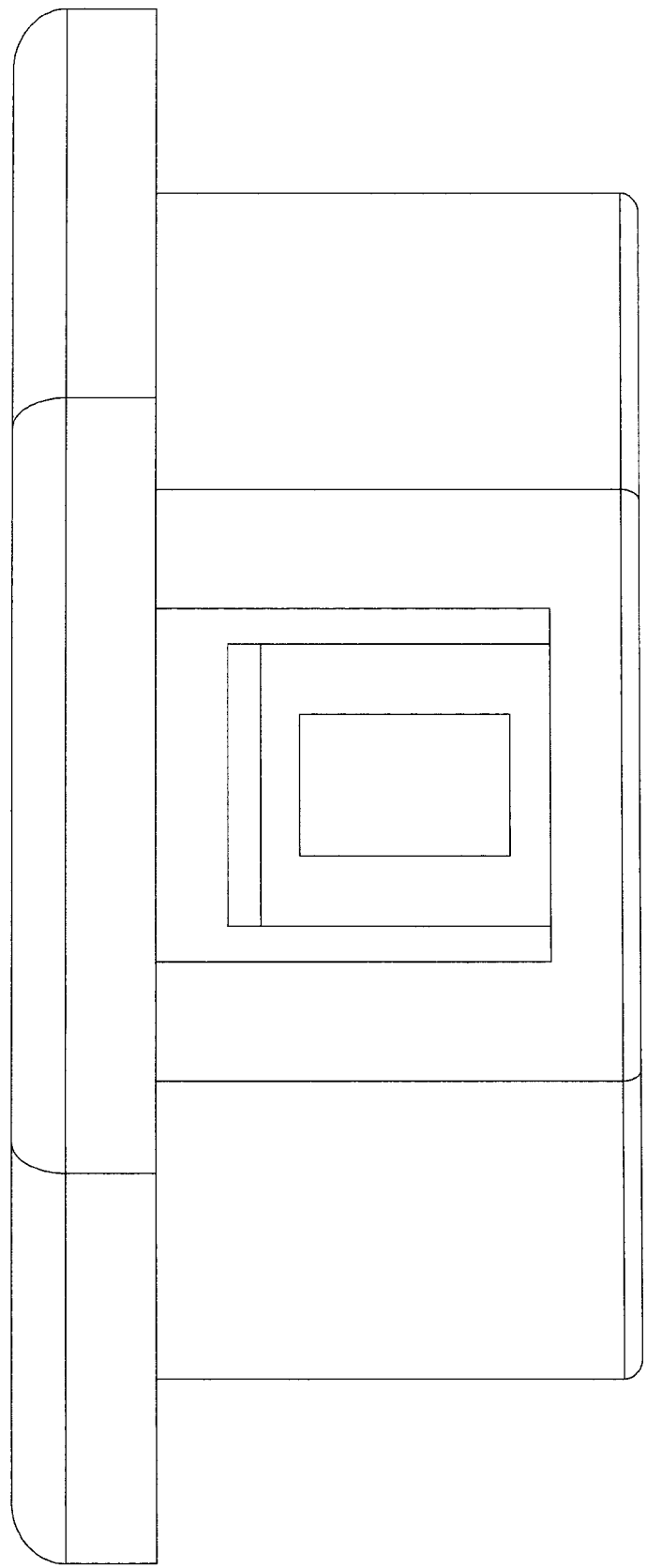
Figure 41:
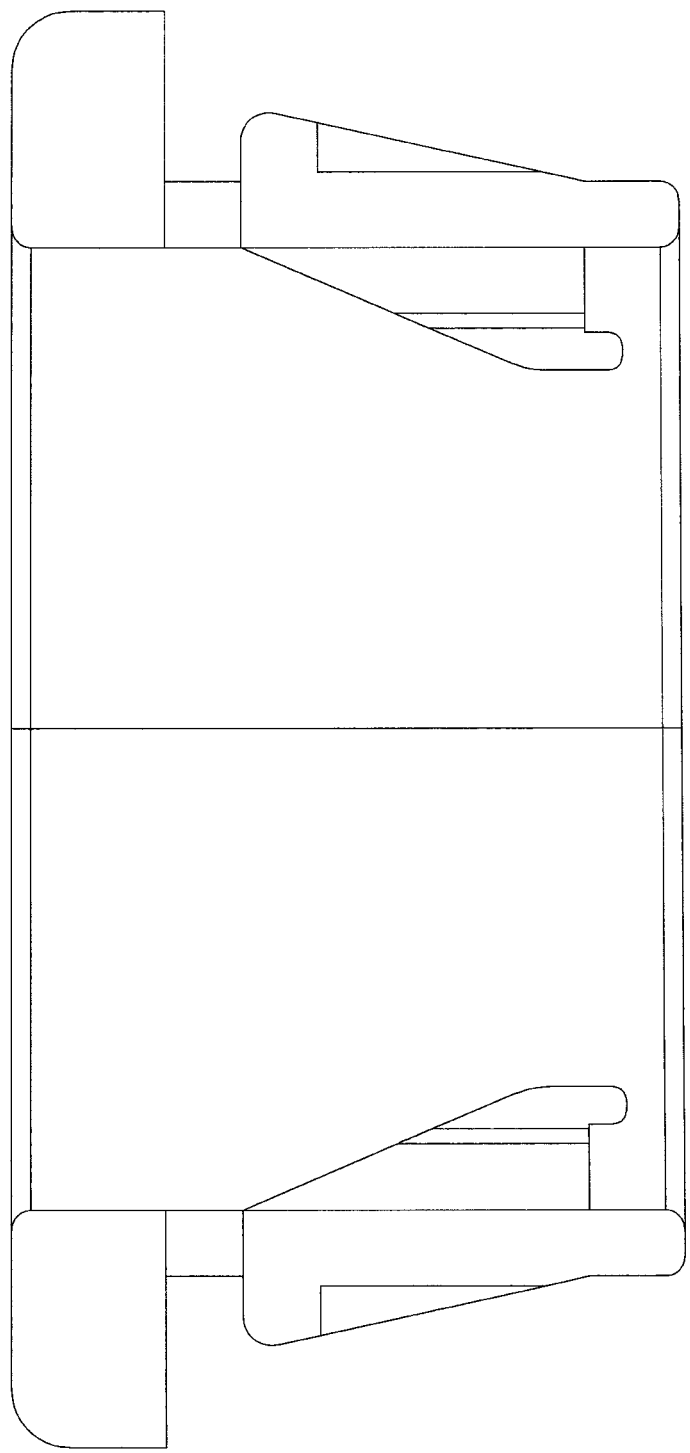

FIG. 6 is a schematic diagram of the structure of a fence door; FIG. 7 is a partial enlarged view of part A of FIG. 6; FIG. 8 is a partial cross-section view of part A of FIG. 7; FIG. 9 is a schematic diagram of a fence structure including posts; FIG. 10 is a partial enlarged view of part B of FIG. 9; FIG. 11 is a partial cross-section view of part B of FIG. 10; FIG. 12 is a partial enlarged view of part C of FIG. 9; and FIG. 13 is a partial cross-section view of part C of FIG. 12.

As shown in FIGS. 6-8, the clip according to embodiments of the present invention may be utilized to attach an assembled fence door (including transverse bar and vertical bar) to the door frame. In one embodiment, the clip is fixed on the door post through the clamping groove 3-6, and the transverse bar of the fence door is fixed on the door post through the vertical bar inserting hole 3-2. That is, the clip is utilized with its upper surface placed vertically with the clamping groove matches the thickness of the door post wall, and the inserting hole matches the size of the transverse bar. The rest of the transverse bars and vertical bars on the fence door are assembled as previously described. In one embodiment, clips for attaching the transverse bar to the door post have a different size from clips for attaching the transverse bar to the vertical bar. Here, the door post has one inserting hole bearing side facing the direction where the transverse bar of the fence door comes from, and the rest of the sides of the door post have no holes.

As shown in FIGS. 9-13, a fence may include a plurality of posts arranged apart from each other and with a plurality of transverse bars and vertical bars in between. The clip according to embodiments of the present invention may be utilized to attach the transverse bars and the vertical bars in the fence to the posts. In one embodiment, the clip is fixed on the post through the clamping groove 3-6, and the transverse bar is fixed on the post through the vertical bar inserting hole 3-2. That is, the clip is utilized with its upper surface placed vertically. The rest of the transverse bars and vertical bars on the fence are assembled as previously described. Similar to the door post, a fence post at an end of the fence may have only one inserting hole bearing side. In addition, when the post is in the middle of the assembled fence and connected with two transverse bars arranged on two opposite sides of the post along the horizontal direction (see FIGS. 12-13), the post may have a first inserting hole on a first side face and a second inserting hole on a second side face facing the first side face, a clip may be utilized to be locked with each of the connection holes respectively, and utilized to connect the post with a transverse bar respectively.

Figures 42A, 42B:
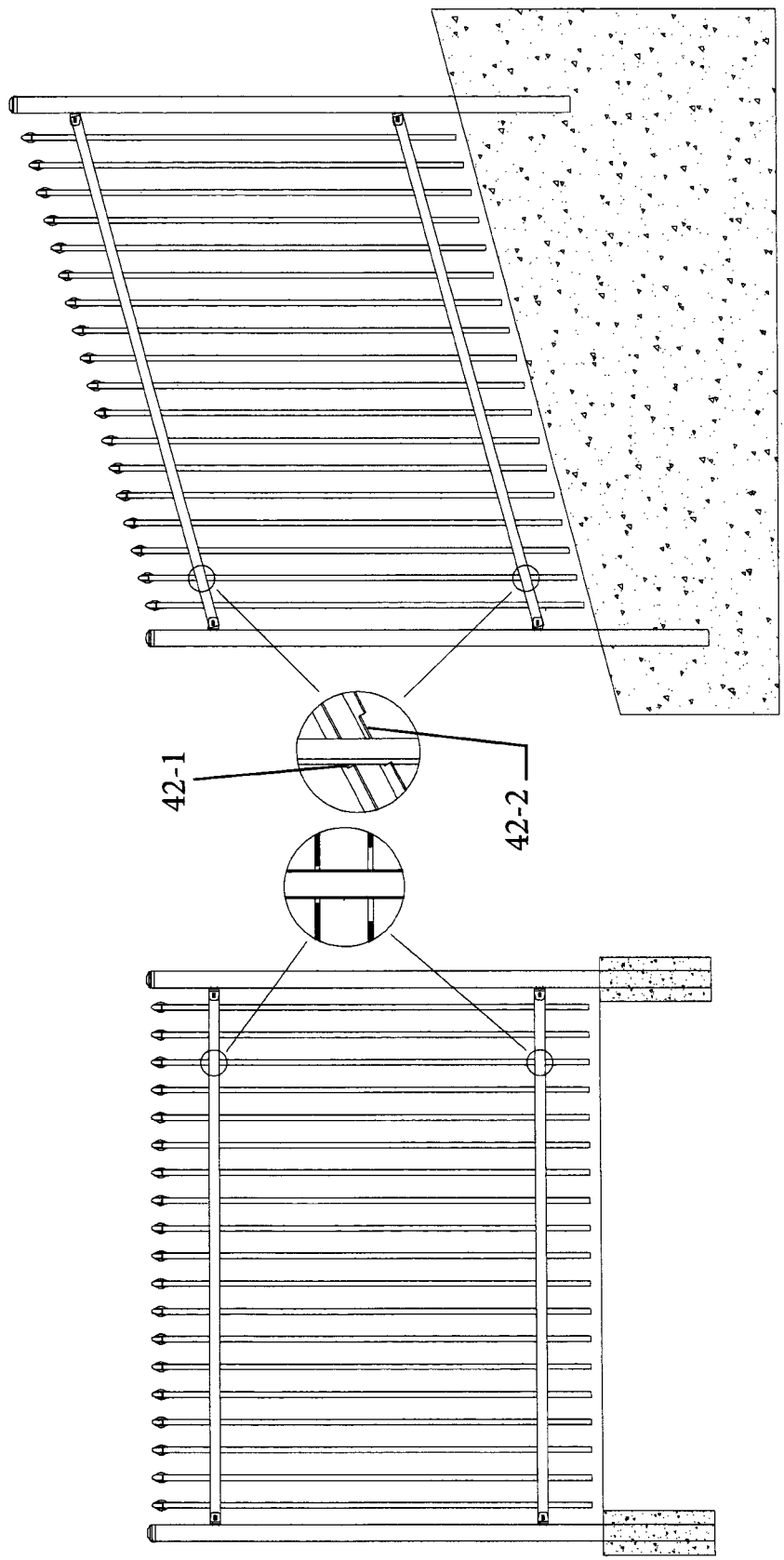
FIGS. 42A-B are schematic illustrations of a fence installed on a flat surface (A) and a sloped surface (B)

FIGS. 42A-B are schematic illustrations of a fence installed on a flat surface (A) and a sloped surface (B). As illustrated in FIG. 42B, a larger second inserting hole 42-2 on a lower side of the transverse bar (compared to the first inserting hole 42-1 that needs to match with the groove of the clip) allows the vertical bar to be fixed at an angle other than 90° with respect to the transverse bar, and therefore, allows the fence to be installed on a sloped surface.

While the clip has been described in association with assembled fence, the application of the clip is not limited thereto. The clip may be utilized to assemble or hold together two parts perpendicular to each other. For example, the clip may be utilized to assemble or hold together two hollow parts together, such as in the assembly of a piece of furniture, a device, etc.

The shape of the clip may be rectangular, oval, hexagonal, triangular, or any suitable shapes. FIGS. 14-20 show various views of a rectangular clip according to one embodiment of the present invention; FIGS. 21-27 show various views of a triangular clip according to one embodiment of the present invention; FIGS. 67-73 show various views of a triangular clip according to another embodiment of the present invention; FIGS. 28-34 show various views of an oval clip according to one embodiment of the present invention; and FIGS. 35-41 show various views of a hexagonal clip according to one embodiment of the present invention. FIGS. 50-56 show various views of an M-shaped clip according to one embodiment of the present invention.

Figure 43:
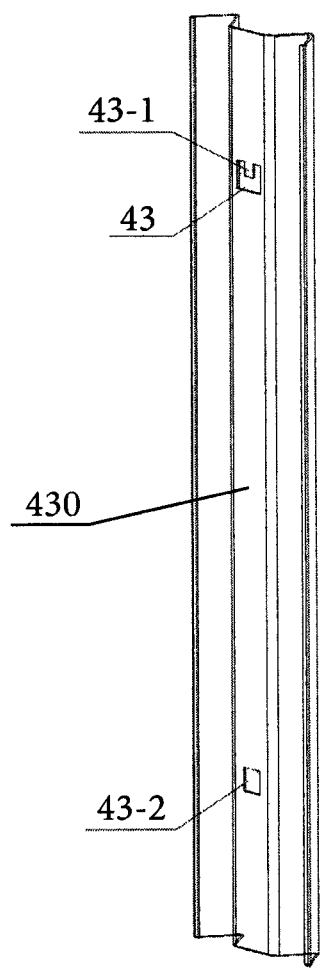
FIG. 43 is a schematic diagram of the hole-bearing side of a vertical bar according to an embodiment of the present invention.

According to another embodiment of the present invention, the vertical bar of the fence has an M-shaped cross section, referred to herein as an M-shaped vertical bar (see FIG. 43). The M-shaped vertical bar 430 may include a vertical bar clamping hole 43, a tab 43-1 for locking with the clip, and may further include another clamping hole (e.g., a lower clamping hole, or an opening) 43-2 spaced apart from the vertical bar clamping hole 43. The opening 43-2 may be rectangular shaped and may not include a tab. The vertical bar clamping hole 43 and/or 43-2 may be located in the middle section of the M where the two inverted Vs met.

Figure 44:
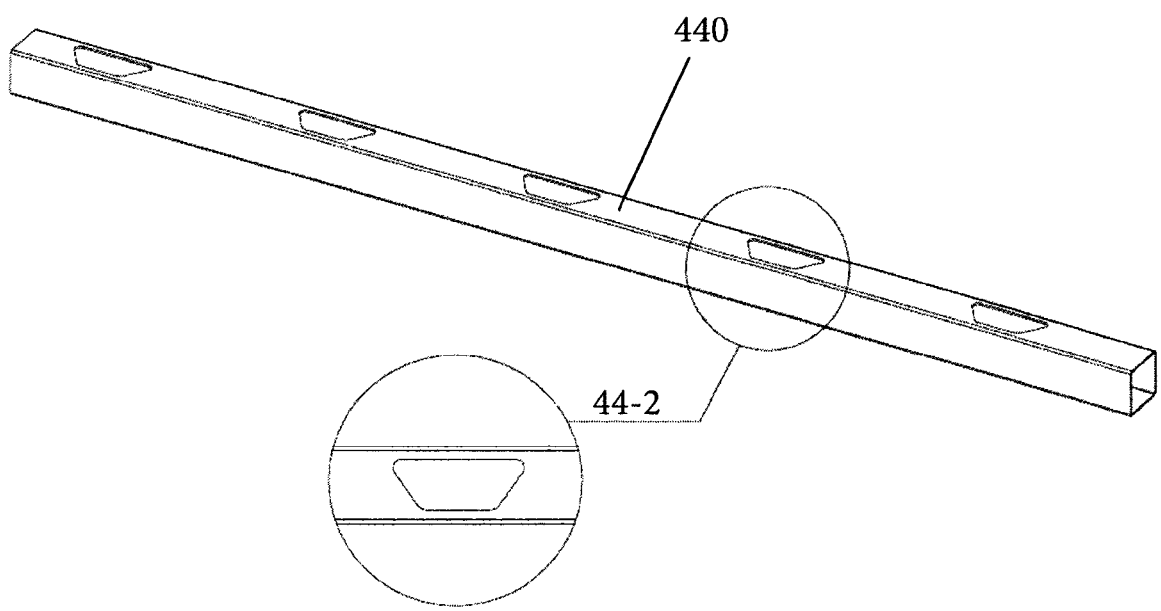
FIG. 44 is a schematic diagram of a transverse bar corresponding to the vertical bar shown in FIG. 43 according to the embodiment of the present invention.
Figure 57:
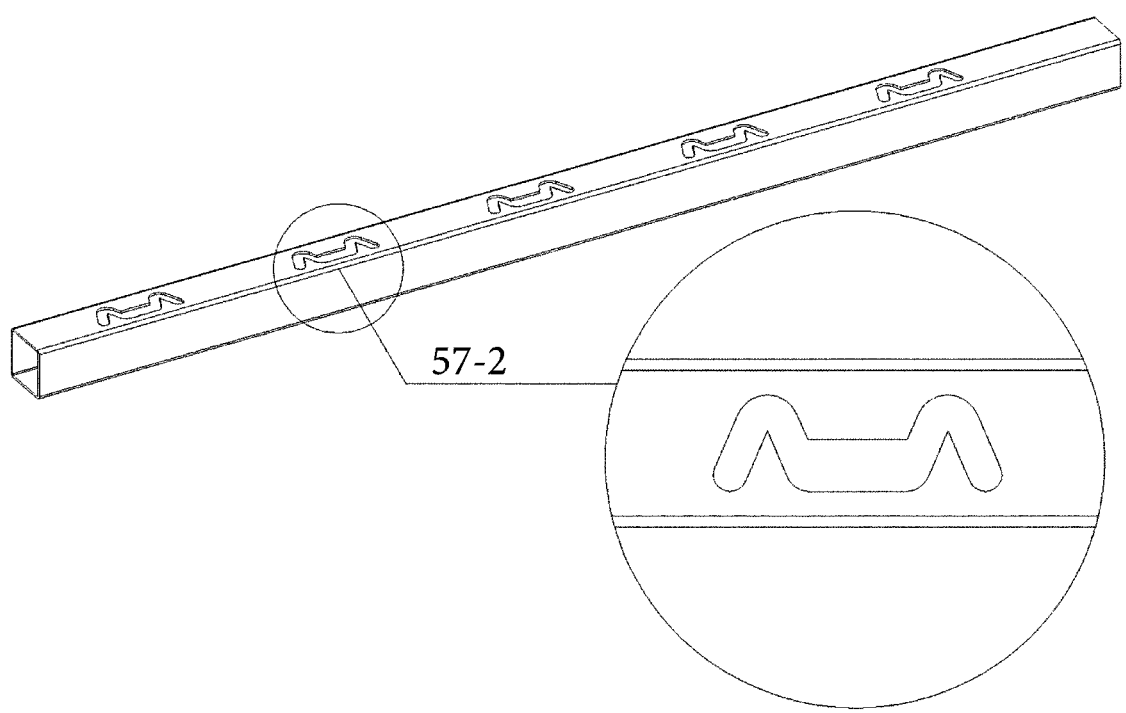
FIG. 57 is a schematic diagram of a transverse bar corresponding to an M-shaped vertical bar according to the embodiment of the present invention.

FIG. 44 is a schematic diagram of a transverse bar 440 to be used with the vertical bar shown in FIG. 43 according to the embodiment of the present invention. Here, the inserting hole 44-2 of the transverse bars may have a trapezoid shape, as shown in the insert of FIG. 44. FIG. 57 is a schematic diagram of a transverse bar corresponding to an M-shaped vertical bar according to an embodiment of the present invention. Here, the inserting hole 57-2 of the transverse bars may have an M-shape, as shown in the insert of FIG. 57.

Figure 45A:
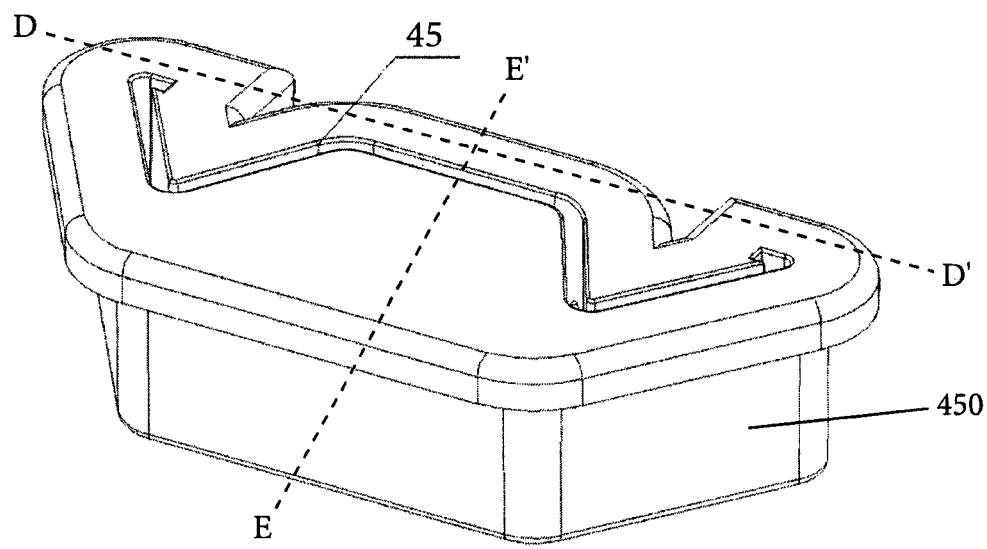
FIG. 45A is a schematic front side view of an M-shaped clip according to an embodiment of the present invention.
Figure 45B:
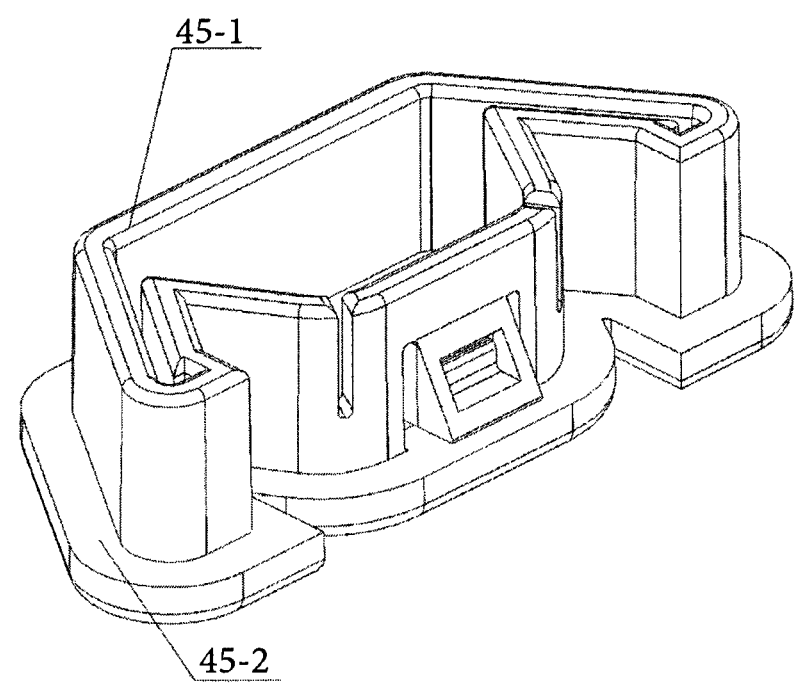
FIG. 45B is a schematic bottom side view of an M-shaped clip according to an embodiment of the present invention.

FIG. 45A is a schematic front side view of a clip having an M-shaped vertical bar inserting hole, referred to herein as an M-shaped clip according to an embodiment of the present invention; and FIG. 45B is a schematic bottom side view of a clip with an M-shaped vertical bar inserting hole according to an embodiment of the present invention. While having an M-shaped vertical bar inserting hole and referred to as an M-shaped clip, the overall shape of the clip may be any suitable shape that matches the shape of the inserting hole of the transverse bar, such as a trapezoid shape.

Referring to FIGS. 45A and B, the clip 450 has an M-shaped vertical bar inserting hole 45. The peripherals of the upper side 45-2 and the lower side 45-1 have an overall trapezoid shape matching that of the inserting hole of the transverse bar shown in FIG. 44.

Figure 58A:
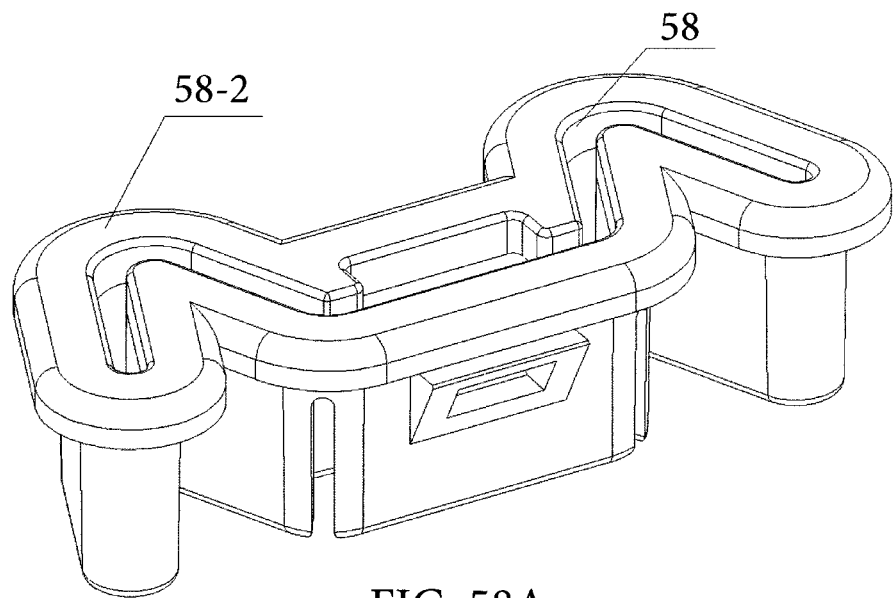
FIG. 58A is a schematic front side view of an M-shaped clip according to an embodiment of the present invention.
Figure 58B:
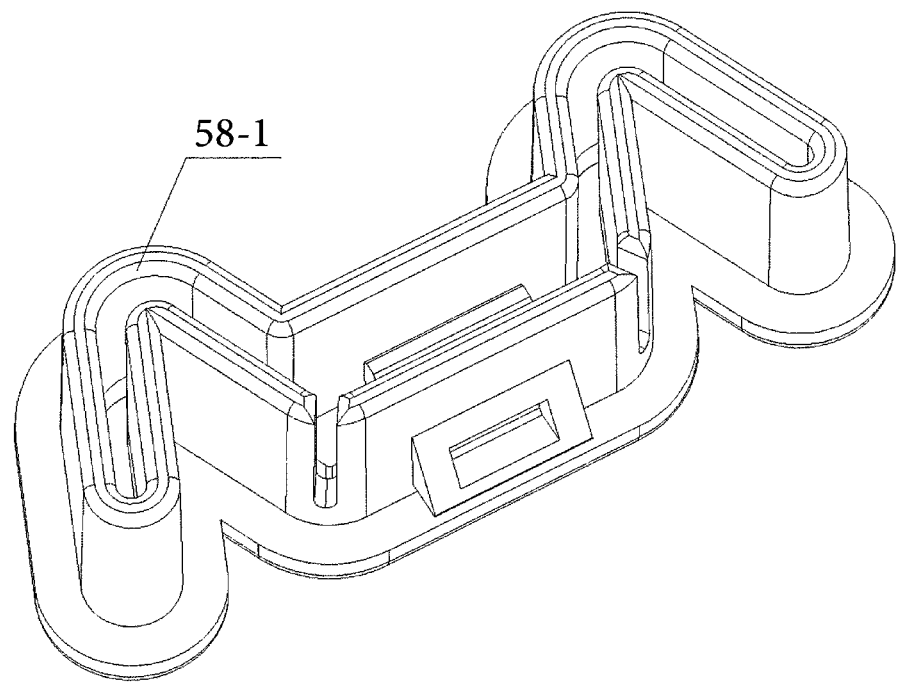
FIG. 58B is a schematic bottom side view of an M-shaped clip according to an embodiment of the present invention.

FIG. 58A is a schematic front side view of an M-shaped clip according to an embodiment of the present invention and FIG. 58B is a schematic bottom side view of an M-shaped clip according to an embodiment of the present invention. Here, the clip has an M-shaped vertical bar inserting hole 58, and the peripherals of the upper side 58-2 and the lower side 58-1 have an overall M shape matching that of the inserting hole of the transverse bar shown in FIG. 57.

Figure 59:
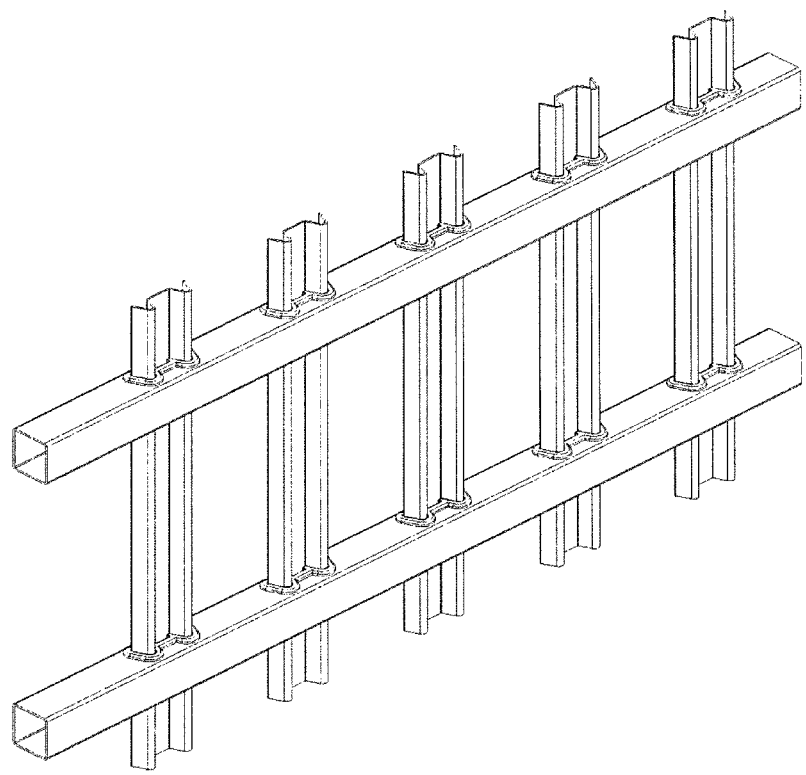
FIG. 59 is a schematic diagram showing the connection of the vertical bar, the transverse bar and the clip in an assembly according to an embodiment of the present invention.
Figure 60:
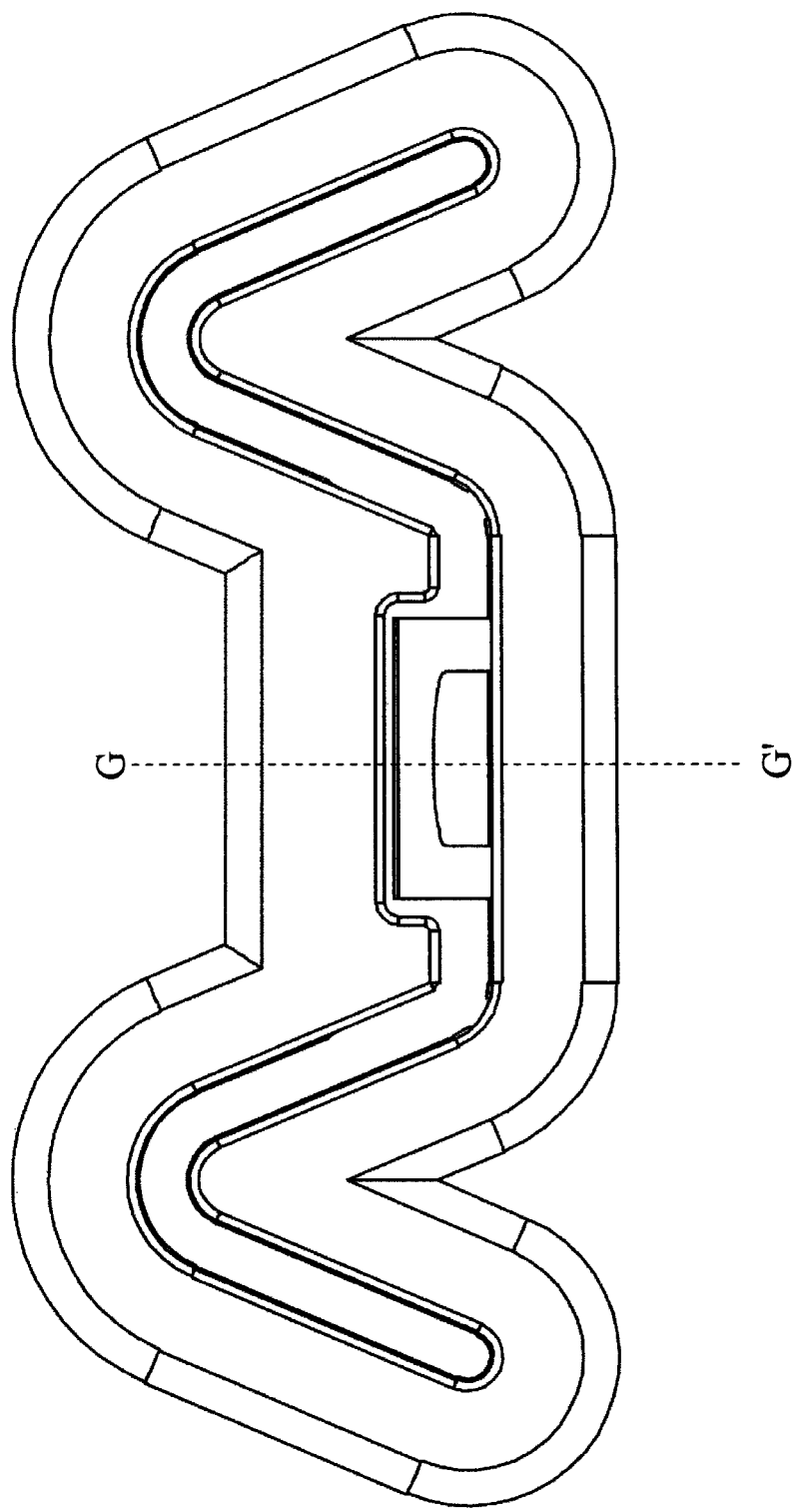
FIGS. 60-66 show various views of an M-shaped clip according to one embodiment of the present invention, where
Figure 61:
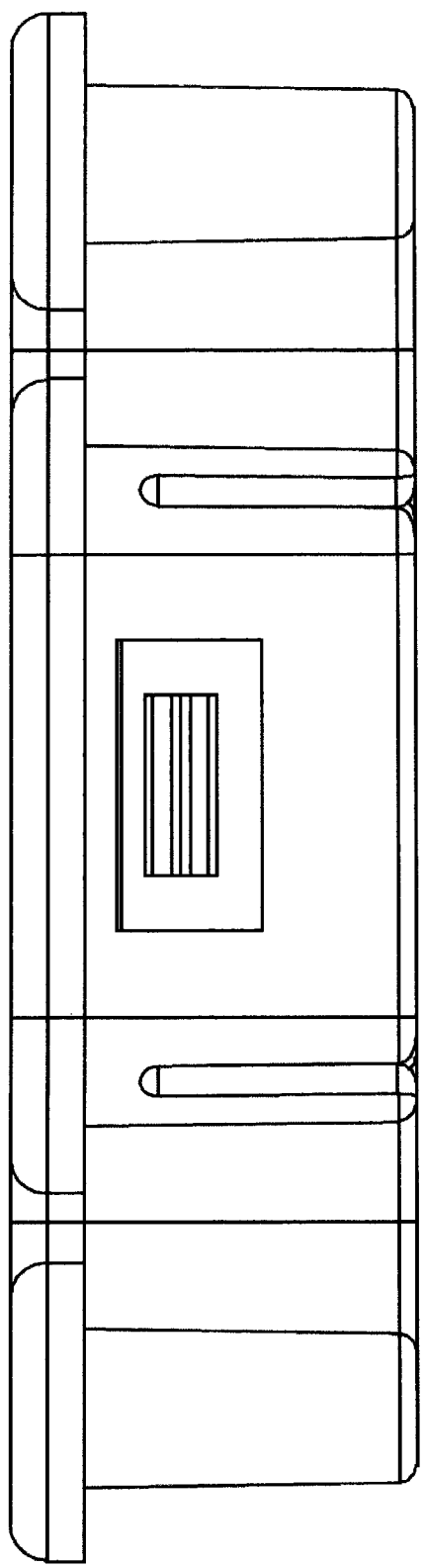
Figure 62:
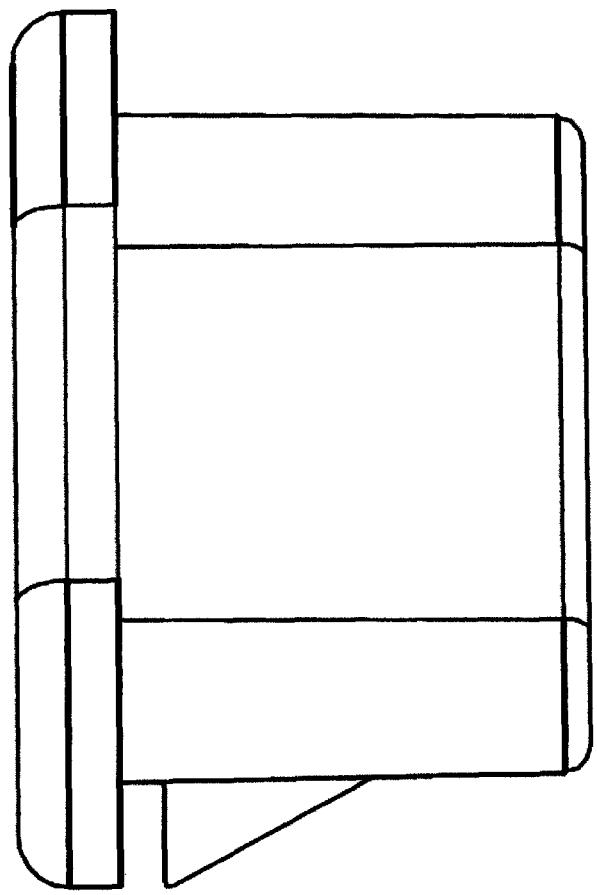
Figure 63:
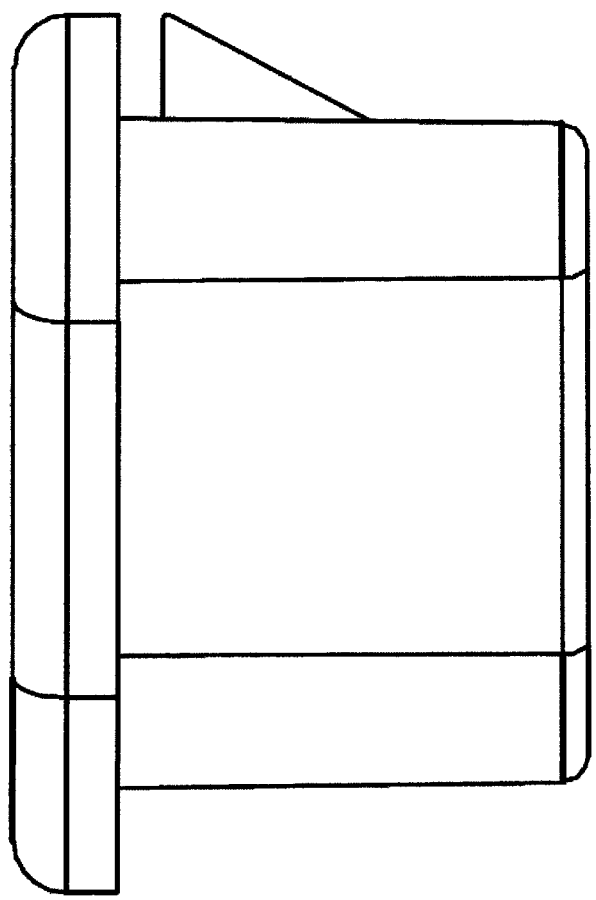
Figure 64:
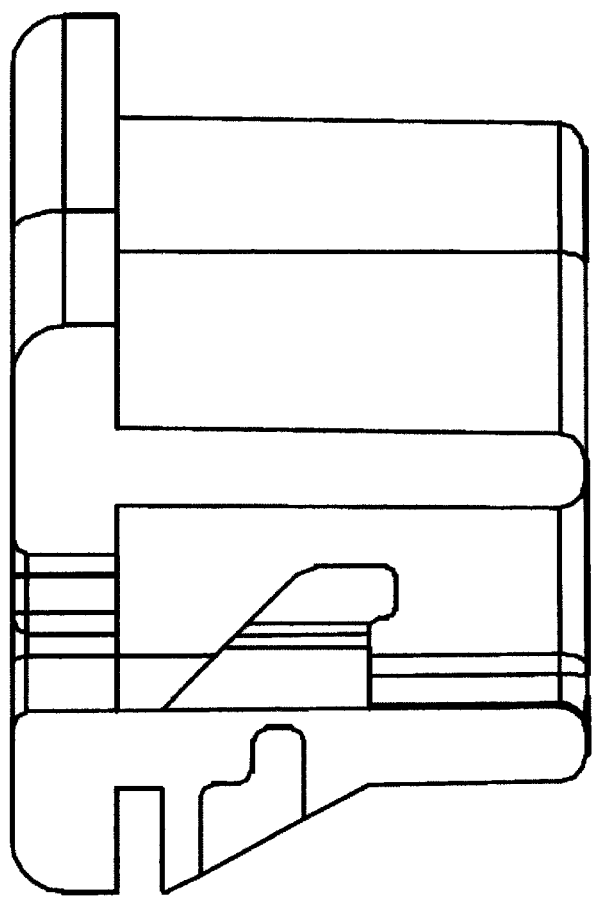
Figure 65:
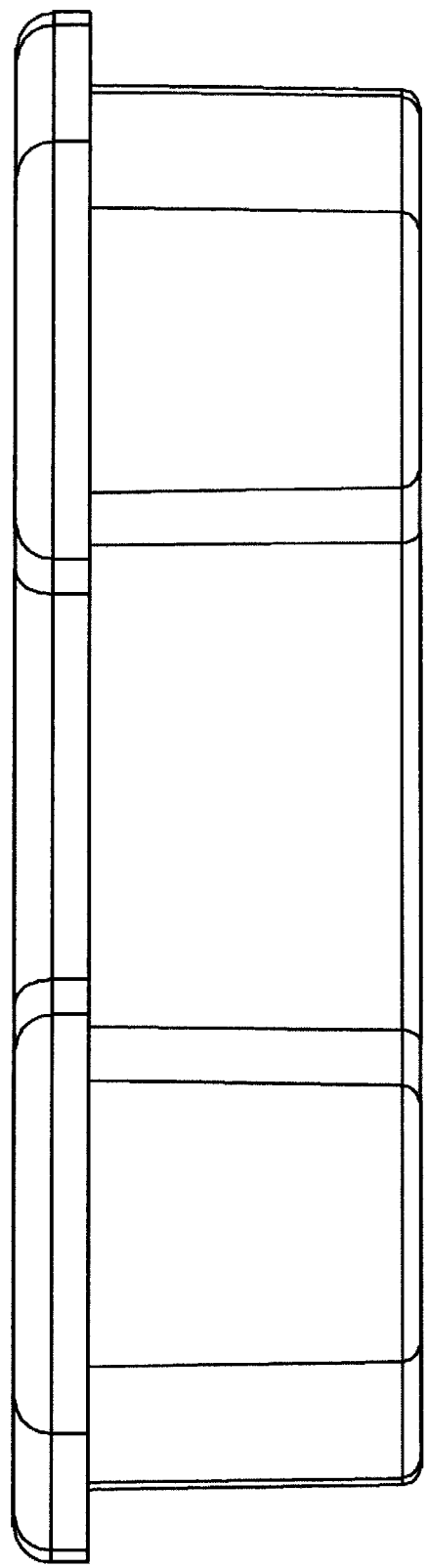
Figure 66:
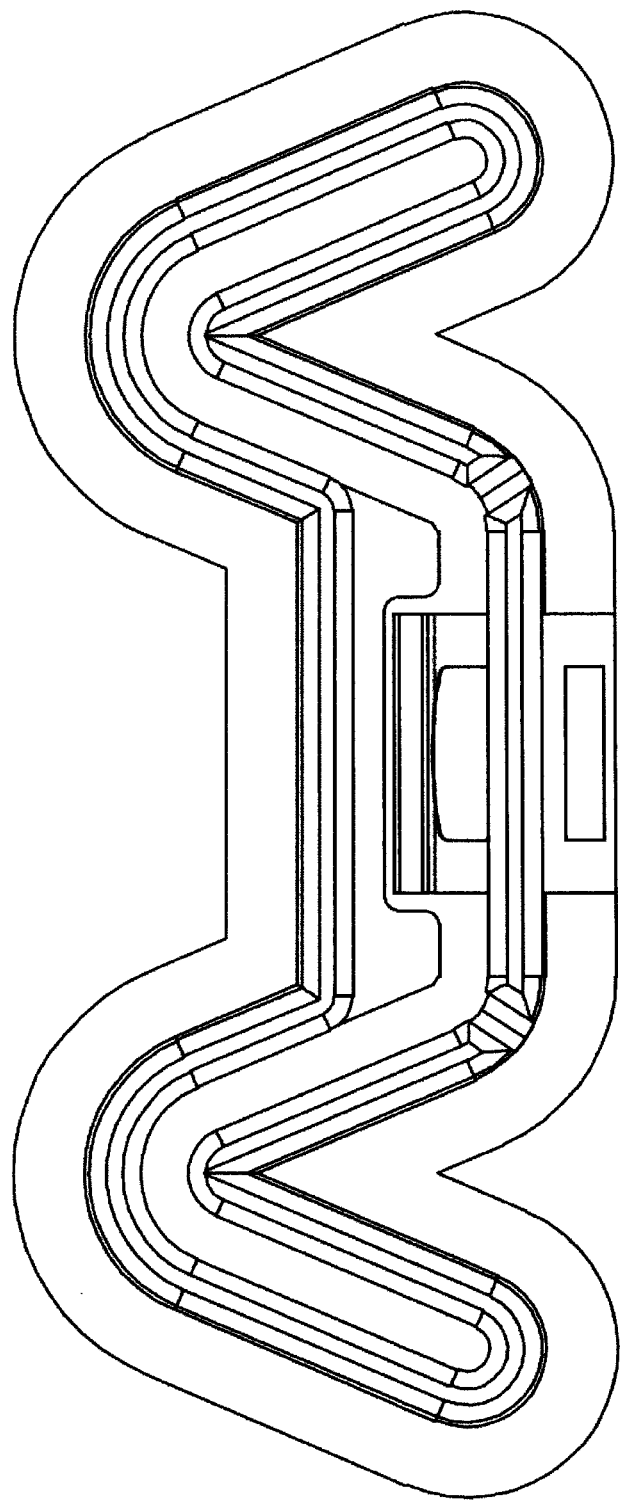
Figure 67:
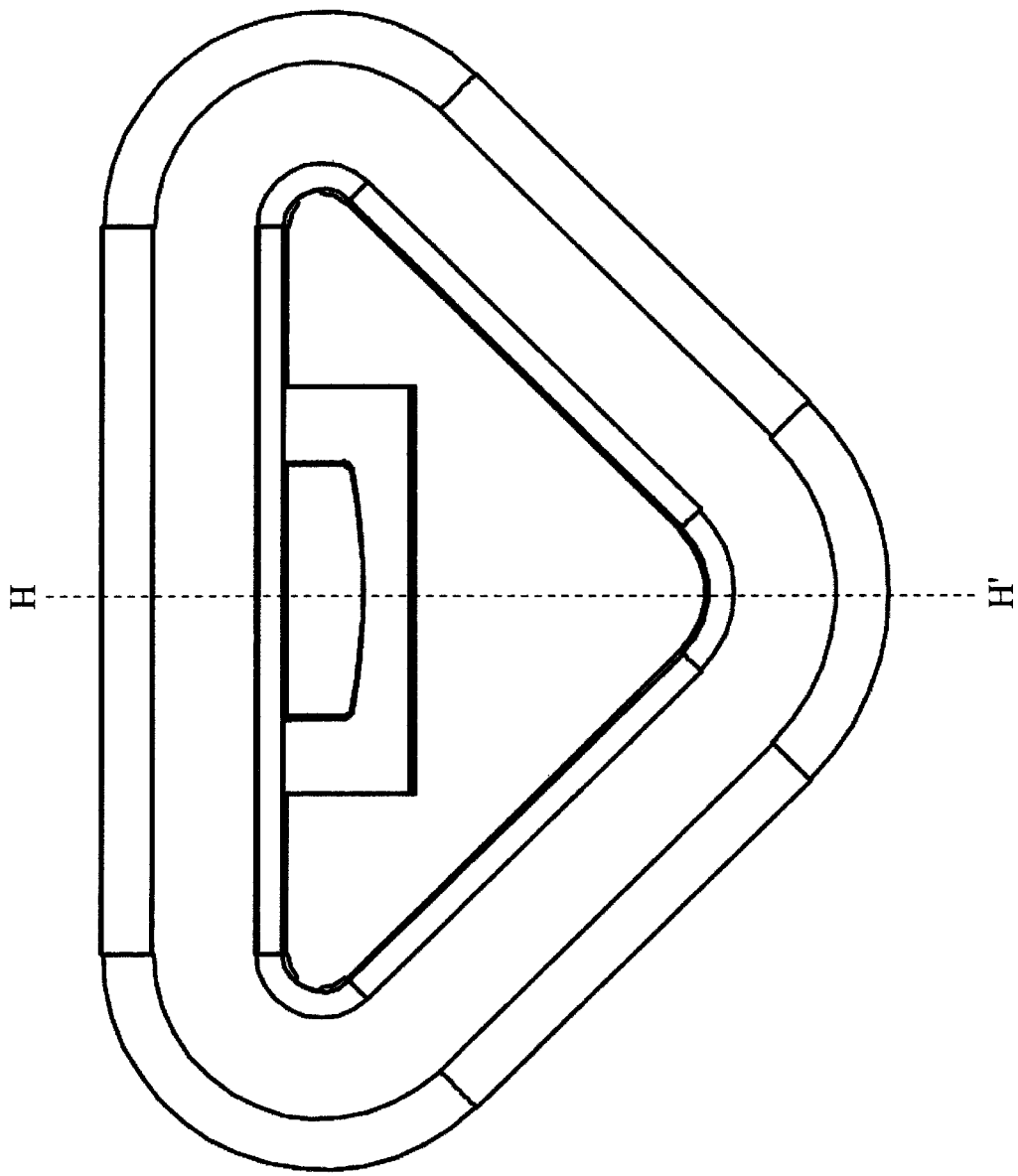
FIGS. 67-73 show various views of a triangular-shaped clip according to one embodiment of the present invention, where
Figure 68:
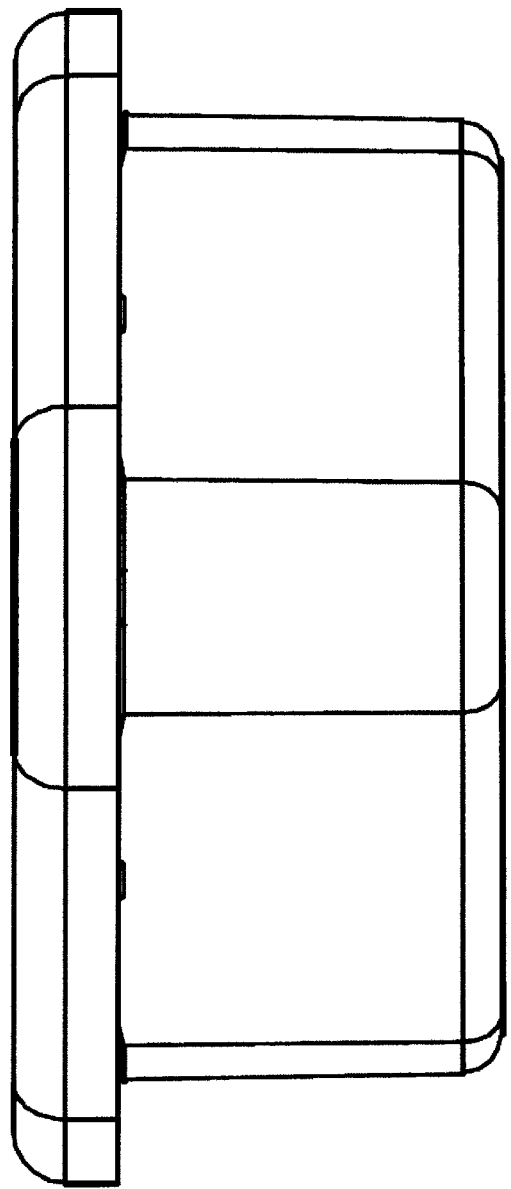
Figure 69:
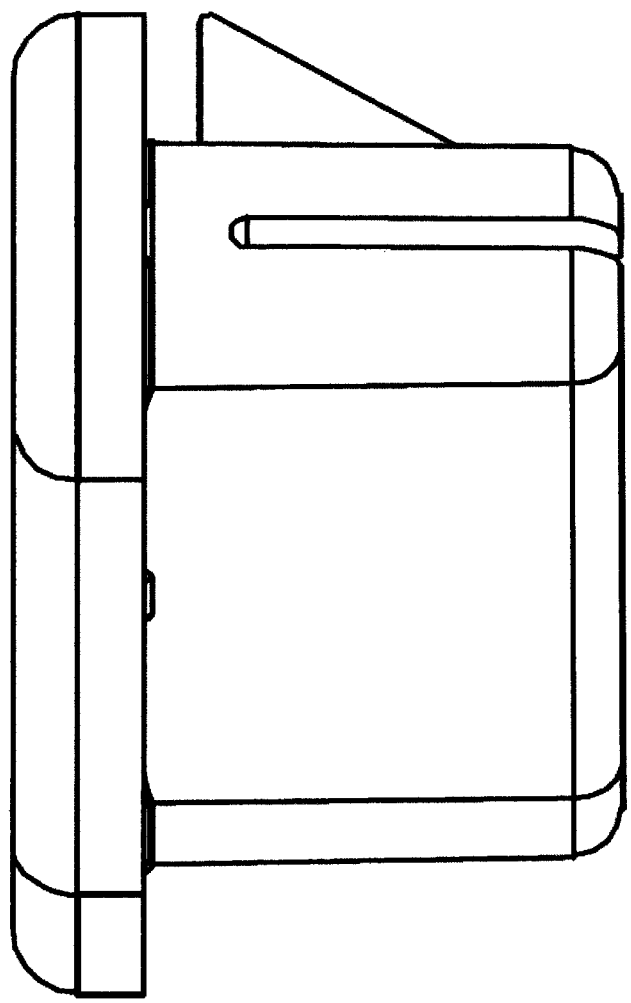
Figure 70:
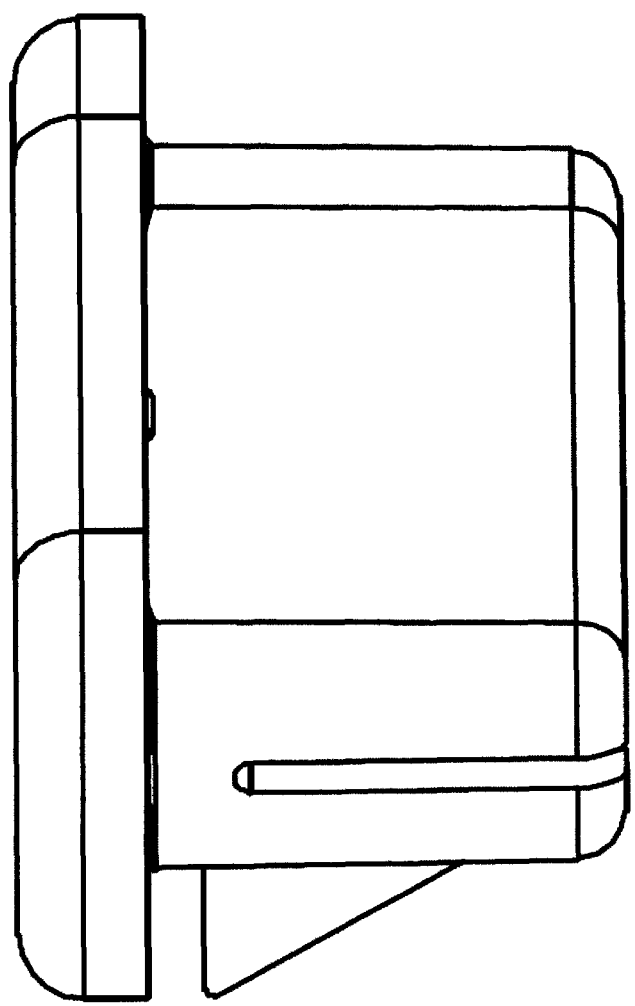
Figure 71:
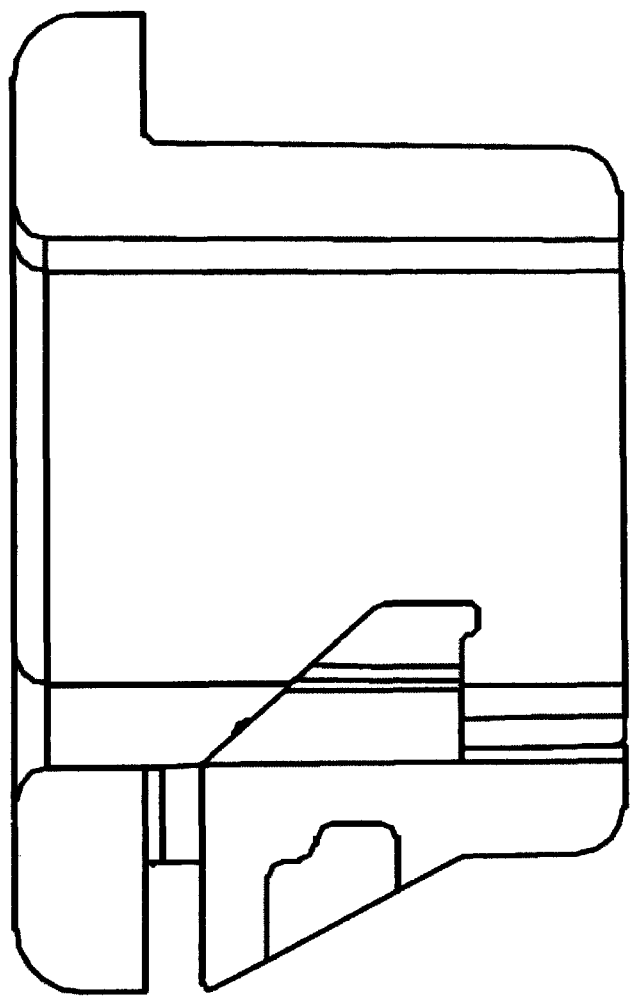
Figure 72:
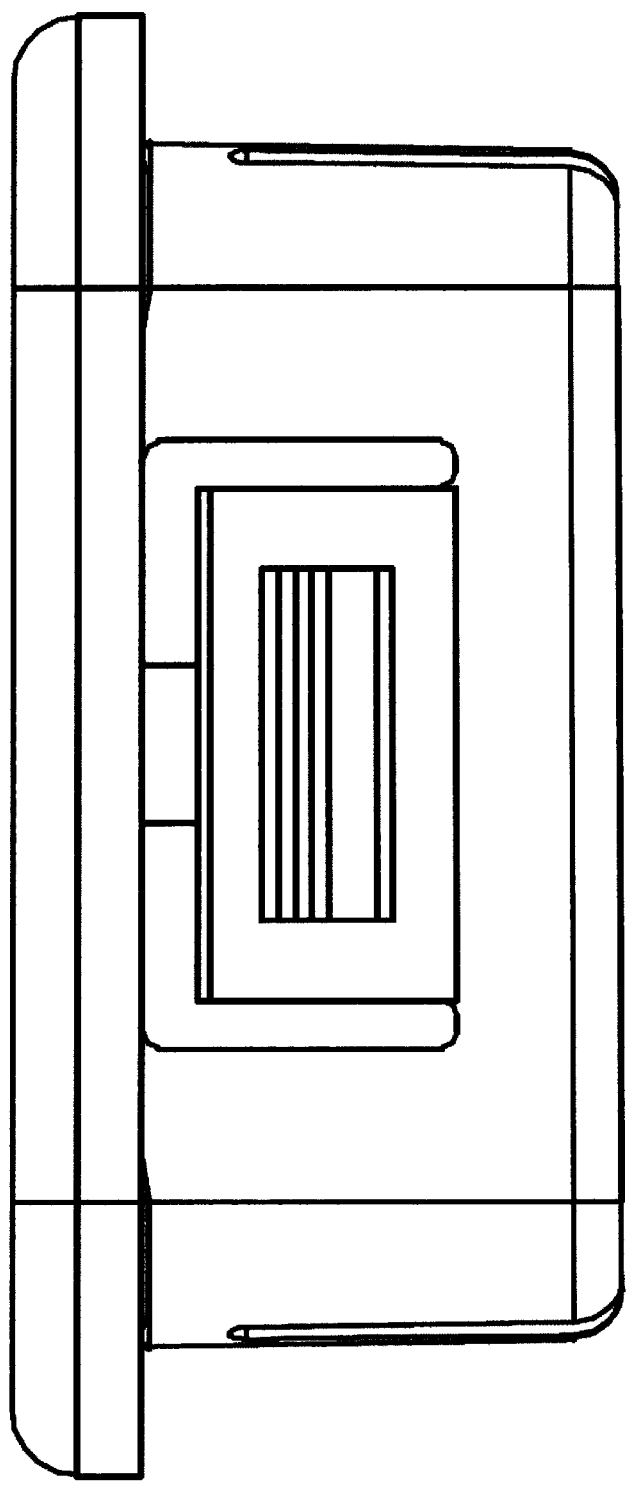
Figure 73:
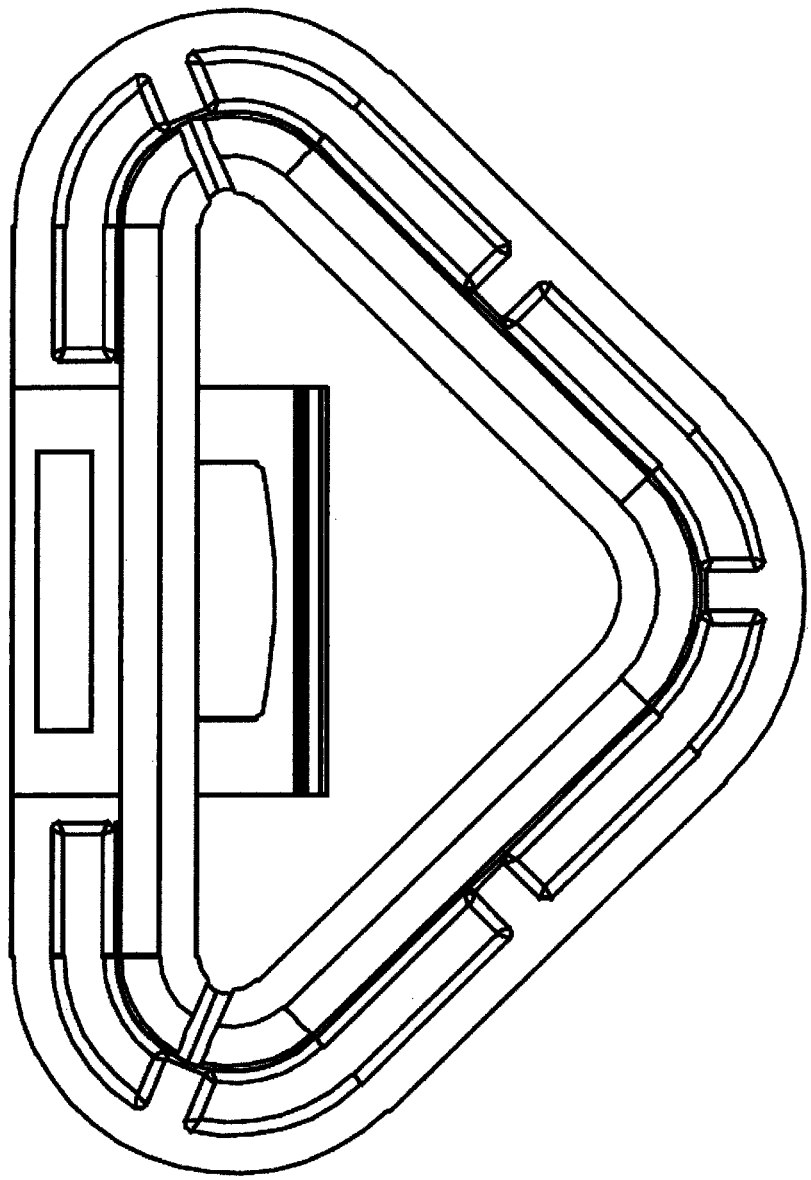

FIG. 59 is a schematic diagram showing the connection of the vertical bar, the transverse bar and the clip in an assembly according to an embodiment of the present invention.

While a trapezoid shape has been described as an example for the shape of the inserting hole 44-2 of the transverse bars, the shape of the inserting hole 44-2 of the transverse bars is limited thereto. Further, while a trapezoid shape has been described as an example for the overall shape of the clip in connection with an M-shaped vertical bar inserting hole, the shape of the clip and the shape of the vertical bar inserting hole is limited thereto. Further, while an M-shaped vertical bar has been described, the shape of the vertical bar is not limited thereto. For example, the vertical bar may have any suitable shape for a vertical bar, the vertical bar inserting hole of the clip may have any suitable shape that matches the shape of the vertical bar, the overall shape of the clip may be any suitable shape that accommodates the vertical bar inserting hole of the clip (e.g., the overall shape of the clip may be the same or similar shape as the vertical bar inserting hole, or different), and the shape of the inserting hole of the transverse bars may be any suitable shape that matches the overall shape of the clip.

Figure 46A:
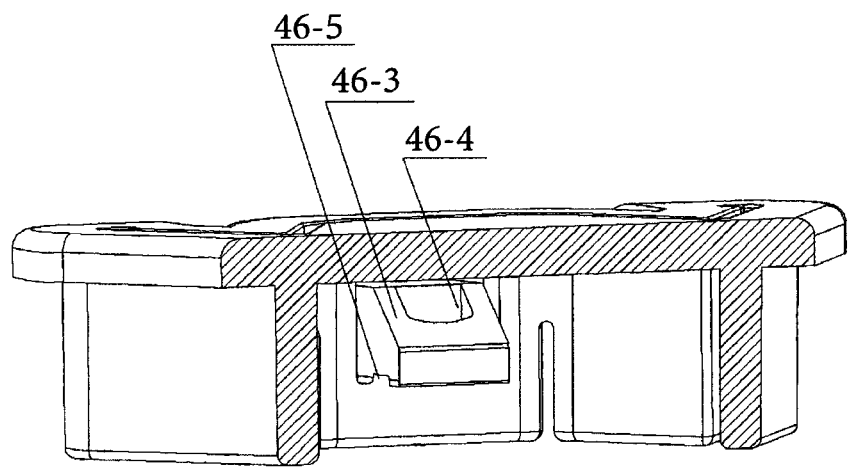
FIG. 46A is a cross-sectional view along the line D-D' of FIG. 45A.
Figure 46B:
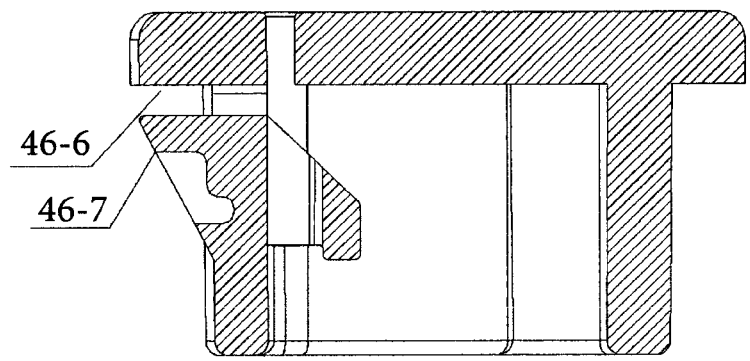
FIG. 46B is a cross-sectional view along the line E-E' of FIG. 45A.

FIG. 46A is a cross-sectional view along the line D-D' of FIG. 45A and FIG. 46B is a cross-sectional view along the line E-E' of FIG. 45A. The upper end face 46-7 of the section with the inwardly inclined face and the lower end face of the outward extending flange 46-6 forms a clamping groove, and this clamping groove is matched with the thickness of a single wall of the transverse bar (so that a single wall of the transverse bar can be inserted into and locked with the clamping groove). The bump 46-3 extends from top to bottom in the form of an convex arc and is configured to be inserted into the clamping hole 43 on the vertical bar (see FIG. 43); and the lower end face 46-5 of the bump 46-3 is configured to be propped against an orifice of the clamping hole 43 on the vertical bar. In addition, the groove 46-4 matches with the tab 43-1 so that the vertical bar cannot be continuously inserted downwards.

Figure 47:
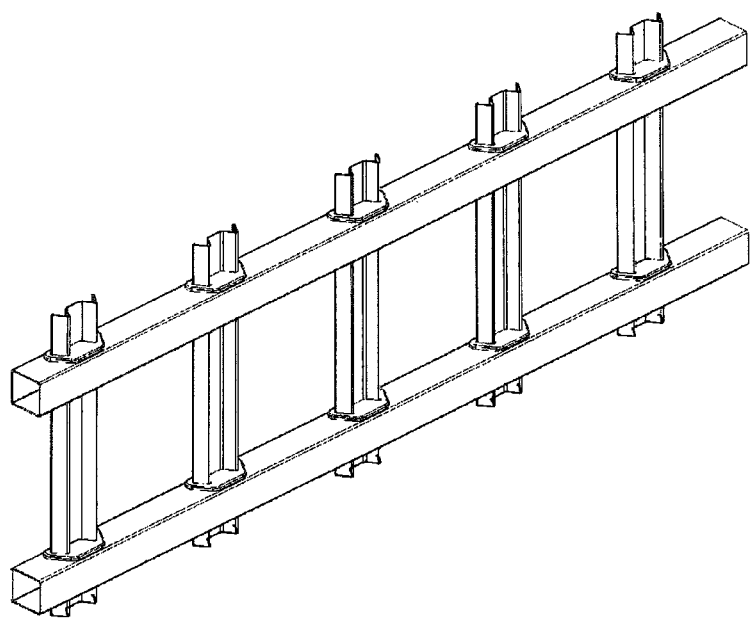
FIG. 47 is a schematic diagram showing the connection of the vertical bar, the transverse bar and the clip in an assembly according to an embodiment of the present invention.
Figure 48:
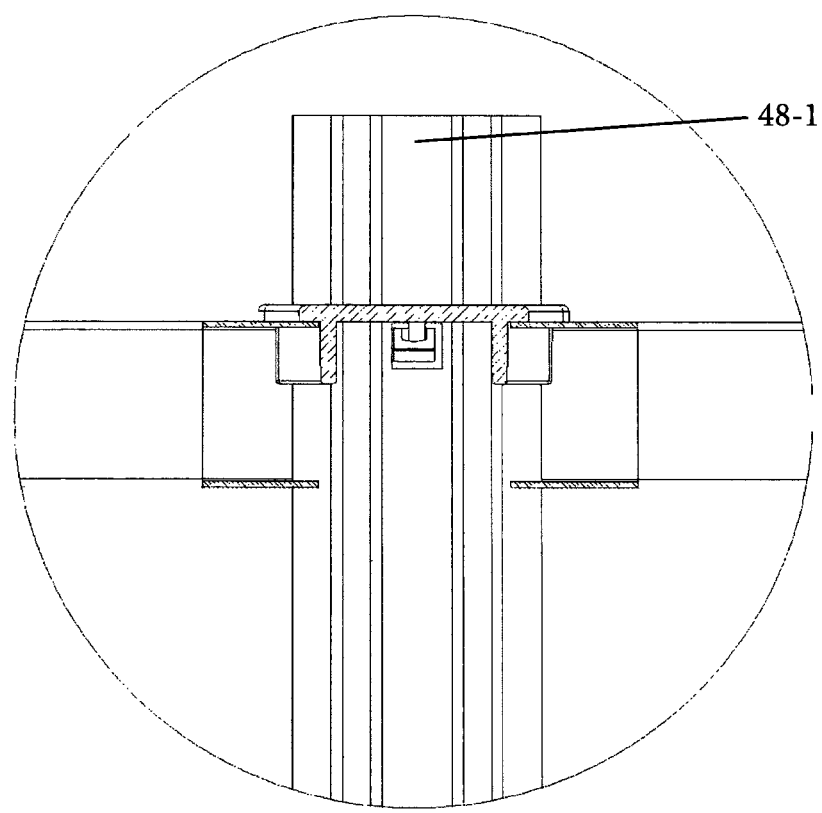
FIG. 48 is a cross-sectional view showing the connection of the M-shaped vertical bar, the transverse bar and the clip in an assembly according to an embodiment of the present invention.
Figure 49A:
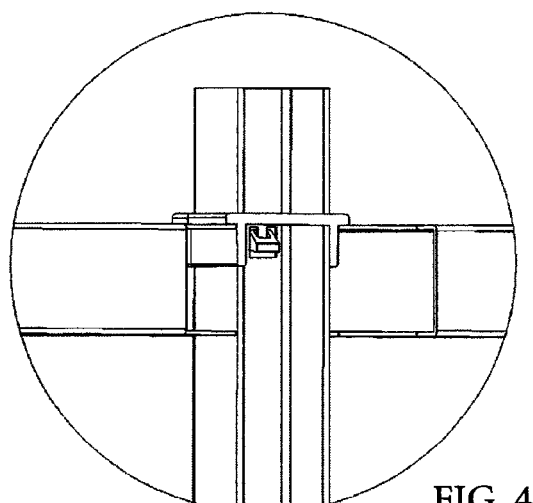
FIG. 49A-C are schematic diagrams showing the connection of the vertical bar, the transverse bar and the clip in an assembly according to an embodiment of the present invention.
Figure 49B:
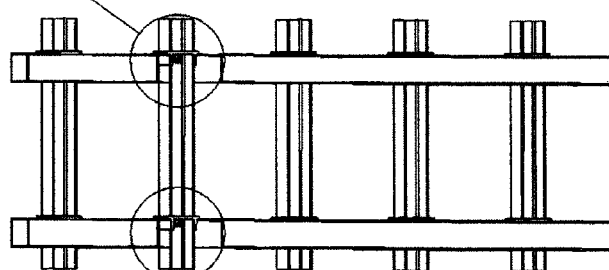
Figure 49C:
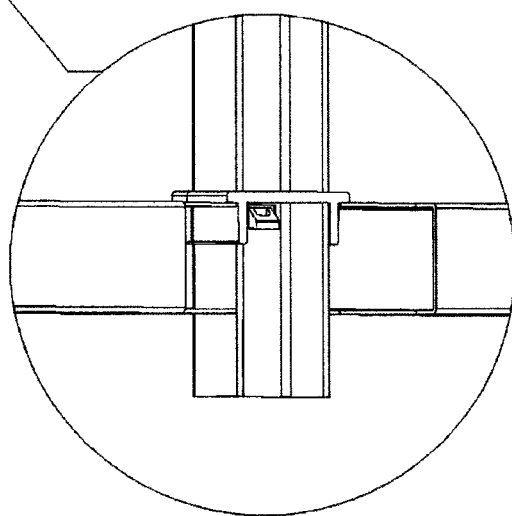
Figure 50:
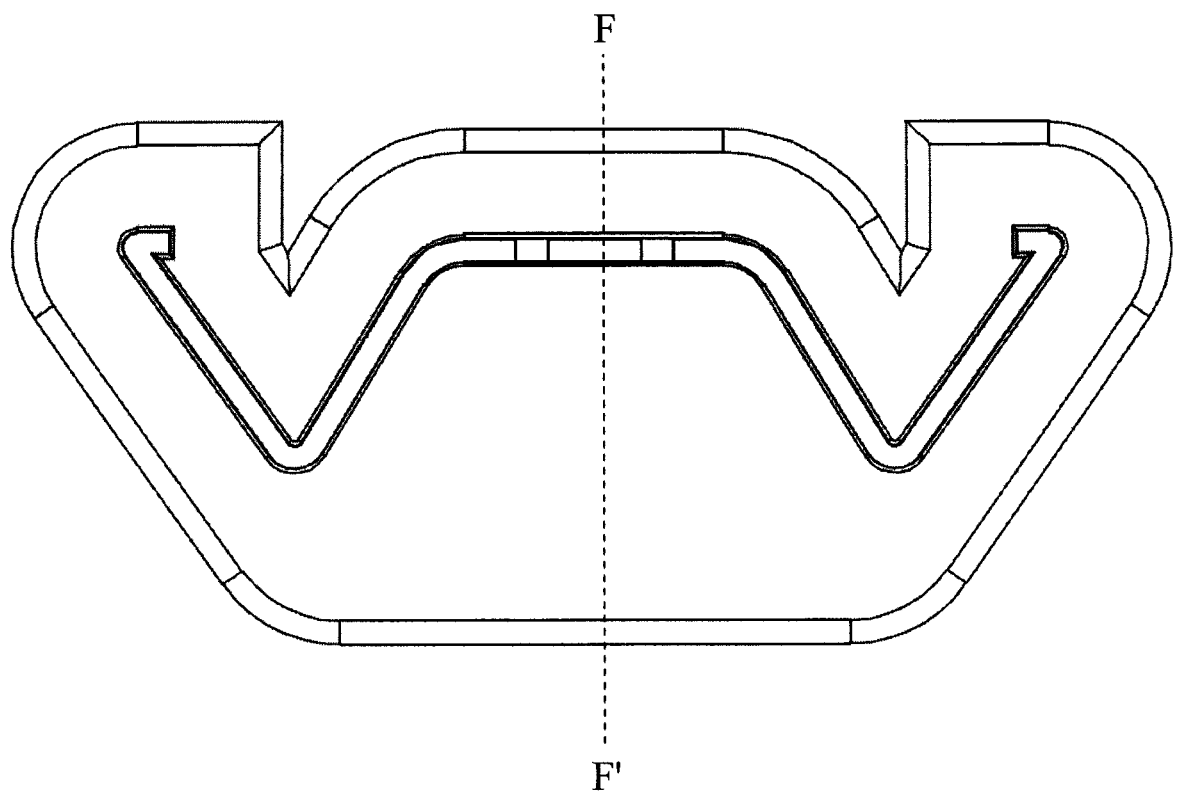
FIGS. 50-56 show various views of an M-shaped clip according to one embodiment of the present invention, where
Figure 51:
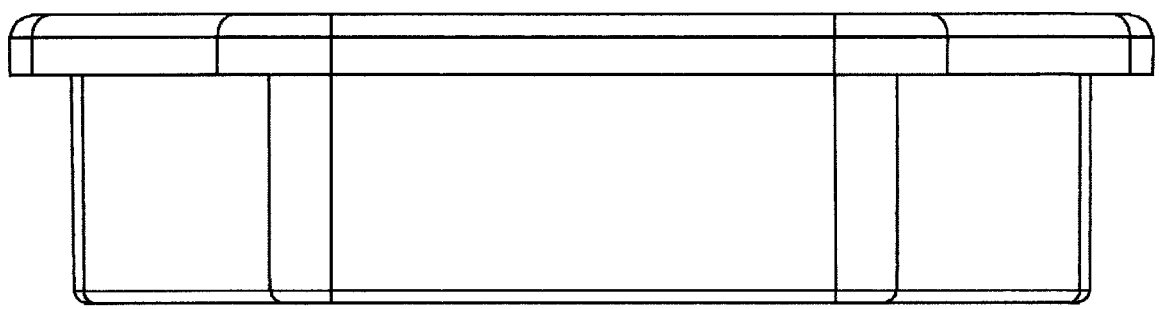
Figure 52:
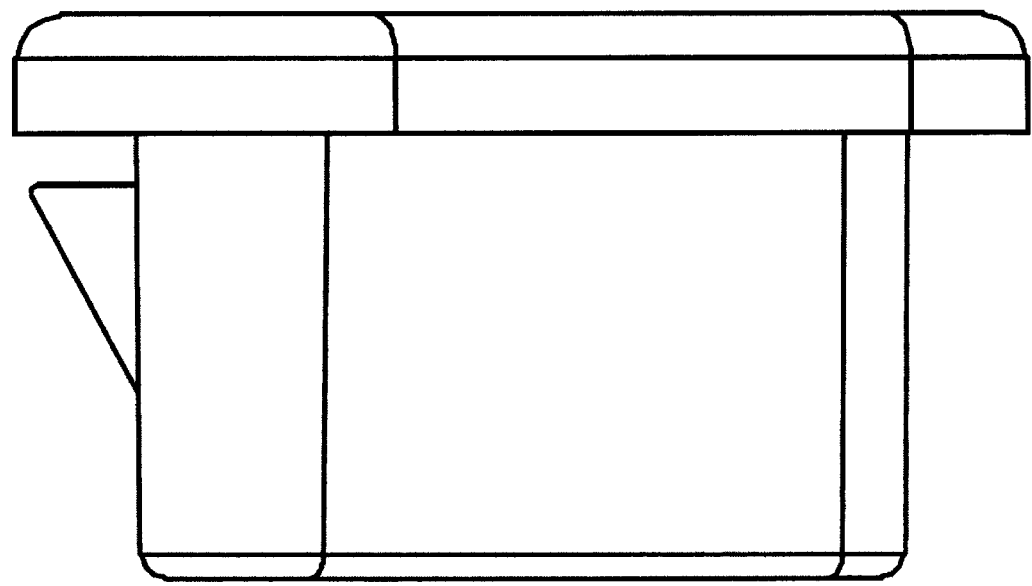
Figure 53:
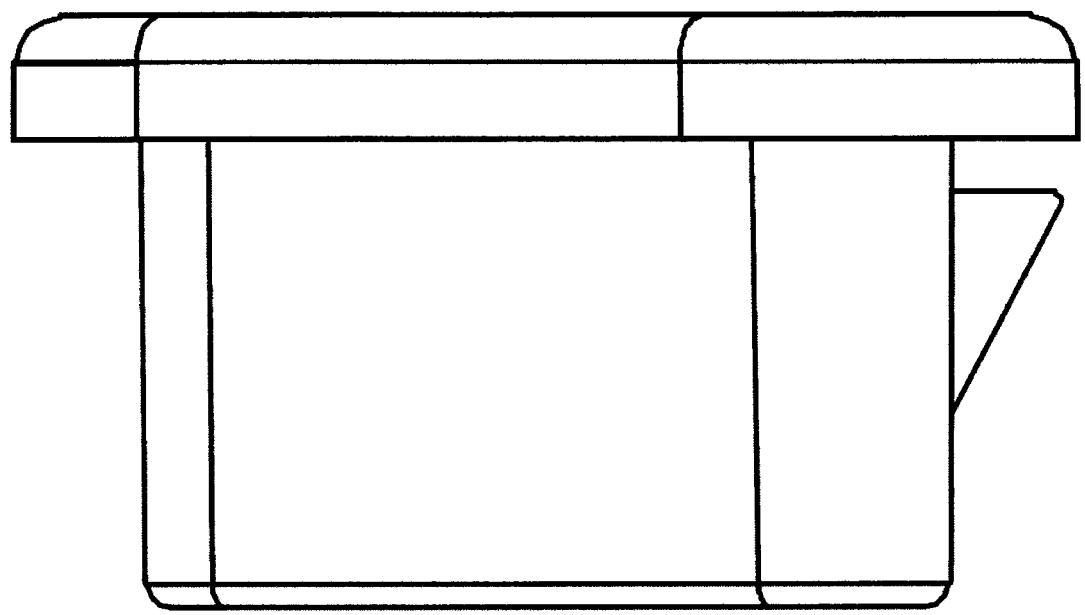
Figure 54:
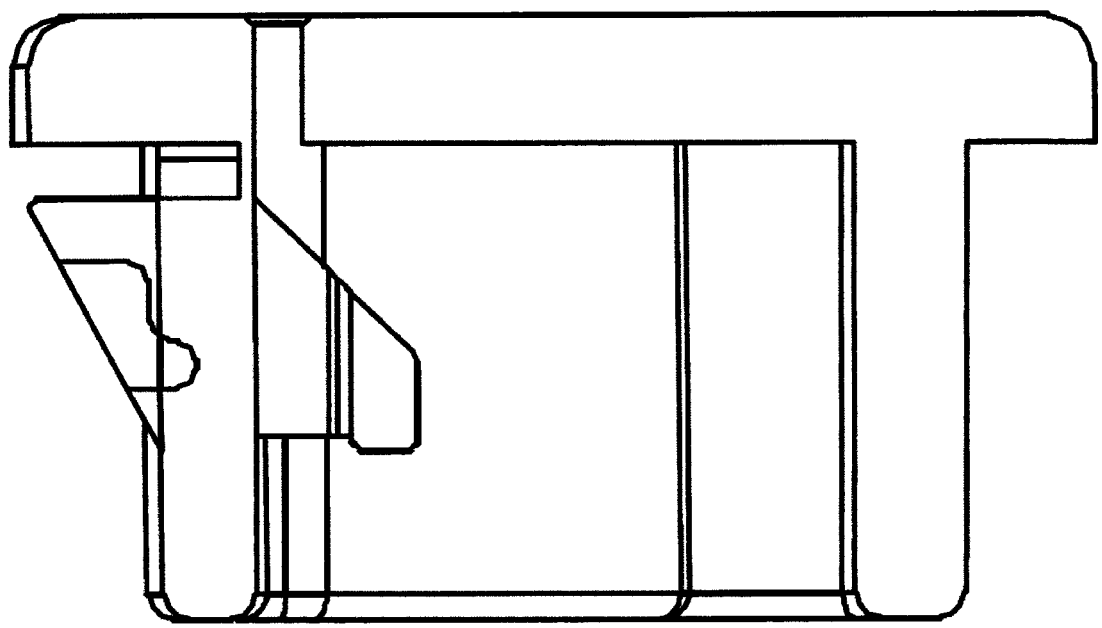
Figure 55:
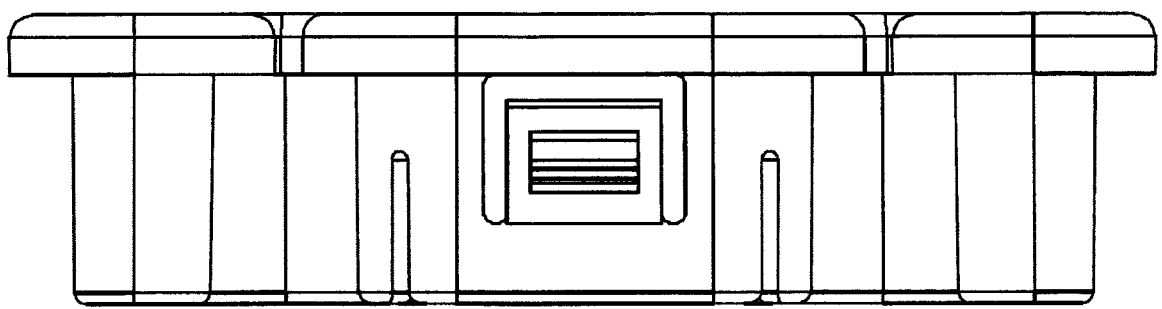
Figure 56:
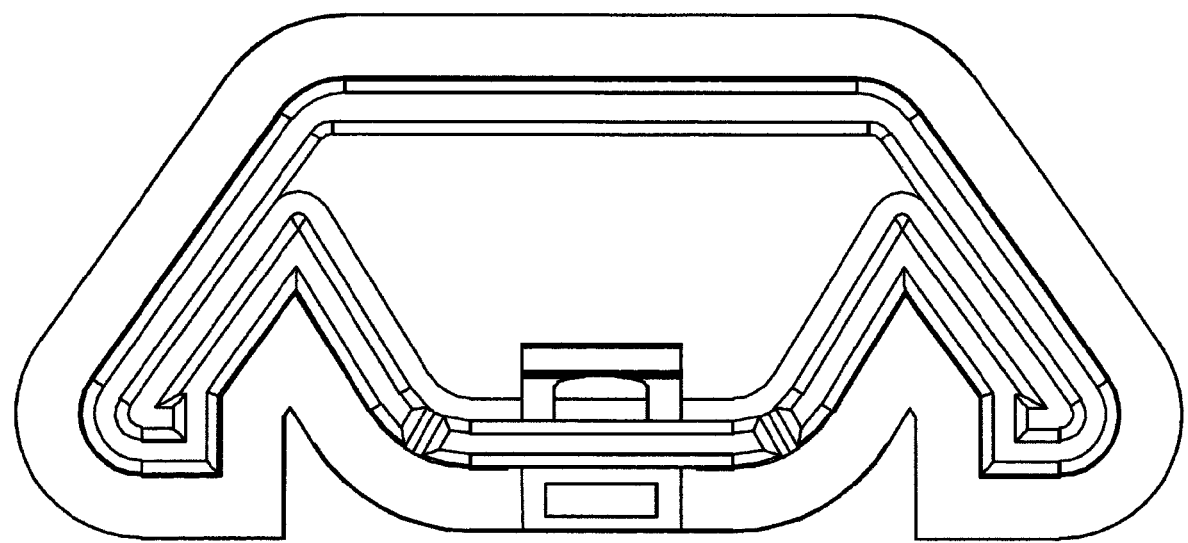

FIG. 47 is a schematic diagram showing the connection of the vertical bar, the transverse bar and the clip in an assembly according to an embodiment of the present invention; FIG. 59 is a schematic diagram showing the connection of the vertical bar, the transverse bar and the clip in an assembly according to another embodiment of the present invention; FIG. 48 is a cross-sectional view showing the connection of the M-shaped vertical bar, the transverse bar and the clip in an assembly according to an embodiment of the present invention, where the vertical bar can be seen to be connected with the clip through a clamping hole in the middle portion 48-1 of the M-shaped vertical bar; and FIGS. 49A-C are schematic diagrams showing the connection of the vertical bar, the transverse bar and the clip in an assembly according to an embodiment of the present invention.

During assembly, the lower side 45-1 of the clip is aligned with the inserting hole 44-2 of the transverse bar and is inserted downwards. The hole wall of the inserting hole of the transverse bar then comes in contact with the inwardly inclined face 46-7 on the outer wall of the main body; and the inwardly inclined face 46-7 is squeezed inwards by the hole wall of the inserting hole 44-2 of the transverse bar to satisfy the downward movement of the main body. When the main body is moved downwards to the clamping groove (i.e., the clamping groove comes in contact with the hole wall of the inserting hole 44-2), the squeezed inclined face 46-7 is released by the hole wall of the inserting hole of the transverse bar, so that the inclined face 46-7 pops out (of the squeezed state) and enters into a hollow cavity in the middle of the transverse bar; a side wall (e.g., a single side wall) of the transverse bar and the clamping groove are then engaged and locked (i.e., the side wall is inserted into the clamping groove), at which time, the side wall of the transverse bar keeps an upward and downward locked relationship with the main body due to the function of the clamping groove, so that the main body cannot move upward or downward, to keep the non-metal (e.g., rubber) clip and transverse bar fixed to each other. Here, the thickness of the hole wall of the inserting hole matches the gap of the clamping groove; the shape of the inserting hole matches that of the clip. Therefore, once the side wall of the transverse bar is engaged in the clamping groove and being sandwiched between the upper end face of the section with the inwardly inclined face 46-7 and the lower end face of the outward extending flange 46-6, the transverse bar and the clip are locked to each other.

The vertical bar is then inserted in the vertical bar inserting hole 45 of the main body; the vertical bar contacts with an inner surface of the clip with the inwardly protruded bump 46-3, and the bump 46-3 is squeezed (or pushed) outwardly, so that the vertical bar moves downwards smoothly.

When the vertical bar is inserted downwards to a position so that the clamping hole 43 of the vertical bar is just matched with the position of the bump 46-3 of the clip, the bump 46-3 of the clip is released by the vertical bar (i.e., the bump 46-3 is released from the squeezed state as its position matches that of the clamping hole 43), so that the bump 46-3 pops out (or pops inwardly) and enters into the clamping hole 43 of the vertical bar. When the vertical bar is further inserted downwards, the vertical bar (e.g., the upper edge of the lower clamping hole 43-2) comes into contact with the cambered surface of the bump 46-3 on the inner wall of the clip and the bump 46-3 is squeezed once again (e.g., by the upper edge of the lower clamping hole 43-2) to move out of the clamping hole 43-2 of the vertical bar. When the second vertical bar clamping hole 43 (e.g., the upper clamping hole 43) is just matched with (reaches the position of) the bump 46-3 on the inner wall of the clip, the bump 46-3 is released from the squeezed state, so that the bump 46-3 on the inner wall of the clip pops up (out) and enters into the second vertical bar clamping hole 46, at which time, the tab 43-1 of the vertical bar matches with the position of the groove 46-4 in the middle of the bump 46-3 and keeps a downward locking relation with the groove 46-4, so that the vertical bar cannot be continuously inserted downwards. An orifice (e.g., a lower edge) of the vertical bar clamping holes 43 and 43-2 keep an upward locking relation with the lower end face 46-5 of the bump 46-3 on the inner wall of the clip, so that the vertical bar cannot be pulled upwards, thus keeping a locked relation between the clip and the vertical bar. Here, the vertical bar may be a hollow bar with an inner space defined by an inner wall surrounded by an outer wall. However, the vertical bar may be a solid bar without any inner openings.

FIGS. 50-56 show various views of an M-shaped clip according to one embodiment of the present invention. FIGS. 60-66 show various views of an M-shaped clip according to another embodiment of the present invention.

In one embodiment, the clip includes two sections crossing each other or facing each other, each with an inwardly inclined face on the outer wall below the flange of the clip, and an inwardly protruding bump on the inner wall at the location corresponding to the respective inwardly inclined face on the outer wall. In another embodiment, the clip may include three or more sections with inwardly inclined face on the outer wall below the flange of the clip and three or more inwardly protruding bumps on the inner wall.

It should be understood that the example embodiments described therein should be considered in a descriptive sense only and not for purposes of limitation. Descriptions of features or aspects within each embodiment should typically be considered as available for other similar features or aspects in other embodiments.

While one or more embodiments of the present invention have been described with reference to the figures, it will be understood by those of ordinary skill in the art that various changes in form and details may be made therein without departing from the spirit and scope of the present invention as defined by the following claims, and equivalents thereof.

What is claimed is:

1. An assembled fence, comprising:
a transverse bar;
a vertical bar; and
an elastic non-metal clip comprising
a main body having an inner wall and an outer wall, wherein a vertical bar inserting hole is formed in a middle of the main body and is configured to be engaged and locked with the vertical bar;
the outer wall of the main body is inserted into an inserting hole of the transverse bar;
an outward extending flange is formed at an upper end of the outer wall of the main body;
a section with an inwardly inclined face which is inclined towards an inner side is formed on the outer wall below the flange;
a section with a straight wall is formed on a lower part of the section with the inwardly inclined face, an outer diameter of the section with the straight wall is less than an outer diameter of the flange at the upper end;
a clamping groove matched with a thickness of a single side wall of the transverse bar is formed between an upper end face of the inclined face and a lower end face of the flange;
an inwardly protruding bump is formed on an inner wall of the main body corresponding to the inclined face on the outer wall, the bump extends from top to bottom in a form of a convex arc; and
the bump extends into a clamping hole on the vertical bar, a lower end face of the bump is propped against an orifice of the clamping hole on the vertical bar.

2. The assembled fence of claim 1, wherein
a groove is formed in a middle of the bump on the inner wall of the main body; and
a tab matched with the groove in the middle of the bump is formed on at least one clamping hole of the vertical bar.

3. The assembled fence of claim 2, wherein the clip is made from plastic or rubber.

4. The assembled fence of claim 2, wherein the clip comprises at least one inwardly protruding bump on the inner wall and at least one inwardly inclined face on the outer wall below the flange.

5. The assembled fence of claim 2, wherein a cross section of the transverse bar is in an inverted U-shape.

6. The assembled fence of claim 2, wherein a cross section of the transverse bar is in a rectangle shape.

7. The assembled fence of claim 6, wherein the transverse bar comprises a first inserting hole on a first end face of the transverse bar and a second inserting hole aligned vertically with the first inserting hole on a second end face of the transverse bar, and a first inserting hole diameter of the first inserting hole is smaller than a second inserting hole diameter of the second inserting hole.

8. The assembled fence of claim 6, wherein the transverse bar comprises an inserting hole on a first end face of the transverse bar and no inserting hole on a second end face of the transverse bar facing the first end face.

9. The assembled fence of claim 2, wherein the vertical bar has an M-shaped cross section.

10. The assembled fence of claim 9, wherein the vertical bar is a hollow bar or a solid bar.

11. The assembled fence of claim 1, wherein the clip has a rectangular, an oval, a triangular, or a hexagonal shape.

12. The assembled fence of claim 1, wherein the clip has an M-shaped vertical bar inserting hole.

13. A method of assembling a fence, the method comprising:
providing an elastic non-metal clip comprising a main body having an inner wall and an outer wall, wherein a vertical bar inserting hole is formed in a middle of the main body and is configured to be engaged and locked with the vertical bar; the outer wall of the main body is configured to be inserted into an inserting hole of the transverse bar; an outward extending flange is formed at an upper end of the outer wall of the main body; a section with an inwardly inclined face which is inclined towards an inner side is formed on the outer wall below the flange; a section with a straight wall is formed on a lower part of section with the inwardly inclined face, an outer diameter of the section with the straight wall is less than an outer diameter of the flange at the upper end; a clamping groove matched with a thickness of a single side wall of the transverse bar is formed between an upper end face of the inclined face and a lower end face of the flange; and an inwardly protruding bump is formed on an inner wall of the main body corresponding to the inclined face on the outer wall, the bump extends from top to bottom in a form of a convex arc; the bump is configured to extend into a clamping hole on the vertical bar, a lower end face of the bump is configured to be propped against an orifice of a clamping hole on the vertical bar;
inserting the clip downwards into an inserting hole of a first fence bar until the clamping groove of the clip is locked with a hole wall of the inserting hole of the first fence bar; and
inserting a second fence bar into the vertical bar inserting hole of the clip until the inwardly protruding bump of the clip is locked with a clamping hole of the second fence bar.

14. The method of assembling a fence of claim 13, wherein the first fence bar is a transverse bar, a door post, or a post of a fence.

15. The method of assembling a fence of claim 13, wherein the second fence bar is a vertical bar or a transverse bar of a fence.

\* \* \* \* \*